United States Patent
Sloan, IV et al.

(10) Patent No.: US 11,520,544 B2
(45) Date of Patent: Dec. 6, 2022

(54) WASTE DETERMINATION FOR GENERATING CONTROL PLANS FOR DIGITAL PRE-PRINT PAPER, SHEET, AND BOX MANUFACTURING SYSTEMS

(71) Applicant: Georgia-Pacific Corrugated LLC, Atlanta, GA (US)

(72) Inventors: Charlie Bert Sloan, IV, Cumming, GA (US); Robert Dennis Seay, San Diego, CA (US)

(73) Assignee: GEORGIA-PACIFIC CORRUGATED LLC, Atlanta, GA (US)

( * ) Notice: Subject to any disclaimer, the term of this patent is extended or adjusted under 35 U.S.C. 154(b) by 0 days.

(21) Appl. No.: 17/349,039

(22) Filed: Jun. 16, 2021

(65) Prior Publication Data

US 2021/0311677 A1 Oct. 7, 2021

Related U.S. Application Data

(63) Continuation of application No. 16/826,625, filed on Mar. 23, 2020, now Pat. No. 11,093,186, which is a
(Continued)

(51) Int. Cl.
*G06F 3/12* (2006.01)
*B26D 7/27* (2006.01)
(Continued)

(52) U.S. Cl.
CPC ............ *G06F 3/1243* (2013.01); *B26D 7/27* (2013.01); *G06F 3/1205* (2013.01); *G06F 3/126* (2013.01);
(Continued)

(58) Field of Classification Search
None
See application file for complete search history.

(56) References Cited

U.S. PATENT DOCUMENTS

| 2,318,937 A | 5/1943 | Goldney et al. |
| 3,058,869 A | 10/1962 | Cohen et al. |
| (Continued) | | |

FOREIGN PATENT DOCUMENTS

| CA | 1215568 A | 12/1986 |
| CA | 2152003 A1 | 12/1995 |
| (Continued) | | |

OTHER PUBLICATIONS

BHS Corrugator 4.0 Presentation (ICCA, Apr. 2015) 13 pages.
(Continued)

*Primary Examiner* — Andrew H Lam
(74) *Attorney, Agent, or Firm* — Nelson Mullins Riley & Scarborough LLP

(57) ABSTRACT

Systems for providing efficient manufacturing of paper, sheet, and/or box products of varying size and structure, often with pre-applied print ("pre-print"), are provided herein. One or more controllers can be used to aggregate upcoming orders and information needed to complete the manufacturing process for the order. A controller enables a user to prepare control plans (e.g., reel maps, reel plans, etc.) for processing rolls of web product through the manufacturing process. Criteria filtering and/or various features enable generation of efficient and effective control plans for rolls of web product, including, in some cases, multiple orders. The control plan may include a set of instructions for operating one or more systems within the manufacturing process to form the desired finished paper-based product. In such a regard, efficient manufacturing of various paper-based products, including corrugated boxes, folded carton,
(Continued)

labels, flexible paper, industrial bags, plates, cups, décor, and many others, can be achieved.

20 Claims, 30 Drawing Sheets

Related U.S. Application Data continuation of application No. 16/033,344, filed on Jul. 12, 2018, now Pat. No. 10,642,551.

(60) Provisional application No. 62/649,942, filed on Mar. 29, 2019, provisional application No. 62/619,998, filed on Jan. 22, 2018, provisional application No. 62/597,079, filed on Dec. 11, 2017, provisional application No. 62/583,845, filed on Nov. 9, 2017, provisional application No. 62/532,483, filed on Jul. 14, 2017.

(51) Int. Cl.
| | | |
|---|---|---|
| *G06Q 10/06* | (2012.01) | |
| *G06T 7/00* | (2017.01) | |
| *G06Q 10/04* | (2012.01) | |
| *B65H 23/192* | (2006.01) | |
| *B65H 35/00* | (2006.01) | |

(52) U.S. Cl.
CPC .......... *G06F 3/1215* (2013.01); *G06F 3/1251* (2013.01); *G06F 3/1282* (2013.01); *G06Q 10/043* (2013.01); *G06Q 10/0631* (2013.01); *G06T 7/0004* (2013.01); *B65H 23/192* (2013.01); *B65H 35/008* (2013.01); *G06F 3/1213* (2013.01); *G06T 2207/30144* (2013.01)

(56) References Cited

U.S. PATENT DOCUMENTS

| | | |
|---|---|---|
| 3,667,252 A | 6/1972 | Nelson |
| 3,667,353 A | 6/1972 | Ward, Jr. et al. |
| 3,667,354 A | 6/1972 | Steinmetz |
| 4,086,120 A | 4/1978 | Cosby et al. |
| 4,287,797 A | 9/1981 | Seragnoli |
| 4,387,614 A | 6/1983 | Evans |
| 4,415,978 A | 11/1983 | Craemer et al. |
| 4,545,780 A | 10/1985 | Martin |
| 4,576,663 A | 3/1986 | Bory |
| 4,604,083 A | 8/1986 | Barny et al. |
| 4,737,904 A | 4/1988 | Omniato |
| 4,847,775 A | 7/1989 | Roch et al. |
| 5,117,610 A | 6/1992 | Hartman et al. |
| 5,325,306 A | 6/1994 | Adachi et al. |
| 5,458,062 A | 10/1995 | Goldberg et al. |
| 5,705,020 A | 1/1998 | Chiari |
| 5,727,748 A | 3/1998 | Prittie |
| 5,802,974 A | 9/1998 | McNeil |
| 5,816,994 A | 10/1998 | Hill et al. |
| 5,822,208 A | 10/1998 | Bory |
| 5,899,128 A | 5/1999 | Smithe et al. |
| 5,918,519 A | 7/1999 | Schnabel et al. |
| 5,926,825 A | 7/1999 | Shirakawa |
| 6,070,396 A | 6/2000 | Rinaldi et al. |
| 6,112,658 A | 9/2000 | Gunther et al. |
| 6,125,374 A | 9/2000 | Terry et al. |
| 6,149,565 A | 11/2000 | Meyer et al. |
| 6,170,881 B1 | 1/2001 | Salmon et al. |
| 6,188,490 B1 | 2/2001 | Miyake |
| 6,207,242 B1 | 3/2001 | Hoffman |
| 6,234,943 B1 | 5/2001 | Copin |
| 6,299,730 B1 | 10/2001 | Broek et al. |
| 6,352,497 B1 | 3/2002 | Hensley et al. |
| 6,378,862 B1 | 4/2002 | Rebeaud |
| 6,450,381 B1 | 9/2002 | Ernst et al. |
| 6,473,760 B1 | 10/2002 | Klatt et al. |
| 6,481,709 B2 | 11/2002 | Gombau et al. |
| 6,496,219 B1 | 12/2002 | Porret et al. |
| 6,499,397 B2 | 12/2002 | Stern |
| 6,606,947 B2 | 8/2003 | Frossard et al. |
| 6,650,433 B1 | 11/2003 | Keane et al. |
| 6,725,123 B1 | 4/2004 | Denuell |
| 6,771,384 B1 | 8/2004 | Laverty et al. |
| 6,791,707 B2 | 9/2004 | Laverty et al. |
| 6,821,038 B2 | 11/2004 | Izawa |
| 6,893,520 B2 | 5/2005 | Cummings et al. |
| 6,934,046 B1 | 8/2005 | Nishikawa et al. |
| 6,976,798 B2 | 12/2005 | Keane et al. |
| 6,992,794 B2 | 1/2006 | Keane et al. |
| 7,009,723 B1 | 3/2006 | Bartholet et al. |
| 7,073,444 B2 | 7/2006 | Alonso et al. |
| 7,093,540 B2 | 8/2006 | Giancaterino et al. |
| 7,114,444 B2 | 10/2006 | Hutchinson et al. |
| 7,133,149 B2 | 11/2006 | Keane et al. |
| 7,145,670 B2 | 12/2006 | Keane et al. |
| 7,154,627 B2 | 12/2006 | Nishikawa et al. |
| 7,182,007 B2 | 2/2007 | Berge et al. |
| 7,187,465 B2 | 3/2007 | Keane et al. |
| 7,187,472 B2 | 3/2007 | Friedman et al. |
| 7,187,995 B2 | 3/2007 | Floeder et al. |
| 7,242,463 B2 | 7/2007 | Pilloud et al. |
| 7,297,969 B1 | 11/2007 | Wolinsky et al. |
| 7,307,749 B2 | 12/2007 | Nishikawa et al. |
| 7,398,733 B2 | 7/2008 | De Vries et al. |
| 7,469,872 B2 | 12/2008 | Compagnone et al. |
| 7,495,796 B2 | 2/2009 | Keane et al. |
| 7,542,155 B2 | 6/2009 | Paskalev et al. |
| 7,726,899 B2 | 6/2010 | Clement |
| 7,832,441 B2 | 11/2010 | Titz |
| 7,855,799 B2 | 12/2010 | Shah |
| 7,871,479 B2 | 1/2011 | Garland |
| 7,949,566 B2 | 5/2011 | Fogelson |
| 8,009,308 B2 | 8/2011 | Field |
| 8,030,013 B2 | 10/2011 | Llovet et al. |
| 8,045,147 B2 | 10/2011 | Toma et al. |
| 8,059,290 B2 | 11/2011 | Kuroshima |
| 8,060,234 B2 | 11/2011 | Hellstrom et al. |
| 8,175,739 B2 | 5/2012 | Floeder et al. |
| 8,241,454 B2 | 8/2012 | Kraus et al. |
| 8,270,007 B2 | 9/2012 | Pandit et al. |
| 8,310,696 B2 | 11/2012 | Gustafson et al. |
| 8,390,872 B2 | 3/2013 | Abe et al. |
| 8,418,614 B2 | 4/2013 | Whitelaw et al. |
| 8,464,638 B2 | 6/2013 | Whiltelaw et al. |
| 8,482,766 B2 | 7/2013 | Greene et al. |
| 8,488,144 B2 | 7/2013 | Fujimori et al. |
| 8,520,254 B2 | 8/2013 | Rai |
| 8,531,721 B2 | 9/2013 | Minagawa |
| 8,534,194 B2 | 9/2013 | Whitelaw et al. |
| 8,630,013 B2 | 1/2014 | Minagawa |
| 8,634,089 B2 | 1/2014 | Keane et al. |
| 8,634,731 B2 | 1/2014 | Has et al. |
| 8,732,003 B2 | 5/2014 | Keane et al. |
| 8,733,222 B2 | 5/2014 | Borel et al. |
| 8,757,479 B2 | 6/2014 | Clark et al. |
| 8,783,144 B2 | 7/2014 | Compagnone et al. |
| 8,817,324 B2 | 8/2014 | Giannetti et al. |
| 8,834,334 B2 | 9/2014 | Palm et al. |
| 8,842,313 B2 | 9/2014 | Harrington |
| 8,887,637 B2 | 11/2014 | Huber et al. |
| 8,891,126 B2 | 11/2014 | Tufano |
| 8,931,410 B2 | 1/2015 | Noy |
| 9,056,515 B2 | 6/2015 | Wingkono et al. |
| 9,073,720 B2 | 7/2015 | Beguin et al. |
| 9,108,382 B2 | 8/2015 | Gnan et al. |
| 9,132,599 B2 | 9/2015 | Bober |
| 9,152,362 B2 | 10/2015 | Keane et al. |
| 9,278,555 B2 | 3/2016 | Torihara et al. |
| 9,298,404 B2 | 3/2016 | Niblett, Jr. |
| 9,298,706 B2 | 3/2016 | Magnell |
| 9,325,860 B2 | 4/2016 | Lachajewski et al. |
| 9,327,421 B2 | 5/2016 | Beguin |
| 9,327,485 B2 | 5/2016 | Feng et al. |
| 9,340,007 B2 | 5/2016 | D'Annunzio et al. |

(56) References Cited

U.S. PATENT DOCUMENTS

| | | |
|---|---|---|
| 9,361,550 B2 | 6/2016 | Barros et al. |
| 9,481,537 B2 | 11/2016 | Beguin et al. |
| 9,518,362 B2 | 12/2016 | Bomstad et al. |
| 9,539,828 B2 | 1/2017 | Yasinover et al. |
| 9,645,774 B2 | 5/2017 | Keane et al. |
| 9,663,261 B2 | 5/2017 | Azad et al. |
| 9,898,232 B2 | 2/2018 | Has et al. |
| 9,904,494 B2 | 2/2018 | Ujike |
| 10,576,650 B2 | 3/2020 | Bayer et al. |
| 2002/0014577 A1 | 2/2002 | Ulrich et al. |
| 2002/0062751 A1 | 5/2002 | Bardet et al. |
| 2002/0078847 A1 | 6/2002 | Bardet et al. |
| 2002/0083857 A1 | 7/2002 | Bardet et al. |
| 2002/0197091 A1 | 12/2002 | Otsuki |
| 2002/0197097 A1 | 12/2002 | Otsuki |
| 2003/0149747 A1 | 8/2003 | Rai et al. |
| 2004/0041991 A1 | 3/2004 | Obertegger |
| 2004/0042022 A1 | 3/2004 | Friedman et al. |
| 2004/0150856 A1 | 8/2004 | Asai |
| 2004/0182503 A1 | 9/2004 | Stadele |
| 2004/0182504 A1 | 9/2004 | Stadele et al. |
| 2004/0211330 A1 | 10/2004 | Clark et al. |
| 2004/0211510 A1 | 10/2004 | Joseph, Sr. |
| 2005/0000842 A1 | 1/2005 | Timmerman et al. |
| 2005/0044550 A1 | 2/2005 | Perdu |
| 2005/0085362 A1 | 4/2005 | Hutchinson et al. |
| 2005/0141760 A1 | 6/2005 | Floeder et al. |
| 2005/0209075 A1 | 9/2005 | Kocherga et al. |
| 2005/0247173 A1 | 11/2005 | Alsten et al. |
| 2006/0027303 A1 | 2/2006 | Hunter |
| 2006/0090319 A1 | 5/2006 | Howe |
| 2006/0148631 A1 | 7/2006 | Protocsnak et al. |
| 2006/0222429 A1 | 10/2006 | Kurashina |
| 2006/0257014 A1 | 11/2006 | Oi |
| 2007/0120357 A1 | 5/2007 | Kapadi et al. |
| 2007/0162326 A1 | 7/2007 | Weel et al. |
| 2007/0175350 A1 | 8/2007 | Crum |
| 2007/0289460 A1 | 12/2007 | Tang |
| 2008/0075488 A1 | 3/2008 | Moriyama et al. |
| 2008/0239381 A1 | 10/2008 | Oshima |
| 2008/0273224 A1 | 11/2008 | Maulsby et al. |
| 2008/0308215 A1 | 12/2008 | Kraus et al. |
| 2008/0308251 A1 | 12/2008 | Weyer et al. |
| 2009/0025002 A1 | 1/2009 | Rai |
| 2009/0080022 A1 | 3/2009 | Tsutsumi |
| 2009/0120563 A1 | 5/2009 | Titz |
| 2009/0217835 A1 | 9/2009 | Rozenblum |
| 2009/0218380 A1 | 9/2009 | Prittie |
| 2009/0243204 A1* | 10/2009 | Breunig .............. B41F 33/06 271/264 |
| 2009/0262159 A1 | 10/2009 | Lang |
| 2011/0122212 A1 | 5/2011 | Pettersson et al. |
| 2011/0149337 A1 | 6/2011 | Goetz et al. |
| 2012/0019866 A1 | 1/2012 | Kuroshima |
| 2012/0053039 A1 | 3/2012 | Compagnone et al. |
| 2012/0148326 A1 | 6/2012 | Ipponyari et al. |
| 2012/0250047 A1 | 10/2012 | Prati |
| 2013/0029825 A1 | 1/2013 | Rich |
| 2013/0094033 A1 | 4/2013 | Giannetti et al. |
| 2013/0139959 A1 | 6/2013 | Wang |
| 2013/0141763 A1 | 6/2013 | Giannetti et al. |
| 2013/0184133 A1 | 7/2013 | Sugimoto et al. |
| 2013/0184134 A1 | 7/2013 | Suzuki et al. |
| 2013/0203579 A1 | 8/2013 | Vermunt |
| 2013/0209750 A1 | 8/2013 | Van Berlo |
| 2013/0286410 A1 | 10/2013 | Yasinover et al. |
| 2014/0000785 A1 | 1/2014 | Gnan et al. |
| 2014/0067104 A1 | 3/2014 | Osterhout |
| 2014/0162862 A1 | 6/2014 | Shimura et al. |
| 2014/0182470 A1 | 7/2014 | Clarke et al. |
| 2014/0251170 A1 | 9/2014 | Chiari et al. |
| 2014/0274643 A1 | 9/2014 | Clark et al. |
| 2014/0293297 A1 | 10/2014 | Nagahara |
| 2014/0297357 A1 | 10/2014 | Zeng et al. |
| 2014/0376043 A1 | 12/2014 | Tsujita |
| 2015/0022845 A1 | 1/2015 | Roscoe et al. |
| 2015/0090140 A1 | 4/2015 | Rancourt |
| 2015/0101740 A1 | 4/2015 | Morales Garcia de la Vega et al. |
| 2015/0115976 A1 | 4/2015 | Adams et al. |
| 2015/0221077 A1 | 8/2015 | Kawabata et al. |
| 2015/0291382 A1 | 10/2015 | Moh |
| 2015/0292155 A1 | 10/2015 | Bomstad et al. |
| 2016/0004249 A1 | 1/2016 | Cummings et al. |
| 2016/0008998 A1 | 1/2016 | Denisse et al. |
| 2016/0016324 A1 | 1/2016 | Bapst et al. |
| 2016/0121572 A1 | 5/2016 | Giancaterino |
| 2016/0231966 A1 | 8/2016 | Ujike |
| 2016/0286064 A1 | 9/2016 | Numao et al. |
| 2016/0306595 A1 | 10/2016 | Has et al. |
| 2016/0318297 A1 | 11/2016 | Whitelaw et al. |
| 2016/0361886 A1 | 12/2016 | Suzuki et al. |
| 2017/0043570 A1 | 2/2017 | Bastici et al. |
| 2017/0057771 A1 | 3/2017 | Clement |
| 2017/0087793 A1 | 3/2017 | Mark et al. |
| 2017/0087794 A1 | 3/2017 | Bayer et al. |
| 2017/0087879 A1 | 3/2017 | Mark |
| 2017/0180598 A1 | 6/2017 | Nagahara |
| 2017/0308335 A1 | 10/2017 | Keane et al. |
| 2017/0344316 A1 | 11/2017 | Keane et al. |
| 2018/0000842 A1 | 1/2018 | Dhuppad et al. |
| 2018/0009616 A1 | 1/2018 | Kodama et al. |
| 2018/0037037 A1 | 2/2018 | Takagi et al. |
| 2018/0200906 A1 | 7/2018 | Senoco |
| 2018/0215061 A1 | 8/2018 | Bayer et al. |
| 2018/0250971 A1 | 9/2018 | Singla et al. |
| 2018/0253263 A1 | 9/2018 | Hower et al. |
| 2018/0345619 A1* | 12/2018 | Lang .................... B65H 23/18 |
| 2019/0016081 A1 | 1/2019 | Widner et al. |
| 2019/0016551 A1 | 1/2019 | Seay |
| 2019/0018628 A1 | 1/2019 | Sloan, IV et al. |
| 2019/0018629 A1 | 1/2019 | Seay |
| 2019/0024315 A1 | 1/2019 | Bomstad et al. |
| 2019/0084266 A1 | 3/2019 | Grünwald et al. |
| 2019/0193368 A1 | 6/2019 | Eder et al. |
| 2020/0114668 A1 | 4/2020 | Havive et al. |
| 2020/0218479 A1 | 7/2020 | Sloan, IV et al. |

FOREIGN PATENT DOCUMENTS

| | | |
|---|---|---|
| CA | 2398171 A1 | 8/2001 |
| CA | 2999388 A1 | 3/2017 |
| CN | 101124528 A | 2/2008 |
| CN | 201030576 Y | 3/2008 |
| CN | 101219723 A | 7/2008 |
| CN | 101977777 A | 2/2011 |
| CN | 102173162 A | 9/2011 |
| CN | 103286812 A | 9/2013 |
| CN | 203307684 U | 11/2013 |
| CN | 103465509 A | 12/2013 |
| CN | 103879026 A | 6/2014 |
| CN | 203919153 U | 11/2014 |
| CN | 106363962 A | 2/2017 |
| EP | 0875482 A1 | 11/1998 |
| EP | 0972639 B1 | 1/2000 |
| EP | 0983853 B1 | 3/2000 |
| EP | 1132203 B1 | 9/2001 |
| EP | 1243414 B2 | 9/2002 |
| EP | 1 459 878 B1 | 9/2004 |
| EP | 1459878 A2 | 9/2004 |
| EP | 1593502 B1 | 11/2005 |
| EP | 1 655 116 A1 | 5/2006 |
| EP | 1916102 B2 | 4/2008 |
| EP | 1956456 A1 | 8/2008 |
| EP | 2100732 A1 | 9/2009 |
| EP | 2227396 B1 | 9/2010 |
| EP | 2250019 B1 | 11/2010 |
| EP | 2298552 B1 | 3/2011 |
| EP | 2428360 B1 | 3/2012 |
| EP | 2429781 B1 | 3/2012 |
| EP | 2429782 B1 | 3/2012 |
| EP | 2551117 A2 | 1/2013 |
| EP | 2611614 B1 | 7/2013 |
| EP | 2928651 A1 | 10/2015 |
| EP | 2964436 B1 | 1/2016 |

(56) References Cited

FOREIGN PATENT DOCUMENTS

| | | |
|---|---|---|
| EP | 3010717 B1 | 2/2017 |
| EP | 3652687 A1 | 5/2020 |
| GB | 2102769 A | 2/1983 |
| GB | 2542569 A | 3/2017 |
| GB | 2542645 A | 3/2017 |
| JP | S62-290527 A | 12/1987 |
| JP | H07137720 A | 5/1995 |
| JP | H11165814 A | 6/1999 |
| JP | 2000118797 A | 4/2000 |
| JP | 2000153802 A | 6/2000 |
| JP | 2002113971 A | 4/2002 |
| JP | 2002/233990 A | 8/2002 |
| JP | 2002-273800 A | 9/2002 |
| JP | 2002304426 A | 10/2002 |
| JP | 2003-245894 A | 9/2003 |
| JP | 2004-082279 | 3/2004 |
| JP | 2007-245257 A | 9/2007 |
| JP | 2009/154229 A | 7/2009 |
| JP | 2010158902 A | 7/2010 |
| JP | 4718981 B2 | 7/2011 |
| JP | 2012-1239952 A | 7/2012 |
| JP | 2015157375 A | 9/2015 |
| JP | 2015217535 A | 12/2015 |
| JP | 2016154008 A | 8/2016 |
| JP | 2017-035755 A | 2/2017 |
| KR | 2010-0138218 A | 12/2010 |
| KR | 10-1102628 B1 | 1/2012 |
| KR | 10-1518219 B1 | 5/2015 |
| TW | M271837 U | 8/2005 |
| WO | WO 2009/014818 A1 | 1/2009 |
| WO | WO 2012/065689 A1 | 5/2012 |
| WO | WO 2014/023487 A1 | 2/2014 |
| WO | WO 2014/206496 A1 | 12/2014 |
| WO | WO 2016/087053 A1 | 6/2016 |
| WO | WO 2016/165774 A1 | 10/2016 |
| WO | WO 2017/026135 A1 | 2/2017 |
| WO | WO 2017/051146 A1 | 3/2017 |
| WO | WO 2017/131720 A1 | 8/2017 |
| WO | WO 2017/178228 A1 | 10/2017 |

OTHER PUBLICATIONS

Chang et al., Proceedings of the 2003 Winter Simulation Conference, "Simulation-Based Scheduling Dynamic Discrete Manufacturing", retrieved from <https://www.researchgate.net/profile/Chin_Chong/publication/4053706_Dynamic_scheduling_I_simulation-based_scheduling_for_dynamic_discrete_manufacturing/links/0deec52a5c1c8a0a56000000/Dynamic-scheduling-I-simulation-based-scheduling-for-dynamic-discrete-manufacturing.pdf> 10 pages.

Lehtonen et al., Proceedings of the 2003 Winter Simulation Conference, "Simulation-Based Finite Scheduling at Albany International", retrieved from <https://pdfs.semanticscholar.org/71ab/4037976abb74e3874a158892e24254044970.pdf> 7 pages.

HP Development Company; "Reinventing End-to-end Solutions with HP and Our Partners", Product Brochure, Published 2016, 24 pages.

Nov. 7, 2018 Search Report and Written Opinion issued in International Patent Application No. PCT/US2018/041988; 12 pp.

Nov. 7, 2018 Search Report and Written Opinion issued in International Patent Application No. PCT/US2018/041990; 13 pp.

Jan. 21, 2019 Search Report and Written Opinion issued in International Patent Application No. PCT/US2018/041992; 20 pp.

Nov. 7, 2018 Search Report and Written Opinion issued in International Patent Application No. PCT/US2018/042000; 10 pp.

Nov. 28, 2018 Invitation to Pay Additional Fees and, Where Applicable, Protest Fee issued in International Patent Application No. PCT/US2018/041992; 15 pp.

Office Action received for CN Application No. 201880037361.X dated Feb. 26, 2021, 33 Pages. (19 Pages of English Translation and 14 Pages of Official Notification).

Notification of Reasons for Refusal received for JP application No. 2020-500729, dated Jun. 7, 2022, 8 pages. (4 pages of english translation and 4 pages of official copy).

Notification of Reasons for Refusal received for JP application No. 2020-500840, dated Jun. 14, 2022, 12 pages. 6 pages of english translation and 6 pages of official copy).

* cited by examiner

WASTE DETERMINATION FOR GENERATING CONTROL PLANS FOR DIGITAL PRE-PRINT PAPER, SHEET, AND BOX MANUFACTURING SYSTEMS

CROSS REFERENCE TO RELATED APPLICATIONS

This application claims priority to and is a continuation of U.S. Nonprovisional patent application Ser. No. 16/826,625, entitled "Engine for Generating Control Plans for Digital Pre-Print Paper, Sheet, and Box Manufacturing Systems", filed Mar. 23, 2020; which claims priority to and is a continuation of U.S. Nonprovisional patent application Ser. No. 16/033,344, entitled "Engine for Generating Control Plans for Digital Pre-Print Paper, Sheet, and Box Manufacturing Systems", filed Jul. 12, 2018; which claims priority to U.S. Provisional Patent Application No. 62/649,942, entitled "Engine for Generating Control Plans for Digital Pre-Print Paper, Sheet, and Box Manufacturing Systems", filed Mar. 29, 2018; U.S. Provisional Patent Application No. 62/619,998, entitled "Engine for Generating Control Plans for Digital Pre-Print Paper, Sheet, and Box Manufacturing Systems", filed Jan. 22, 2018; U.S. Provisional Patent Application No. 62/597,079, entitled "Engine for Generating Control Plans for Digital Pre-Print Paper, Sheet, and Box Manufacturing Systems", filed Dec. 11, 2017; U.S. Provisional Patent Application No. 62/583,845, entitled "Engine for Creating Orders for Digital Pre-Print, Sheet, and Box Manufacturing Systems", filed Nov. 9, 2017; and U.S. Provisional Patent Application No. 62/532,483, entitled "Digital Pre-Print Paper, Sheet, and Box Manufacturing Systems", filed Jul. 14, 2017, each of which is hereby incorporated by reference in its entirety.

FIELD OF THE INVENTION

Example embodiments of the present invention generally relate to paper, sheet and box manufacturing systems and, more particularly, to generating control plans for digital pre-print paper, sheet and box manufacturing systems.

BACKGROUND

Paper, sheet, and/or box manufacturing systems include many different systems and/or phases to form a finished paper-based product. Some such manufacturing may utilize print systems that print one or more images (e.g., symbols, marketing indicia, product information, etc.) on the product. For example, a roll of web product may pass through a printing press and receive one or more images. Such printing may occur after sheet formation/processing (e.g., after forming a layered corrugate), often being called "post-print". Alternatively, such printing may occur prior to sheet formation/processing (e.g., on a top layer prior to formation of the layered corrugate), often being called "pre-print". Once printed on, the roll of web product can pass through various sheet formation/processing and/or finishing systems to ultimately form the finished paper-based product.

BRIEF SUMMARY

Embodiments of the present invention provide systems for generating control plans for rolls of web product that are used to control manufacturing processes for paper-based products. While some of the description herein of example embodiments focuses on corrugated box manufacturing, some embodiments of the present invention are contemplated for extension into other product manufacturing, including other paper-based product manufacturing, such as folded carton, beverage, labels, flexible paper, industrial bags, plates, cups, décor, and many others.

Some embodiments of the present invention contemplate a designed platform with various modules that can be used throughout the manufacturing process. For example, one or more controllers can be used to aggregate orders and information to prepare one or more control plans (e.g., reel maps, reel plans, etc.) for processing a roll of web product through the manufacturing process. The control plan may include a set of instructions for operating one or more systems within the manufacturing process to ultimately form the desired finished paper-based product. In such a regard, some embodiments contemplate one or more controllers that can generate and provide a control plan to various devices/systems for performing efficient manufacturing of paper-based products, including corrugated boxes, folded carton, labels, flexible paper, industrial bags, plates, cups, décor, and many others.

In some embodiments, a controller may allow a user to generate a control plan based on available orders. Criteria, such as upcoming deadlines, customers, paper type, paper width, planned/available manufacturing systems, location of manufacturing systems, ink type, color profiles, etc., may be used to filter the available orders. In some embodiments, such criteria may be used to provide suggestions or recommendations for generation of the control plan. Multiple orders can be added to a control plan and certain functions/features can be provided to reduce unnecessary waste. Along these lines, some features may prevent or highlight improper or inefficient combinations of orders and may, in some cases, provide recommendations for fixing the combination of orders or increasing efficiency.

The control plan can be generated using order information gathered from multiple discrete systems. The information may be compiled into one control plan for enabling efficient control and/or operation of various systems during the entire manufacturing process. Further, the compiled information (or various portions thereof) could be formed into one or more different formats that are acceptable to various systems during the manufacturing process (e.g., the printer may require a certain file format with certain information).

In some embodiments, golden image files can be formed and saved for future use, capitalizing on ideal golden image creation times while still enabling high volume and efficient manufacturing. Such golden images can be provided to a vision system to perform quality checks. Depending on the configuration of the control plan and positioning of the orders therein, instructions for the vision system can be provided to match golden images to corresponding lanes of the printing press and proper positions along the control plan.

In an example embodiment, a system for generating a control plan for controlling manufacturing of one or more paper-based products is provided. The system comprises at least one controller configured to receive a request for generation of a control plan associated with a roll of web product for manufacturing one or more paper-based products. The request includes at least one criteria regarding orders for the one or more paper-based products. The controller is further configured to provide a plurality of available orders for paper-based products for selection. Each of the plurality of available orders for selection satisfy the at least one criteria from the request and are associated with order information. The order information for each order comprises information related to completing manufacturing of a desired product associated with the order. The order information is gathered from a plurality of discrete systems. The controller is further configured to receive a selection of an order from the plurality of available orders and generate the control plan associated with the roll of web product. The control plan includes at least the selected order.

In some embodiments, the at least one criteria for the request for generation of the control plan is at least one of an indication of a desired width of the roll of web product or an indication of an available printer for use during manufacturing. The printer is configured to process a maximum width for the roll of web product. Each of the plurality of available orders for selection are able to fit within either the desired width or the maximum width depending on the indicated criteria with the request.

In some embodiments, the at least one criteria for the request for generation of the control plan is at least one of an indication of a desired job type characteristic, order number, or customer.

In some embodiments, the plurality of discrete systems includes at least a graphics planning system and a management information system. The graphics planning system comprises order information related to one or more desired images for the order. The management information system comprises order information related to at least an amount of desired product for the order.

In some embodiments, the at least one controller is configured to provide a ready status for each of the plurality of available orders for selection. The ready status indicates that the order is ready for proceeding with immediate manufacturing in an instance in which at least order information for the order related to printing and sheet formation/processing has been gathered.

In some embodiments, the at least one controller is configured to filter a database of aggregated available orders based on the at least one criteria from the request to determine the plurality of available orders to provide for selection.

In some embodiments, the at least one controller is configured to determine an amount of waste on the roll of web product based on one or more selected orders and provide an indication of the amount of waste. In some embodiments, the at least one controller is configured to determine if the amount of waste satisfies an acceptable waste threshold and provide an indication as to whether the amount of waste satisfies the acceptable waste threshold. In some embodiments, the at least one controller is configured to determine if the amount of waste satisfies an acceptable waste threshold and prevent generation of the control plan in an instance in which the amount of waste does not satisfy the acceptable waste threshold.

In some embodiments, the selected order is a first order. The at least one controller is configured to, in response to receiving the selection of the first order determine a remaining width of the roll of web product that is available for one or more orders and provide a second plurality of available orders for selection. Each of the second plurality of available orders for selection are able to fit within the remaining width on the roll of web product. In some embodiments, the at least one controller is configured to provide an indication of one or more recommended orders from the second plurality of available orders for selection. The one or more recommended orders are determined based on one or more factors associated with the first order. The one or more factors associated with the first order include at least one of deadlines, customers, color profiles, and manufacturing locations. In some embodiments, the at least one controller is configured to determine that an available sheet formation/processing system planned for use with the roll of web product that can accommodate a plurality of lanes prior to providing the second plurality of available orders for selection. In some embodiments, the at least one controller is configured to receive input indicating a desire to split the selected first order into two or more ribbons for the control plan. In some embodiments, the at least one controller is configured to receive a selection of at least one second order and provide an optimization up or down function for enabling the overall number of sheet or box structures for at least one of the selected first order or the selected second order to be reduced or increased in order to cause an overall length of the roll of web product being used for the selected first order to better align with an overall length of the roll of web product being used for the selected second order. In some embodiments, the at least one controller is configured to provide a recommendation for optimization up or down based on a customer associated with at least one of the selected first order or the selected second order being willing to receive extra sheet or box structures.

In some embodiments, the at least one controller is configured to, in response to receiving a selection of an order, provide a suggested width for the roll of web product to minimize a remaining unused width of the roll of web product that is available after including the selected order.

In some embodiments, the at least one controller is configured to provide an indication of one or more recommended orders from the plurality of available orders for selection, wherein the one or more recommended orders are determined based on one or more factors, wherein the one or more factors include at least one of upcoming deadlines, customers, and manufacturing locations.

In some embodiments, the selected order includes order information corresponding to a total number of desired sheet or box structures and a desired layout for a processing set of sheet or box structures. Each processing set of sheet or box structures includes a plurality of sheet or box structures that are positioned relative to each other to form the processing set of sheet or box structures. The at least one controller is configured to determine, based on the selected order, a number of sets of sheet or box structures to apply to the control plan to satisfy the total number of desired sheet or box structures for the selected order.

In some embodiments, the at least one controller is configured to determine a size of a web weave to apply to each width end of the roll of web product for the control plan.

In some embodiments, the at least one controller is configured to present a visual representation of the roll of web product with the at least one selected order applied.

In some embodiments, the at least one controller is configured to provide a preview of the roll of web product after printing.

In some embodiments, the at least one controller is configured to generate a label based on the control plan. The label is configured to be applied to the roll of web product. In some embodiments, the label includes at least one computer readable marking that, upon being read, at least one of identifies the control plan or supplies the control plan.

In some embodiments, the at least one controller is configured to form a set of printing instructions to enable operation of the printer according to the control plan, wherein the set of printing instructions are formed into a format that is acceptable to the printer. In some embodiments, the set of printing instructions include instructions regarding a color profile needed by the printer to print desired images for the control plan. In some embodiments, the set of printing instructions include instructions that cause the printer to perform one or more test jobs prior to beginning a production run. In some embodiments, the set of printing instructions include instructions that cause the printer to prepare one or more golden images for use during one or more quality checks. In some embodiments, the set of printing instructions include instructions that cause the printer to prepare the one or more golden images during a separate golden image processing run. In some embodiments, the set of printing instructions include instructions that cause the printer to prepare the one or more golden images during the production run at a specific position within an order on the control plan.

In some embodiments, the at least one controller is configured to form a golden image file that includes one or more golden images for use during one or more quality checks for at least the selected order for the control plan. In some embodiments, the at least one controller is configured to provide the golden image file to a vision system that performs the one or more quality checks. In some embodiments, the at least one controller is configured to enable access to the golden image file by a vision system that performs the one or more quality checks. In some embodiments, the golden image file includes at least one tolerance level associated with the one or more golden images for use by a vision system that performs the one or more quality checks to determine if the checked image is acceptable.

In some embodiments, the at least one controller is configured to form a set of quality check instructions to enable a vision system to perform one or more quality checks. The set of quality check instructions provides access to one or more golden images for use during the one or more quality checks for at least the selected order for the control plan. In some embodiments, the set of quality check instructions includes a separate golden image for performing a quality check on each lane of a multi-lane printing press. In some embodiments, the set of quality check instructions includes a single golden image that is used for performing a quality check on a plurality of lanes of a multi-lane printing press.

In some embodiments, the at least one controller is configured to form a set of sheet formation/processing instructions to enable operation of the sheet formation/processing system according to the control plan, wherein the set of sheet formation/processing instructions are formed into a format that is acceptable to the sheet formation/processing system.

In some embodiments, the at least one controller is configured to track the status of the control plan during the manufacturing process.

In another example embodiment, a graphical user interface for generating a control plan for controlling manufacturing of one or more paper-based products is provided. The graphical user interface being configured to receive a request for generation of a control plan associated with a roll of web product for manufacturing one or more paper-based products. The request includes at least one criteria regarding orders for the one or more paper-based products. The graphical user interface is further configured to provide a plurality of available orders for paper-based products for selection. Each of the plurality of available orders for selection satisfy the at least one criteria from the request and are associated with order information. The order information for each order comprises information related to completing manufacturing of a desired product associated with the order. The order information was gathered from a plurality of discrete systems. The graphical user interface is further configured to receive a selection of an order from the plurality of available orders and generate the control plan associated with the roll of web product, wherein the control plan includes at least the selected order.

In yet another example embodiment, a method for generating a control plan for controlling manufacturing of one or more paper-based products is provided. The method comprising receiving a request for generation of a control plan associated with a roll of web product for manufacturing one or more paper-based products. The request includes at least one criteria regarding orders for the one or more paper-based products. The method further comprises providing a plurality of available orders for paper-based products for selection. Each of the plurality of available orders for selection satisfy the at least one criteria from the request and are associated with order information. The order information for each order comprises information related to completing manufacturing of a desired product associated with the order. The order information is gathered from a plurality of discrete systems. The method further comprises receiving a selection of an order from the plurality of available orders and generating the control plan associated with the roll of web product, wherein the control plan includes at least the selected order.

DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 12 shows the control plan of FIG. 10, wherein the first order was split into two ribbons, in accordance with example embodiments described herein;

FIG. 14 illustrates the control plan generated from selection of a different width of paper, wherein a waste amount for the control plan is indicated, in accordance with example embodiments described herein;

FIG. 15 illustrates an optimization up/down feature for generation of the control plan, in accordance with example embodiments described herein;

DETAILED DESCRIPTION

Figure 1:
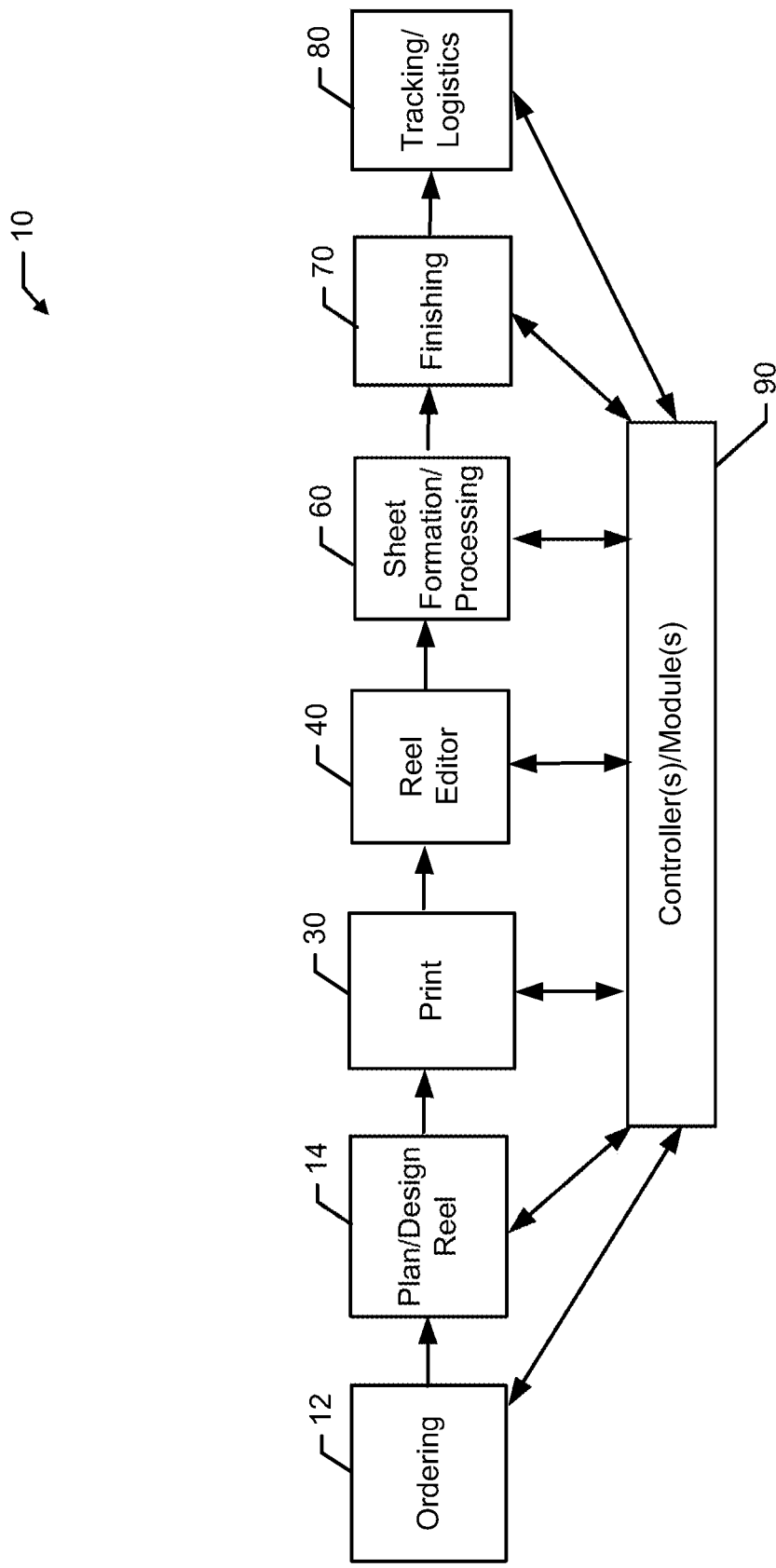
FIG. 1 shows a block diagram of an example paper, sheet, and/or box manufacturing process, in accordance with some embodiments discussed herein.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Example Paper, Sheet, or Box and Other Manufacturing Process

FIG. 1 illustrates an example paper, sheet, or box manufacturing process 10 to form one or more paper-based products, according to various embodiments of the present invention. The manufacturing process 10 includes a number of phases that result in a finished product that is shaped and printed per the customer's order. The process 10 may include an ordering phase 12, a planning phase 14, a print phase 30, a reel editor phase 40, a sheet formation/processing phase 60, a finishing phase 70, and a tracking/logistics phase 80.

Depending on the desired configuration, one or more controller(s) 90 may be used to control one or more various phases (e.g., various systems/devices therein) of the manufacturing process 10. In some embodiments, less or more phases or different orders of phases are contemplated. Some embodiments of the present invention are contemplated for any type of paper, sheet, or box product manufacturing, including printed paper-based product manufacturing, such as corrugate, folded carton, beverage labels, flexible paper, industrial bags, plates, cups, décor, and many others.

In some embodiments, the controller 90 may be configured to control operation of one or more printing presses during the printing phase 30, operation of one or more reel editor(s) for one or more lanes during the reel editor phase 40, operation of various components used during the sheet formation/processing phase 60, and/or operation of various components used during the finishing phase 70. Likewise, the controller 90 may be used with the ordering phase 12 and/or during the tracking/logistics phase 80, such as described herein. In some embodiments, the controller 90 may be spread over any number of controllers at any of the various phases of the manufacturing process 10.

As described in more detail herein, the controller 90 provides logic and control functionality used during operation of various components/phases of the manufacturing process 10. In some embodiments, the functionality of the controller 90 may be distributed to several controllers that each provides more limited functionality to discrete portions of the operation of manufacturing process 10.

The controller 90 may comprise one or more suitable electronic device(s)/server(s) capable of executing described functionality via hardware and/or software control. In some embodiments, the controller 90 may include one or more user interfaces (not shown), such as for displaying information and/or accepting instructions. The controller 90 can be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The controller 90 may include one or more processors coupled to a memory device. Controller 90 may optionally be connected to one or more input/output (I/O) controllers or data interface devices (not shown). The memory may be any suitable form of memory such as an EPROM (Erasable Programmable Read Only Memory) chip, a flash memory chip, a disk drive, or the like. As such, the memory may store various data, protocols, instructions, computer program code, operational parameters, etc. In this regard, controller may include operation control methods embodied in application code. These methods are embodied in computer instructions written to be executed by one or more processors, typically in the form of software. The software can be encoded in any suitable language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software. In this regard, in some embodiments, the controller 90 may be configured to execute computer program code instructions to perform aspects of various embodiments of the present invention described herein.

In the ordering phase 12, a customer may supply an order that includes desired characteristics for the end product. For example, the customer may provide a number of desired sheet, paper, or box structures (including for example labels, cartons, bags, plates, cups, décor, etc.), shape requirements, one or more images/designs for printing on the structures, color specifications, among many others. In some embodiments, the customer may input such an order through a web interface. The web interface may enable the customer to easily input the desired characteristics of the order electronically, such as forming a design for the desired end product(s). The web interface may also enable the customer to perform many related tasks, including, for example, updating orders, tracking orders, handling payment, requesting assistance, setting up automated ordering (e.g., recurring ordering), viewing and approving example images ("soft proofing"), viewing example end products, etc.

In addition to providing increased efficiency of process for the customer, the web interface may also directly interact with and provide information for automated processes useful in the remainder of the manufacturing process 10. For example, the information from the web interface may be fed directly into a controller 90 and utilized accordingly. For example, as described herein, the information from the web interface may be used to form a control plan (e.g., reel map, print plan, process plan, etc.) for a planned roll of web product (such as may be used to form the desired end product(s)). Additionally, however, the information from the web interface may be used to provide on-the-fly updates or adjustments to the manufacturing process. Further, feedback (e.g., from the controller 90) may be provided back to the web interface for the customer, such as tracking information, images of the completed sheet or box structures, among other things.

In some embodiments, the controller 90 may be configured to aggregate received orders, such as in one or more databases.

In some embodiments, the controller 90 (such as during the planning phase 14) may be configured to generate (e.g., form) a control plan associated with a roll of web product. In some embodiments, a control plan may be electronic-based (e.g., an electronic map/plan/table/listing/etc.) that is reference-able for determining how the various components of the manufacturing process 10 should operate—such as to form the desired product through the manufacturing process 10.

In some embodiments, the controller 90 may be configured to generate a control plan associated with a roll of web product for at least one order for the one or more paper-based products from among a plurality of orders. In this regard, each order of the plurality of orders may comprise at least one design for at least one paper-based product, and the design may include one or more printed images (such as for being printed on the desired product).

In some embodiments, the control plan includes one or more sets of order instructions. In some embodiments, each set of order instructions may correspond to a different order that is planned to be manufactured using the generated control plan. For example, a control plan may include a set of first order instructions for forming a first paper-based product from the roll of web product for fulfilling a first order. Additionally, in some embodiments, a control plan may have a second or more sets of order instructions, such as to control manufacturing of additional products. In some cases, depending on the size restrictions of the order and/or the systems used during the manufacturing process, the control plan may be generated such that different orders are positioned or planned to be adjacent to each other in a width direction (e.g., next to each other) on a roll of web product. Additionally or alternatively, the control plan may be generated such that different orders are positioned or planned to run one after the other in a length direction on a roll of web product.

The order instructions for the control plan for each order may include one or more instructions, specification, databases, etc. for enabling control and/or operation of various systems/devices of the manufacturing process 10. For example, the set of first order instructions may comprise first plan instructions for forming one or more first sheet or box structure areas on the roll of web product. Further, the first plan instructions may include one or more printed images for each of the first sheet or box structure areas. Ultimately, in some embodiments, the plan instructions (and other instructions) that form the set of order instructions may be used during the manufacturing process 10 to form the desired product.

In some embodiments, a control plan (such as through the plan instructions) may provide a layout of the order and/or arrangement of sheet or box structure areas on a roll of web product that are to be printed on, formed, and/or cut during the manufacturing process 10. For example, a control plan (e.g., reel map) for the section of web product 220 shown in FIG. 3A may include indications that there should be 4 structures (A, B, C, and D) that are arranged as shown. In some embodiments, the control plan (or a portion thereof) may be representable in visual form, such as to a person (or persons), which may be useful for manually checking the control plan for accuracy, efficiency, and/or operating the corrugator. In some embodiments, electronic verification of such checking could occur either with or without the visual representation of the control plan.

The manufacturing process 10 may also including the printing phase 30. Depending on the desired manufacturing process 10, digital print processes can be used, providing for enhanced image quality. During the printing phase 30, the controller 90 may direct the press digital front end (DFE) and raster image processor (RIP), etc., to print one or more images at specific locations on the web product. In some embodiments, the controller 90 may utilize the control plan to determine where on the web to print the images and/or markers. In some embodiments, the controller 90 may provide the control plan to the printer for operation thereof to cause the printer to print the desired image at an appropriate position on the roll of web product (e.g., within each sheet or box structure area)—thereby forming a roll of printed web product. For example, an image selected by the customer (such as a bottle), may be printed in the center (or other section) of a structure—such as may ultimately be visible for marketing or other purposes once the structure is formed. Any image (including, words, marks, instructions, etc.) is contemplated by various embodiments of the present invention.

In some embodiments, one or more markers can be printed on the web product, including any marker that may be used by various components of the manufacturing process 10, such as for tracking, cutting, printing, etc. Further description regarding possible markers and their utilization is provided in greater detail herein. In this regard, the controller 90 may be connected to one or more vision systems that are used to read or detect color, defects, structure, and various markers for controlling and/or operating various components/phases of the manufacturing process 10.

During the reel editor phase 40, the controller 90 may direct operation of a reel editor to edit (e.g., remove) waste from the roll of printed web product. For example, the controller 90 (such as during the print phase 30 and/or a separate/different phase) may be configured to determine waste that is on the roll of printed web product. Such waste could be unprinted sections of the roll and/or poor quality images/defects in the roll.

In some embodiments, the controller 90 is configured to provide the control plan to at least one reel editor for controlling operation of the reel editor. In such an example embodiment, the control plan may include editing instructions (e.g., within the set of order instructions) to control operation of the reel editor to cause one or more portions of the roll of printed web product to be removed. In some embodiments, the editing instructions may cause the reel editor to slit the roll of web product into more than one child roll (e.g., narrower in paper width) and/or to break the roll of web product into more than one child roll (e.g., narrower in paper roll diameter). Such child rolls may be designed for processing through various manufacturing systems downstream and may, in some instances, assist in tracking and/or order management.

Once edited, the controller 90 may determine and update the control plan to account for any removed waste and/or one or more newly formed child roll(s).

During the sheet formation/processing phase 60, the controller 90 may be configured to perform one or more processes to form and/or process the roll of web product in formation of the desired end product. In some embodiments, the controller 90 may be configured to provide the control plan to at least one sheet formation/processing system for controlling operation of the sheet formation/processing system. The sheet formation/processing system may include one or more systems for the formation/processing of the roll of web product, such as forming the roll of web product into one or more sheets (or structures) that may be utilized in the remainder of the manufacturing process 10.

As used herein, "sheet formation/processing" may refer to any formation or processing of a sheet or structure from a roll of web product, such as for example cutting/forming a rectangular shaped structure that can be, in some embodiments, further processed (e.g., in the finishing phase) to form (or help form) one or more paper-based products. In some embodiments, during the sheet formation/processing phase 60, the roll of web product (or portions thereof) may be formed into additional layered product that can be cut into sheets, such as when processed through a corrugator. In some embodiments, further processing may occur during the sheet formation/processing phase 60 and/or finishing phase 70. For example, the formed sheet may be die-cut, such as during either phase.

In some embodiments, the sheet formation/processing system may include a web forming device that is configured to use the roll of printed web product to form an updated web. The control plan (such as in the set of order instructions) may include web forming instructions to control operation of the web forming device to cause the updated web to be formed. In some example embodiments, the updated web may include additional layers of material (e.g., additional webs for added support, glue, fluting, lamination, etc.). In this regard, the updated web may be used for forming the desired end product.

In some embodiments, the sheet formation/processing system may include at least one cutting arrangement (e.g., one or more cutting devices) that is configured to cut a portion of the roll of printed web product. The control plan (such as in the set of order instructions) may include cutting instructions to control operation of the cutting arrangement to cause one or more sheet or box structures with the printed image therein to be cut from the roll of printed web product. In such an example, the one or more sheet or box structures with the first printed image therein may then be utilized to form the desired paper-based product for fulfilling the order.

Figure 4A:
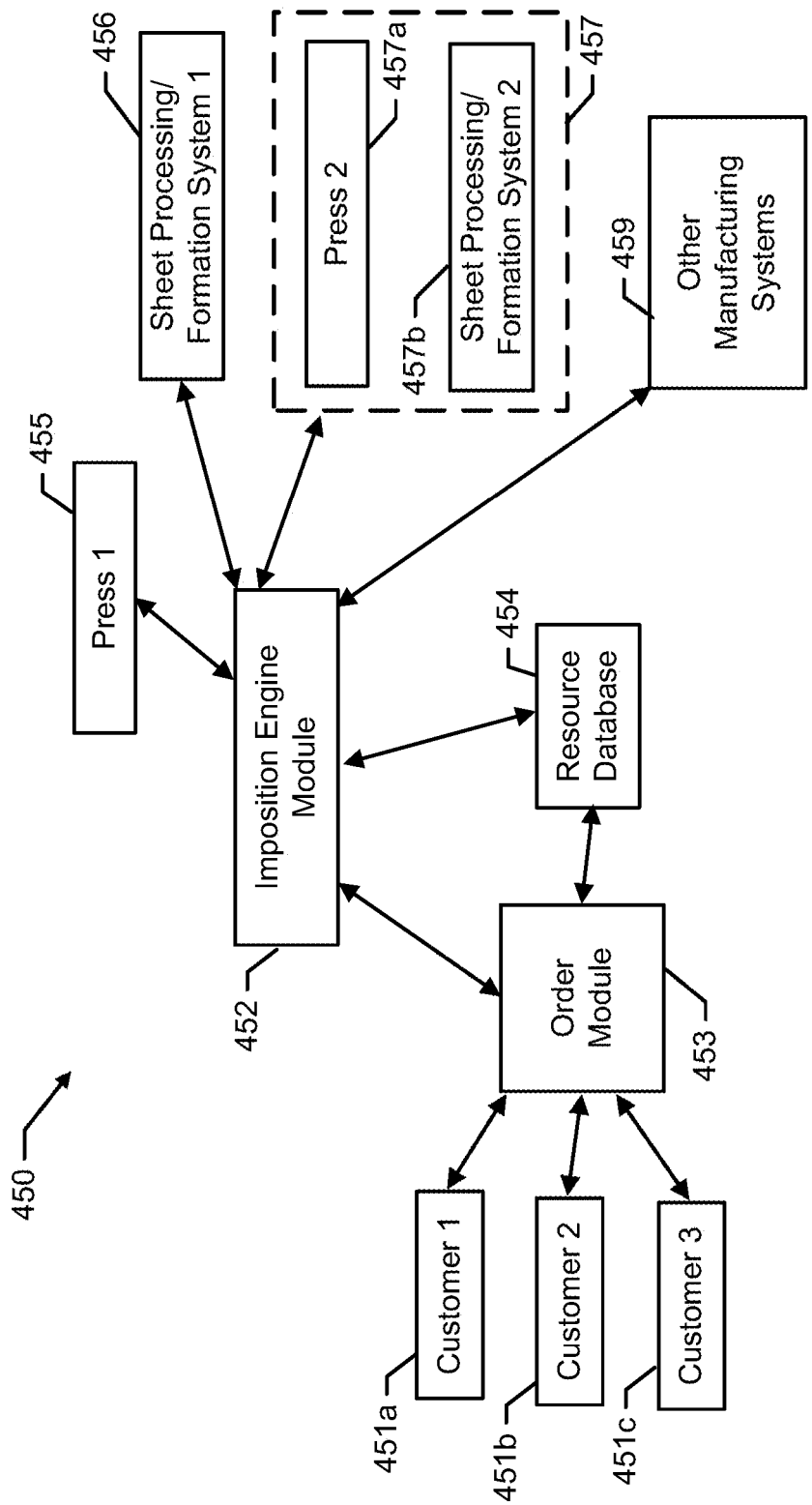
FIG. 4A shows a block diagram of an example paper, sheet, and/or box manufacturing system including an example imposition engine module, in accordance with example embodiments described herein.
Figure 4B:
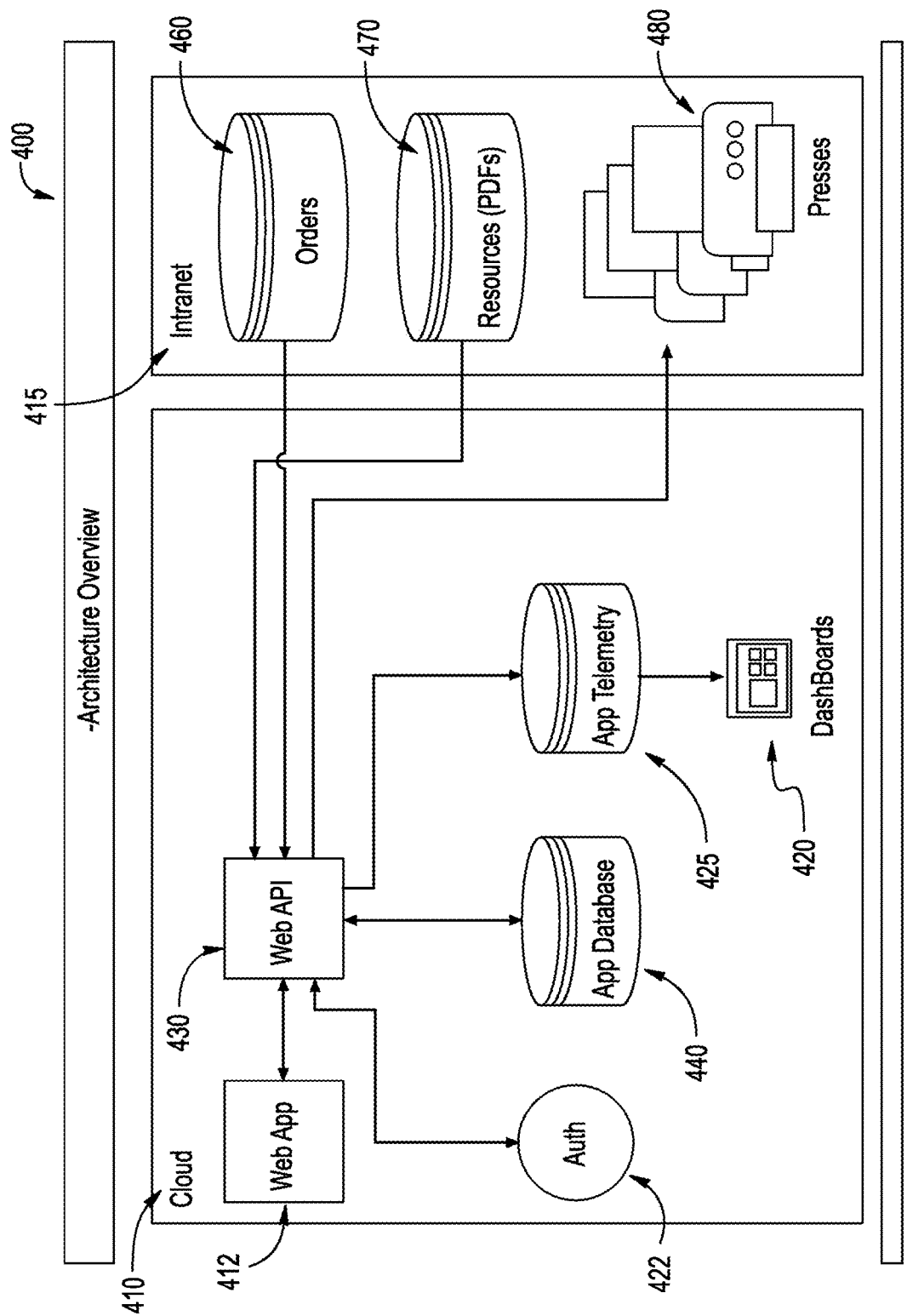
FIG. 4B shows a block diagram of a system for enabling generation of a control plan for a roll of web product for manufacturing, in accordance with example embodiments described herein.

For example, as described in greater detail herein, an example manufacturing process is corrugated box manufacturing and that manufacturing process may include a board making phase and/or cutting phase (see e.g., FIGS. 4A and 4B). In such an example, the board making phase may be performed under operation of one or more web forming devices (e.g., using a corrugator). Additionally, the cutting phase may be performed under operation of one or more cutting devices (e.g., using a corrugator). In some embodiments, other manufacturing processes are also contemplated—providing different sheet formation/processing phases 60, such as for use with carton formation, plate formation, cup formation, bag formation, etc.

Referring back to FIG. 1, with the sheets formed/processed, the manufacturing process 10 may continue to the finishing phase 70. The finishing phase 70 may include additional printing, additional cutting (e.g., die-cutting), additional scoring, additional gluing, and/or other necessary functions to achieve a finished product for sending to the customer.

In some embodiments, the controller 90 is configured to provide the control plan to at least one finishing system for controlling operation of the finishing system. The control plan (such as in the set of order instructions) may include finishing instructions to control operation of the finishing system to cause one or more products to be formed, such as using the sheets from the sheet formation/processing phase.

In some embodiments, the finishing system may comprise a die-cutter for forming a shaped sheet and/or product. In such an example, the finishing instructions from the control plan may cause the die-cutter to cut the sheet and/or roll from the sheet formation/processing phase 60 into a desired shape.

In some embodiments, the finishing system may comprise a folding/gluing device that is configured to fold and/or glue the one or more sheet or box structures for use in formation of the one or more desired products (e.g., folded cartons). In such an example, the finishing instructions from the control plan may cause the folding device to fold and glue the one or more sheet or box structures into the one or more folded cartons.

In some embodiments, the finishing system may comprise a tuber device that is configured to form the one or more sheet or box structures into one or more tubes and/or a bottoming device that is configured to form a bottom for each of the one or more tubes for use in formation of the desired products (e.g., an industrial bag). In such an example, the finishing instructions from the control plan may cause the tuber device to form the one or more sheet or box structures into one or more tubes and the bottoming device to form a bottom of each tube for use in formation of the desired product.

In some embodiments, the finishing system may comprise a cup forming device that is configured to form the one or more sheet or box structures into one or more desired products (e.g., cups). In such an example, the finishing instructions from the control plan may cause the cup forming device to form the one or more sheet or box structures into one or more cups.

In some embodiments, the finishing system may comprise a plate forming device that is configured to form the one or more sheet or box structures into one or more desired products (e.g., paper plates). In such an example, the finishing instructions from the control plan may cause the plate forming device to form the one or more sheet or box structures into one or more plates.

In some embodiments, the controller 90 is configured to determine if the one or more products formed by the finishing system satisfy a particular order. For example, in some embodiments, a vision system or other visual inspection system may be used to confirm accuracy and/or separating of the order(s) during the manufacturing process.

The manufacturing process 10 may also include a tracking/logistics phase 80 that includes tracking the finished sheet or box structures and/or preparing/delivering them to the customer. In some embodiments, one or more tracking or counting systems can be implemented upstream in the manufacturing process 10, such as to enable tracking/logistic planning throughout the manufacturing process 10. In such a regard, in some embodiments, the controller 90 is configured to track one or more webs/sheets/products during the manufacturing process 10. In some embodiments, unique codes based on the product type (e.g., corrugate, folded carton, industrial bag, plate, cup, décor, etc.) may be used to differentiate control plans and manufacturing processes.

Example Platform for Managing Manufacturing

Figure 2:
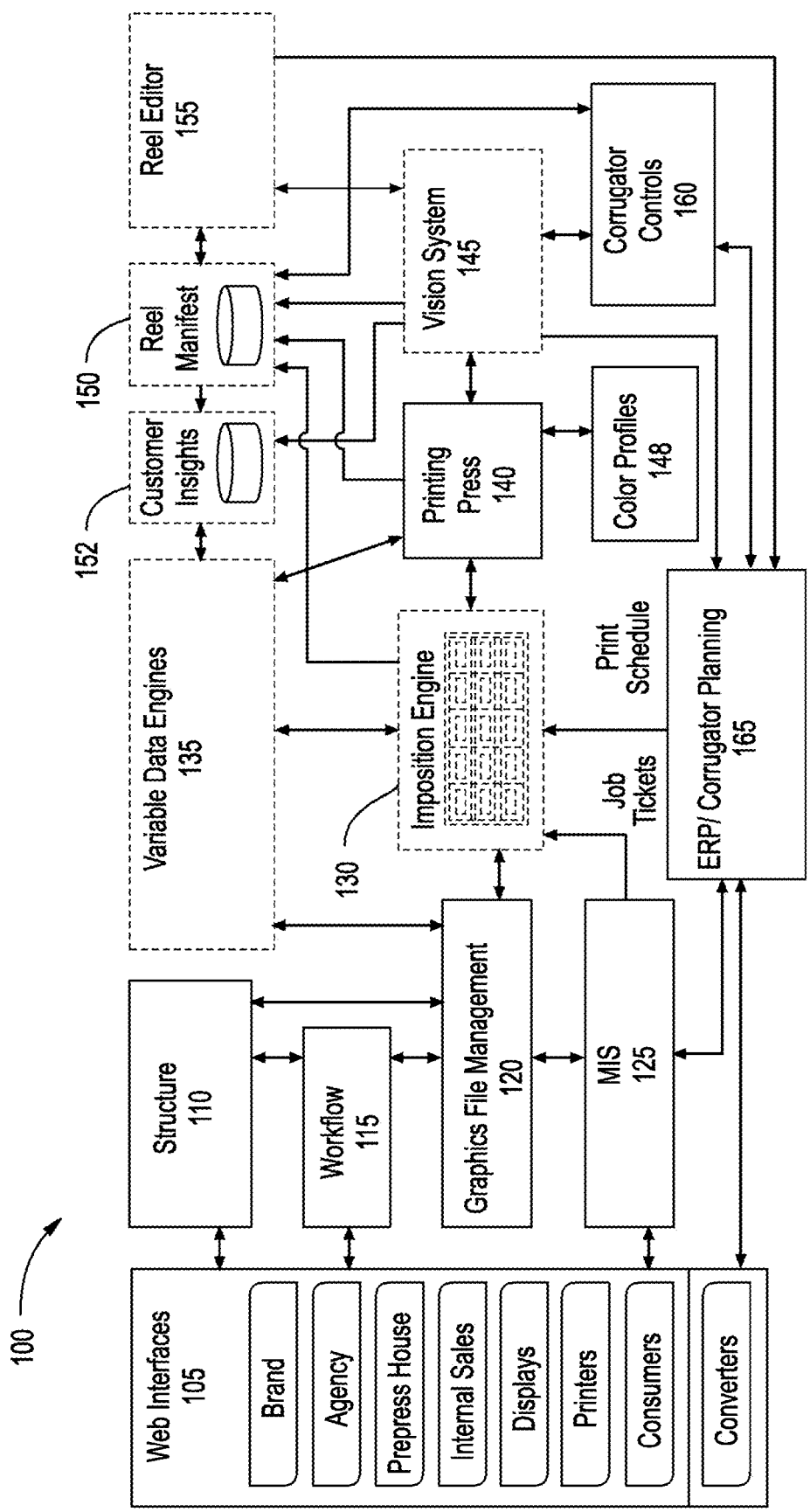
FIG. 2 shows an example platform for various aspects of an example corrugated box manufacturing process, in accordance with example embodiments described herein.

FIG. 2 illustrates an example platform 100 for managing paper, sheet, or box manufacturing according to various embodiments of the present invention. Though some of the following description is provided for example corrugated box manufacturing, some embodiments of the present invention contemplate use of the platform (or various aspects of the platform) for any product manufacturing, such as corrugated boxes, folded carton, beverage containers, labels, flexible paper, industrial bags, plates, cups, décor, and many others.

The platform 100 includes a number of platform modules that interact with each other to form an integrated platform that provides efficient manufacturing processes. In the depicted embodiment, the platform 100 includes a web interface module 105, a structure module 110, a graphics file workflow module 115, a graphics file management module 120, a management information systems (MIS) module 125, an imposition engine module 130, a variable data engine module 135, a press module 140, a color management module 148, a press vision system module 145, a reel manifest module 150, a customer insights module 152, a reel editor module 155, a corrugator controls module 160, and an enterprise resource planning (ERP)/corrugator planning module 165. As described herein, the various modules each contain features that are designed to work together to provide an integrated, efficient platform 100 for manufacturing corrugated sheet or box structures for customers. In some embodiments, the controller 90 may be configured to communicate with and/or control operation of many of the various modules. While the depicted embodiment shows various particular modules, some embodiments of the present invention contemplate many variations, including additional modules and combinations in whole or part of shown modules to form a platform.

The web interface module 105 may be configured to provide for interaction between customers, users, and the platform 100. For example, the web interface module 105 may be configured to provide an interface for a customer to provide information to the platform 100, such as orders, changes to orders, payments, etc. The web interface module may also enable additional features, such as enabling a customer to print samples, upload their own art/images, track orders, among other things. Additionally, however, the web interface module 105 may be helpful for internal use, such as for tracking sales. The internal web interface may display pertinent information to the company, such as trends, etc. The web interface module 105 may communicate, for example, with the structure module 110, the workflow module 115, the management information systems module 125, and/or the ERP/corrugator planning module 165.

The structure module 110 may be configured to enable selection and design of the structures planned for manufacture. For example, the structure module 110 may enable selection of the types of boxes (e.g., the material, number of layers, flute medium, etc.). Additionally, the size and shape of the sheet or box structure may be configured using the structure module 110. In some embodiments, preferred structure specifications may be stored by the structure module 110. Further, rules or other constraints may be communicated to the customer and/or utilized in determination of the sheet or box structure specifications. The structure module 110 may communicate, for example, with the web interface module 105, the workflow module 115, and/or the graphics file management module 120.

The workflow module 115 may be configured to help process the flow of graphics orders and facilitate input of the orders into the structure module 110 and the graphics file management module 120. In this regard, the workflow module 115 may communicate with the web interface module 105, the structure module 110, and/or the graphics file management module 120.

The graphics file management module 120 may be configured to help process the graphics files for use in designing and printing on the sheet or box structures. For example, the graphics file management module 120 may include a repository of available images. Likewise, the graphics file management module 120 may store new images uploaded by the customer. Further, the graphics file management module 120 may include rules or other feature constraints that can be communicated to the customer and/or implemented when forming the orders. The graphics file management module 120 may communicate, for example, with the structure module 110, the workflow module 115, the management information system module 125, the color management module 148, and/or the imposition engine 130.

The management information system module 125 may be configured to store, process, and organize the information for the platform 100. For example, the management information systems module 125 is configured to receive and organize the orders, other customer requests, and internal information from the web interface module 105. Further, the data from the graphics file management module 120, imposition engine module 130, and ERP/corrugator planning module 165 may be stored and organized using the management information systems module 125. The management information systems module 125 may communicate, for example, with the web interface module 105, the graphics file management module 120, the imposition engine 130, and/or the ERP/corrugator planning module 165.

The enterprise resource planning (ERP)/corrugator planning module 165 may be configured to facilitate planning and implementation of the manufacturing process. In this regard, the ERP/corrugator planning module 165 may receive data from various features of the platform 100 and process the information to plan out efficient manufacturing processes across the entire platform. For example, the ERP/corrugator planning module 165 may receive data from the web interface module 105, the management information systems module 125, the press module 140, the vision system module 145, the corrugator controls module 160, and reel editor module 155 to inform planning for future jobs. As an example, the management information systems module 125 may provide order information to the ERP/corrugator planning module 165, which can be utilized to form job tickets for the imposition engine module 130. The ERP/corrugator planning module 165 may also be configured to enable printing of schedules for jobs etc.—which may be used for tracking or other purposes. Such information, for example, may be used to provide information back to the customer, such as through the web interface module 105. The ERP/corrugator planning module 165 may communicate, for example, with the web interface module 105, the management information systems module 125, the imposition engine module 130, the press module 140, the vision system module 145, the reel editor module 155, and/or the corrugator controls module 160.

The imposition engine module 130 may be configured to plan out imposition of print objects (e.g., images or markers) and other variable data on the roll of web product (e.g., corrugated board web). For example, the imposition engine module 130 may gather ready job tickets (e.g., customer orders), such as from the management information systems module 125 and/or ERP/corrugator planning module 165, for imposition across rolls of web of product. Using the job tickets, the imposition engine module 130 may determine layouts for the rolls of web product that minimize waste and improve processes. In order to plan out and finalize impositions, the imposition engine module 130 may receive information from various other modules, such as the graphics file management module 120, the variable data engine module 135, and the reel manifest module 150.

In some embodiments, the imposition engine module 130 may provide the ability to test roll layouts and finalize acceptable roll layouts. In this regard, formation of the layouts may be optimized based on many different factors, including, for example, roll/sheet/finished box requirements, press limitations, downstream corrugation, die-cut optimization, among other things. After finalization, the imposition engine module 130 may be configured to pass the imposed layout to the press module 140 for printing.

The imposition engine module 130 may communicate, for example, with the graphics file management module 120, the management information systems module 125, the ERP/corrugator planning module 165, the variable data engine module 135, the reel manifest module 155, and the press module 140.

In some embodiments, the imposition engine module 130 may be configured to enable a user to form a control plan that may include instructions for operation of various systems of the manufacturing processes (e.g., the corrugator, printer, reel editor, etc.). In some such embodiments, the imposition engine module 130 may provide suggestions and/or automate formation (or portions thereof) of the control plan. For example, various orders from customers may be submitted. The imposition engine module 130 may be configured to receive the orders and store and/or gather specific order information regarding the orders (e.g., number of boxes, box types, quality requirements, printing information, order timeline, type of paper, width and length requirements, customer information, etc.). The imposition engine module 130 may be configured to utilize such order data to enable optimization of an upcoming control plan for a roll of web product, such as to minimize waste, meet order deadlines, utilize similar printing techniques, colors, or other capabilities. For example, similar orders may be "imposed" on a roll of web product according to a control plan.

In some embodiments, the imposition engine module 130 may be configured to provide an interface (or information to an interface) to enable a user to form one or more control plans. In such example embodiments, a user may select available orders for filling out the control plan(s). The imposition engine module 130 may provide recommendations based on any number of factors, including, for example, number of boxes, box types, quality requirements, printing information, order timeline, type of paper, width and length requirements, customer preferences, location of manufacturing facilities, etc. In some embodiments, the recommendations may be provided with an aim to reduce waste. Other possible considerations include meeting customer needs or manufacturing capabilities/preferences.

In some embodiments, the imposition engine module 130 may be configured to test (e.g., theoretically) one or more possible control plans to confirm that one or more predetermined rules are followed. Such example rules may be related to various limitations, such as paper size, paper quality, printer quality, location of the manufacturing, order size, among many other things. For example, a single customer order may not be split between locations of manufacturing. If an error is found, an error message and possibly a suggestion for revision may be provided to the user. In some embodiments, the imposition engine module 130 may be configured to prevent such creation of a control plan if a rule check is failed.

In some embodiments, the imposition engine module 130 may be configured to optimize an order up or down in quantity, such as to reduce waste. For example, some customer orders may have the ability to receive extra box structures (e.g., exceed the order by 10%). Further, in a multi-lane manufacturing process, it may be desirable to ensure that both lanes of the roll "complete" at the same position, thereby avoiding one of the lanes having wasted webbing. In order to account for this, certain orders may be optimized up or down depending on any customer preferences. As an example, a customer order may allow for exceeding the number of provided box structures by 10%. In that case, if that order is near the end of the roll plan and there is extra space in that lane, the imposition engine module 130 may be configured to "add" more box structures beyond the original order amount (e.g., up to 10%) in order to make sure both lanes complete at or near the same place. In another example, perhaps the order does not allow for excess box structures. In that case, the imposition engine module 130 may be configured cut off the order in a lane in order to have both lanes complete at or near the same place. Then, the imposition engine module 130 may store an indication of an "incomplete" order—which can be provided to a user for planning another roll plan.

In some embodiments, the imposition engine module 130 may take data from many different sources and form a control plan that can be utilized throughout the manufacturing process. In this regard, the imposition engine module 130, in some embodiments, may form one or more file formats that are readable/acceptable by the different stages/machines of the manufacturing process (e.g., the printing press, the corrugator, reel editor, etc.).

In some embodiments, the imposition engine module 130 may be configured to receive feedback from the one or more of the manufacturing processes. For example, the printing press may provide information regarding the control plan that was just printed back to the imposition engine module 130 (e.g., how much waste was created, job information, customer information, ink used, error handling, etc.). Such information can be stored by the imposition engine module 130 and used in various stages of the manufacturing process. For example, the information can be used to optimize future control plans. In some embodiments, a tag/label can be printed with that information and put on the roll for easy access/information gathering.

In some embodiments, the imposition engine module 130 may be configured to provide a job management queue and error/exception handling system for the printing press module 140. For example, in some embodiments the imposition engine module 130 may be configured to determine which control plan to send to which manufacturing system and handle the control plans accordingly. Further, in some embodiments, depending on the feedback received, the imposition engine module 130 may be configured to determine the occurrence of one or more errors or unsatisfactory completion attempts. Accordingly, the imposition engine module 130 may be configured to determine where to send the control plan to fix or redo such work. In some embodiments, the imposition engine module 130 may update the control plan based on the one or more errors or unsatisfactory completion attempts.

In some embodiments, the imposition engine module 130 may be configured to instruct the printing press module 140 to generate golden reference image(s) to be used by the vision system module 145 for comparison. In some embodiments, the imposition engine module 130 may be configured to provide reference to the golden reference image to be used by the vision system module 145 for comparison, such for use during quality checks.

The variable data engine module 135 may be configured to manage markers and other variable data through the manufacturing process. As described herein, some embodiments of the present invention contemplate use of markers for automated control during the manufacturing process, such for automated control/operation of the reel editor. Depending on the configuration of the manufacturing process, different markers or other variable data may be utilized to achieve automated control. The variable data engine module 135 may be configured to track, organize, determine, and report on such markers or other variable data.

In some embodiments, the variable data engine module 135 may be a web-based back-office function that assigns/allocates, references, and/or reports on variable data/marker information utilization. Such a module may enable generation and allocation of group (multi-use) individual barcodes, quick response (QR) codes, watermarks, color markers, and general variable data. In some embodiments, the variable data engine module 135 may assign/allocate variable data/markers by various entities, such as brand, product type, printer type, converter type, corrugator, logistics supply chain, or other factors.

In some embodiments, the variable data engine module 135 may transfer such information to the imposition engine module 130 for imposing on the board or web layout. In some embodiments, downstream information can be provided back to and utilized by the variable data engine module 135, such as information from the vision system module 145, reel editor module 155, corrugator, finishing equipment, logistics control, retailer, brand, and/or customer. Likewise, status updates can be provided to and from the variable data engine module 135.

In some embodiments, the data generated by the variable data engine module 135 may be tracked and utilized for reporting and determination of optimized processes. Further analytics and usage reporting may be generated. Along these lines, such information and learnings may be applicable to manufacturing of other products, such as also contemplated herein.

The variable data engine module 135 may communicate, for example, with the graphics file management module 120, the imposition engine module 130, the customer insights module 152, and the press module 140.

The press module 140 may be configured to print objects (e.g., images and markers) on the roll of web product, such as during the printing phase 30 described herein. Depending on capabilities of the press, different image qualities and efficiencies may be achieved. The press module 140 may be configured to communicate with, for example, the imposition engine module 130, the variable data engine module 135, the reel manifest module 150, the vision system module 145, and the color profiles module 148.

The color management module 148 may be configured to store and provide color profile information for the press module 140. In this regard, the color profiles module 148 may manage specific color profiles for customers, presses, substrates, or other requirements, that are then used by the press during printing. The color management module 148 may be configured to communicate with, for example, the graphics file management module 120 and the press module 140.

The vision system module 145 may be configured to update the graphics file management module 120 to store and access golden reference images for print quality comparison.

The vision system module 145 may be configured to perform many different types of vision (e.g., detection) related functions during the manufacturing process 10. In this regard, the vision system module 145 may be configured for use during the printing process and/or during use of the reel editor or other components of the manufacturing process 10. In describing such an example vision system module 145, some embodiments of the present invention contemplate separating described functions of the vision system module. For example, a portion of the vision system module 145 may be used during the printing process, while another portion of the vision system module 145 may be used in conjunction with operation of the reel editor or other component. Likewise, there may be separate functions performed by separate vision system related components (e.g., a visual inspection system may inspect the sheet or box structures for accuracy and a detector may detect one or more markers). As such, though described as one module, the following description is not meant to limit the structure of the modules of the platform 10, as there may be separate vision related modules as appropriate.

The vision system module 145 may be configured to detect information during the manufacturing process, such as during use of the printing process. In some embodiments, the vision system module 145 may be configured to detect possible defects and/or confirm accuracy of print jobs. In such a regard, high quality can be maintained (e.g., confirming color consistency on orders). For example, the vision system module 145 may detect defects, such as serious banding, print registration color-to-color, spit-on-page issues, bar/QR code scanability, over-print varnish issues.

In some embodiments, the vision system module 145 may be configured to detect information during the manufacturing process 10, including during the printing phase 30, reel editor phase 40, and/or product formation/processing phase 60. For example, the vision system module 145 may detect any defects or issues with the various components of the manufacturing process 10 (e.g., the printer, reel editor, or other component). Additionally, the vision system module 145 may communicate potential issues in real time to the controller 90 to adjust operation to address any issues. By detecting and communicating such issues, the controller 90 may adapt operation to avoid unnecessary waste. Along these lines, in some embodiments, the controller 90 may work with the various modules of the platform 100 to switch production, such as to a different portion of a reel map to avoid down time. In this regard, the vision system module 145 provides for the ability for on-the-fly adjustments during the manufacturing process.

In some embodiments, the vision system module 145 may be configured to detect various markers as the roll of web product progress through various components (e.g., through the printer, reel editor, a corrugator, etc.). Based on the detected markers, the vision system module 145 may provide information to the controller 90 for operation/control accordingly. Further, such information can be used for tracking orders and status.

In some embodiments, photographs (e.g., digital images) can be taken and stored for evidence or additional learning. In some embodiments, the photographs could be automatically provided to the customer for verification and auditing purposes.

The vision system module 145 may be configured to communicate, for example, with the press module 140, the customer insights module 152, the reel manifest module 150, and/or the ERP/corrugator planning module 165.

The customer insights module 152 may be configured to determine insights that may be useful for obtaining efficiencies, such as for a customer. The insights may be related to, for example, trends for customers, trends that the customer may find desirable, suggestions for the customer for future orders, etc. Additionally or alternatively, the insights may be related to achieving efficiencies for preparing product for specific customers. For example, the customer may indicate that certain "defects" are not important or not really defects as recognized by the vision system module 145.

In some embodiments, the customer insights module 152 may track and utilize non-customer specific information, such as for determining general efficiencies of process. For example, the module may track variable data/marker usage, reel map trends and usages, printer data, print head usage, paper waste, etc., such as to help form insights to increase efficient manufacturing processes.

The customer insights module 152 may be configured to communicate with, for example, the variable data engine 135, the vision system module 145, and/or the reel manifest module 150.

The reel manifest module 150 may be configured to store and/or track the process flow (e.g., reel map) for the manufacturing process. The reel manifest module 150 works with the imposition engine module 130 to store the job layouts for operation during the manufacturing process 10. The reel manifest 150 may be checked, such as by the controller 90, to help determine the current position on a reel map—such as in response to receiving a detection (e.g., a marker or a defect) from the vision system module 145. Further, the corresponding information needed to operate the corrugator according to the reel map may be stored at the reel manifest module 150 and provided to the controller 90 so that the controller 90 may operate the corrugator accordingly. The reel manifest module 150 may work with the reel editor module 155 to edit the reel map in real time, such as described herein. The reel manifest module 150 may be configured to communicate with, for example, the customer insights module 152, the imposition engine module 130, the press module 140, the vision system module 145, the corrugator controls module 160, and/or the reel editor module 155.

The reel editor module 155 may be configured to enable editing of the process flow, such as the reel map. In this regard, in some embodiments, the reel editor module 155 interacts with the reel manifest module 150 to update the stored reel map. In some embodiments, the reel editor module 155 may work with the vision system module 145 to identify unnecessary waste, which can be edited from the reel map, such as based on instructions for the controller 90. Such example information can also be provided to the ERP/corrugator planning module 165 to update the reel map and/or for consideration in future jobs. The reel editor module 155 may be configured to communicate, for example, with the reel manifest module 150, the vision system module 145, and the ERP/corrugator planning module 165.

The corrugator controls module 160 may be configured to control operation of the corrugator, such as described herein. In some embodiments, the corrugator controls module 160 may work with one or more cameras/detectors to detect information (e.g., markers or defects) that can be used to control/adjust operation of the corrugator. For example, the cameras/detectors may detect a marker and the corrugator controls module 160 may determine how to operate the corrugator based on the detected marker (and/or the corresponding position of the reel map). Then, based on the determined desired operations, the corrugator controls module 160 may cause operation of the corrugator. For example, the corrugator controls module 160 may cause one or more knives to change position and/or perform a cut. Additional information regarding contemplated control through detection of markers is provided in greater detail herein. The corrugator controls module 160 may be configured to communicate with, for example, the reel manifest module 150, the vision system module 145, and the ERP/corrugator planning module 165.

In some embodiments, other components/machines and their corresponding controls may replace the corrugator, such as components/machines geared toward manufacturing of other products.

Example Structures and Orders for a Roll of Web Product

Figure 3A:
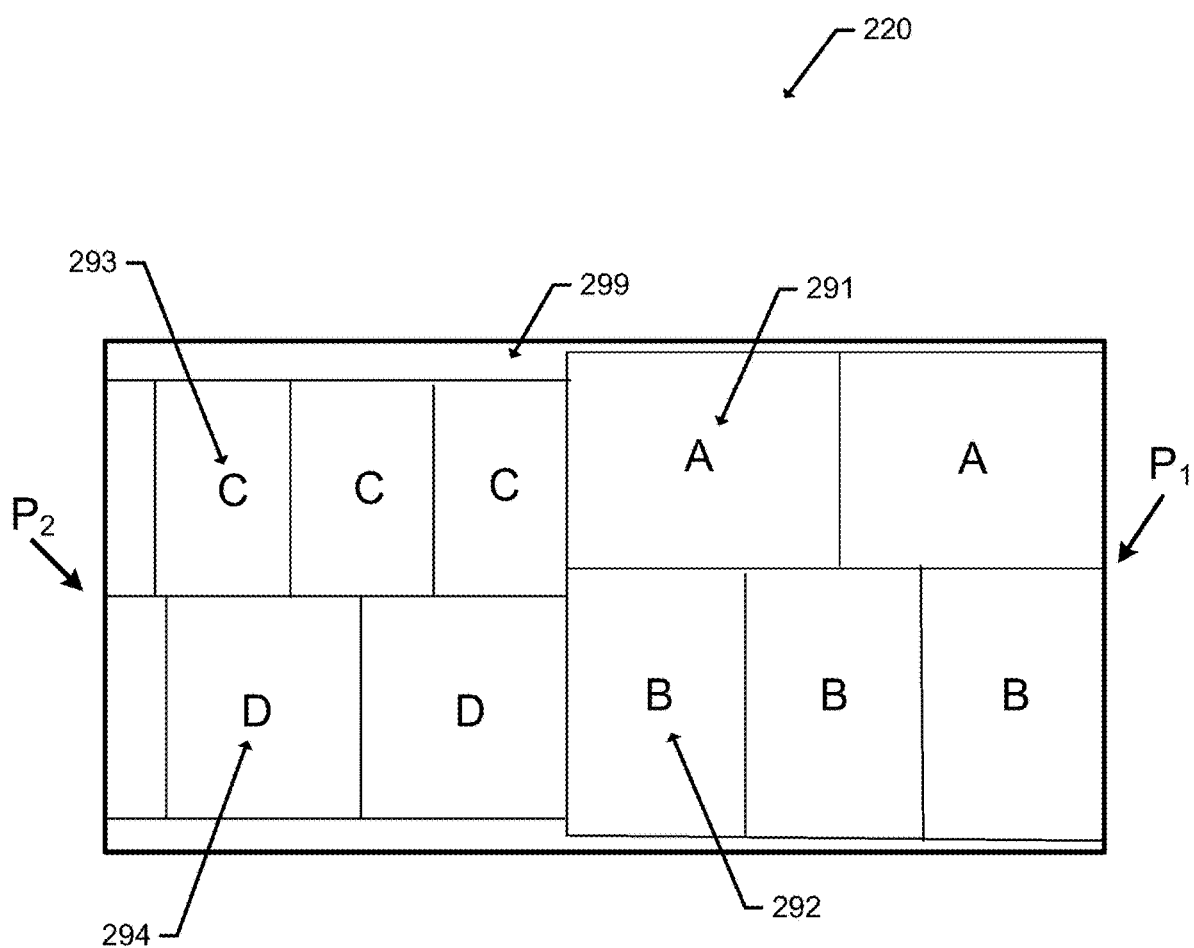
FIG. 3A shows an example portion of a roll of web product with four different structure areas, in accordance with some example embodiments discussed herein.

FIG. 3A shows an example arrangement of structures A, B, C, and D on a roll of web product 220, such as after the printing phase 30, and may, in some embodiments, form a representation of a control plan. Prior to printing, however, the roll of web product is blank such that there is no information thereon. In this regard, the controller 90 operates the various components of the printing phase 30 to form printed images and/or markers on the blank roll of web product to begin forming the desired structures. In the depicted example of FIG. 3A, the portion of the roll of web product 220 includes a number of first structures (A, 291), a number of second structures (B, 292), a number of third structures (C, 293), and a number of fourth structures (D, 294). The roll of web product 220 also includes some unused (scrap) sections 299 and potentially some waste between order changes down web, such as between structures A/B and structures C/D (though not shown in the example of FIG. 3A).

In some embodiments, the present invention contemplates use of a readable marker to enable efficient control and/or operation of various components of the manufacturing process 10. The present invention, in some embodiments, contemplates utilizing one or more markers on the roll of web product that is printed on the press and "read" to enable control of the various components of the manufacturing process 10. By "reading" the marker, the controller 90 can determine how to operate—such as by referring to a control plan associated with the roll of printed web product and determining the position along the control plan by virtue of the read marker. The marker can also be used in tracking the boxes for positioning in proper stacks and/or determining completion status of an order. The present invention contemplates many different types of markers (e.g., QR codes, bar codes, color marks, instructions themselves, etc.).

Figure 3B:
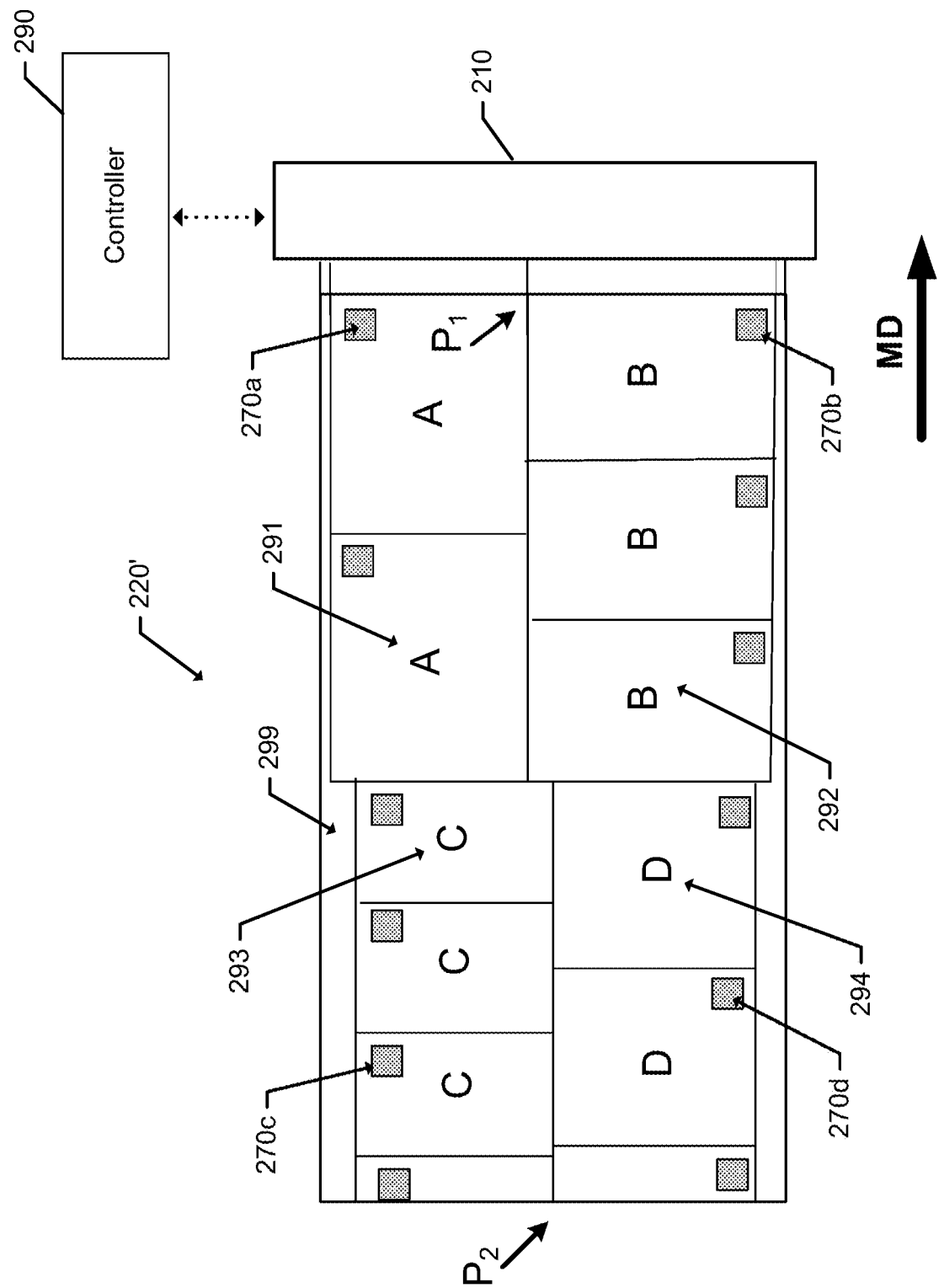
FIG. 3B shows an example portion of a roll of web product, wherein the structure areas each include a readable marker, in accordance with example embodiments described herein.

FIG. 3B illustrates an example portion of a roll of web product 220' that includes readable markers 270*a-d*. Notably, each structure includes a different readable marker. For example, structure A, 291 has a corresponding readable marker 270*a*; structure B, 292 has a corresponding readable marker 270*b*; structure C, 293 has a corresponding readable marker 270*c*; and structure D, 294 has a corresponding readable marker 270*d*. Though the depicted embodiment shows the readable marker positioned within a sheet or box structure, in some embodiments, the readable marker may be positioned in the margins or other waste area, but still associated with the corresponding structure (or order section with the one or more structures).

One or more detectors 210 may be positioned along the pathway through the various components operating for the roll of web product (e.g., a printer, a reel editor, a corrugator, finishing, etc.). In this regard, the one or more detectors 210 may be configured to "read" or detect the marker and provide that information to the controller 290 (e.g., controller 90). The controller 290 may then be configured to automatically control the various components of the manufacturing process 10 accordingly.

Depending on the desired configuration, some embodiments of the present invention contemplate different methods for obtaining information from the readable marker. For example, the readable marker may be a QR code and cause automatic gathering of instructions for how the corrugator should operate based on following a link or other redirection method provided by the QR code. Similarly, other readable markers may cause the controller 290 to use a look-up table or other correlation means to determine how to operate the corrugator. In some embodiments, the marker may include instructions in the marker itself. For example, position coordinates corresponding to a desired position for one or more knives of a corrugator may form part of the marker. In such embodiments, there is no need for a look-up table.

Example Control Plan Generation System(s)

FIG. 4A shows a block diagram of an example paper, sheet, and/or box manufacturing system 450. In the depicted example system 450, customers (e.g., Customer 1 451*a*, Customer 2 451*b*, and Customer 3 451*c*) may submit orders to an Order Module 453 (such as described herein). The Imposition Engine Module 452 may communicate with the Order Module 453 and a Resource Database 454, such as to enable generation of a control plan (such as described herein). The Imposition Engine Module 452 may also communicate with one or more systems of the manufacturing process, such as to gather information/feedback and/or provide instructions (e.g., the control plan or portions thereof). For example, the Imposition Engine Module 452 may communicate with a Press 1 455, a Sheet Processing/Formation System 1 456, an in-line manufacturing system 457 (that includes a Press 2 457*a* and a Sheet Processing/Formation System 2 457*b*), and other Manufacturing Systems 459.

Some embodiments of the present invention provide systems (such as a user interface, including for example a graphical user interface) for generating a control plan for a roll of web product for controlling manufacturing of a paper-based product. Although some of the following described examples detail user generated input and/or overall control plan generation by a user, some embodiments of the present invention contemplate automated generation and/or input as well. In some embodiments, one or more controllers and/or other hardware or software described herein (e.g., controller 90, 590, 790, 890, 990, components of the phases in the described manufacturing processes 10, 510, 710, 810, 910, and/or modules present in the described platform 100) may perform various functions of the system.

FIG. 4B shows an example block diagram of control architecture for various example embodiments of the system 400 for generating a control plan for a roll of web product for controlling manufacturing of a paper-based product. The control architecture of the system 400 comprises cloud-based components 410 and intranet-based components 415, although some embodiments of the present invention contemplate any of the architecture being performed in the cloud and/or intranet.

The cloud-based components 410 include a web application (app) 412, a web API (application program interface) 430, authorization architecture 422, app database 440, app telemetry 425, and dashboards 420. The intranet-based components 415 include orders architecture 460, resources architecture 470, and presses 480 (although additional/different systems of the manufacturing process are also contemplated, such as described herein).

A user may interact with the dashboards 420, such as to generate one or more control plans for a roll of web product (such as described herein). In this regard, the dashboards 420 may be configured to receive information (e.g., the control plan generation interface) from the web API 430, such as through the app telemetry 425. The web API 430 may be configured to check the user's authorization, such as through the authorization architecture 422.

The web API 430 may be configured to gather available orders from the orders architecture 460. Additionally, the web API 430 may be configured to gather order information from various components, such as the orders architecture 460, the resources architecture 470, and/or the app database 440. In this regard, orders for paper-based products may be received and/or stored in the orders architecture 460. Additionally, further information regarding the orders and/or various systems for the manufacturing process may be stored in the resources architecture 470 and/or app database 440. In some embodiments, the various manufacturing systems (e.g., presses 480) may be configured to store further information for completing the manufacturing process.

With order information and the available orders gathered, the web API 430 may be configured to communicate and/or utilize the web app 412 to provide an interface for a user to generate a control plan. Once the control plan is formed, the web API 430/web app 412 may be configured to communicate the control plan or a portion thereof with various systems of the manufacturing process, such as the presses 480.

FIGS. 5-16 illustrate an example process flow using an interface 300 for generating a control plan for a roll of web product, such as according to various example embodiments of systems described herein.

In some embodiments, the system may be configured to receive a request for generation of a control plan associated with a roll of web product for manufacturing one or more paper-based products. For example, a user may initiate a control plan generation procedure using one or more dashboards (e.g., graphical user interfaces).

In some embodiments, the request may include at least one criteria that is used to identify orders for possible inclusion in the control plan. For example, the criteria for the request may include an indication of a desired width of the roll of web product and/or an indication of an available printer, sheet formation/processing system, and/or finishing system for use during manufacturing (e.g., an available press, corrugator, finishing system, etc.). In this regard, in some embodiments, the printer, sheet formation/processing system, and/or finishing system may each be configured to process a maximum width for the roll of web product. Based on such criteria, the system may return available orders for selection, where the orders are able to fit within either the desired width indicated or the maximum width allowed (e.g., from the manufacturing system) depending on the indicated criteria with the request.

Figure 5:
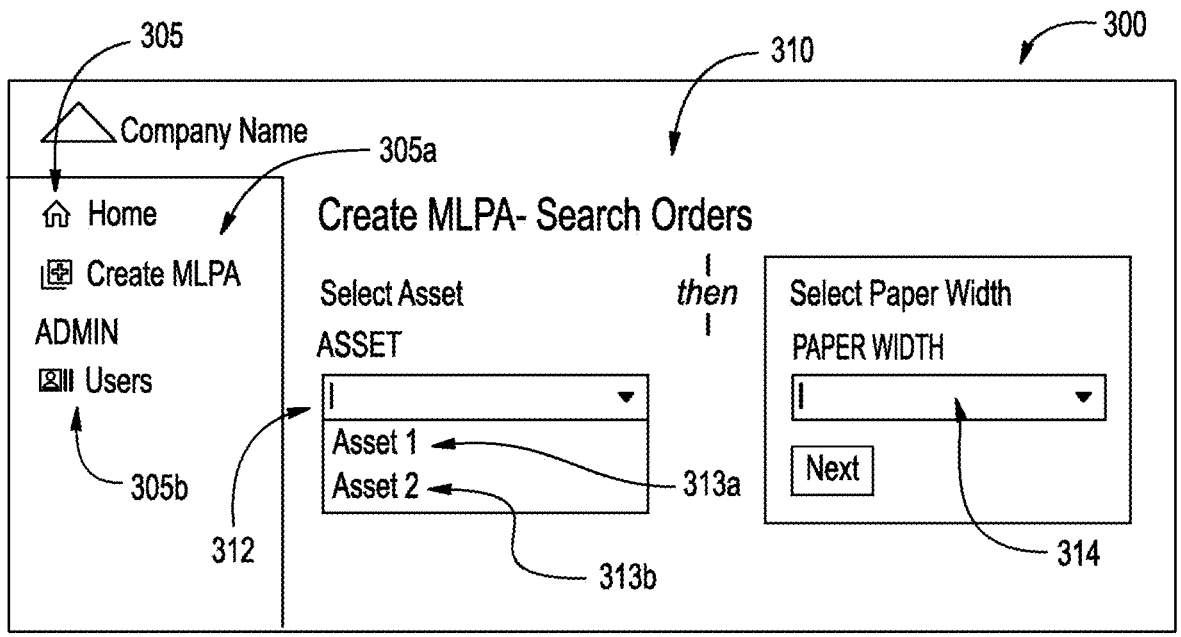
FIGS. 5-7 show an example process for a user to enter criteria for searching for available orders to use in generation of a control plan, in accordance with example embodiments described herein.

FIG. 5 illustrates an example initial request screen 310 for initiating a request to generate a control plan using the interface 300. On the initial request screen 310, a side bar menu 305 may indicate home screen options and/or user information. For example, there may be an option to generate a new control plan 305a. The side bar menu 305 may also indicate the current user 305b.

A user may enter an asset (e.g., a system used during the manufacturing process, such as a printer) at input 312. In the depicted embodiment, the user has used a drop-down menu that shows two options "Asset 1" 313a or Asset 2" 313b. As described herein, each asset may have different limitations or features that may be used by the system to determine which orders can be processed using that asset. Additionally or alternatively, the system may determine one or more component configurations that can be used based on what asset is chosen. For example, Asset 1 313a may enable processing (e.g., printing, corrugation, editing, etc.) on paper up to a certain width (e.g., 60"), whereas Asset 2 313b may enable processing (e.g., printing, corrugation, editing, etc.) on paper up to a certain different width (e.g., 102"). In some embodiments, other component configurations may be affected. For example, Asset 1 313a may only allow one order to be processed due to limited functionality of a sheet formation/processing system (e.g., the corresponding corrugator may only enable one lane for processing). Asset 2 313b may allow more than one order to be processed by a sheet formation/processing system (e.g., the corresponding corrugator may enable multi-lane processing). Although the above description details paper width and lane restrictions, other component configurations may be used by the system for filtering orders and/or allowing generation of a control plan (e.g., color profiles, customer desires, locations, printing capabilities, finishing system capabilities, upcoming deadlines, among many others).

Figure 6:
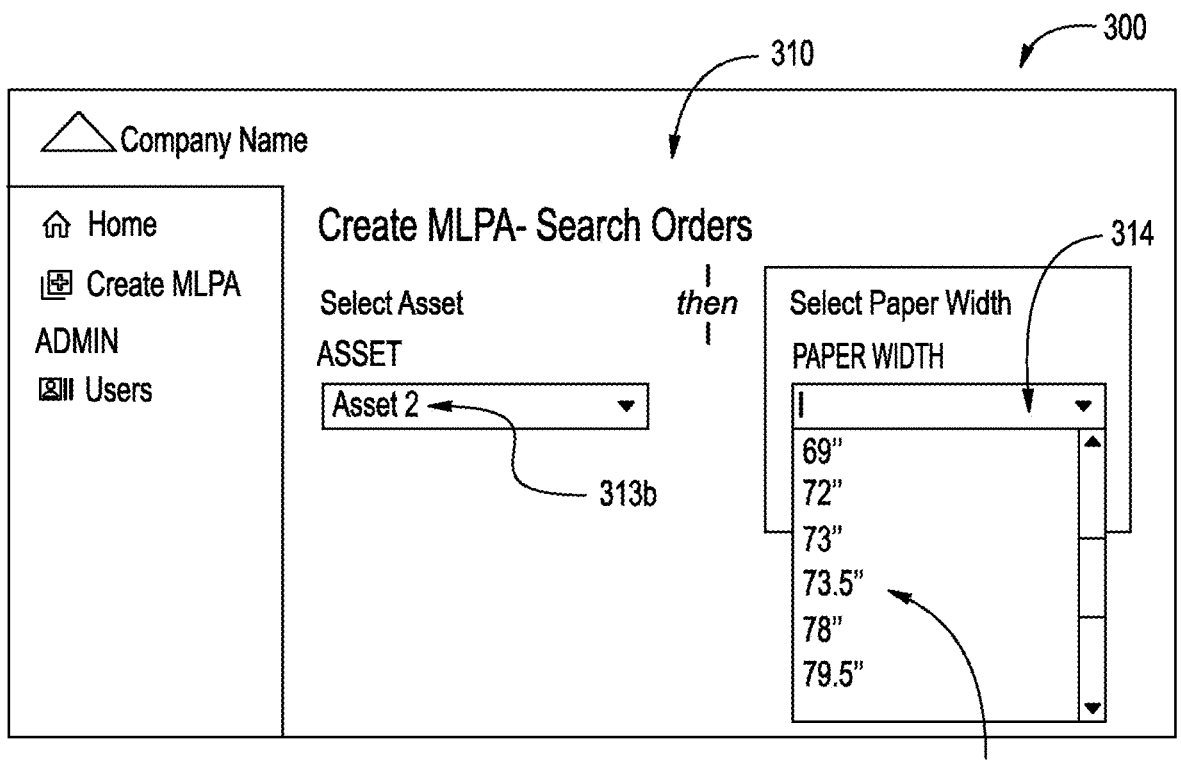

In the depicted embodiment, a user may then enter a specific paper width, such as using line 314. A drop-down menu may also be employed. In some embodiments, selection of the asset may filter available paper width options for a drop-down menu (e.g., the selected asset may only be able to process certain widths of paper). As shown in FIG. 6, a user has selected Asset 2 313b. In response, the drop-down menu 315 for selection of the paper width 314 has been updated to enable selection of paper widths that work with Asset 2 313b. In some embodiments, the available paper widths that are presented could be based on other factors, such as cost, inventory availability, among other things.

Although the above example details entering an asset and then a paper width, in some embodiments, only one of the asset or the paper width may be used to filter available orders for generating a control plan. Likewise, though some of the following description details additional searching for available orders, such criteria (alone or in various combinations) may be applied in addition to or in the alternative to the asset and/or paper width.

In some embodiments, the available orders may be searched and/or filtered using other criteria. For example, such criteria may include job type characteristics (e.g., sheet formation/processing system to use, paper type, additional material type being used (e.g., flute material), coating type, medium type, liner type, etc.), order number, and/or customer. By utilizing one or more such criteria, the number of orders presented for use in generation of the control plan can be reduced and/or highlighted for the user.

Figure 7:
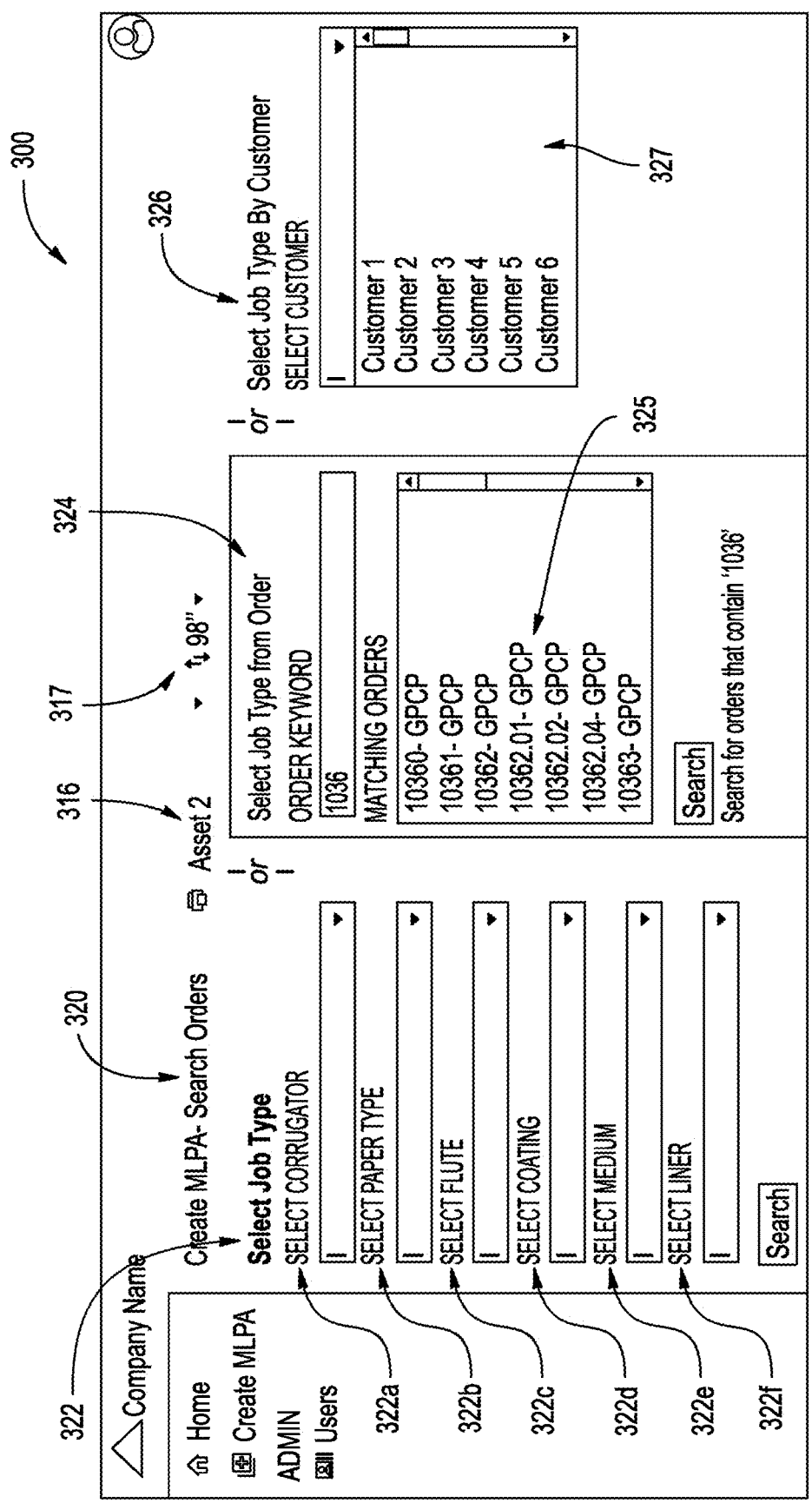

FIG. 7 illustrates an example order search/request screen 320 for generating a control plan using the interface 300. The search/request screen 320 provides a top menu with an indication of the selected asset 316 and paper width 317. Additionally, the search/request screen 320 includes three options for searching for orders (although some embodiments contemplate combinations of the options being used for further customized searching). A user may search using job type characteristics using the "Select Job Type" search 322. Under that option, a user may enter (e.g., add text or select from a drop-down menu) a sheet formation/processing system (e.g., a corrugator) at 322*a*, a paper type at 322*b*, a flute at 322*c*, a coating 322*d*, a medium 322*e*, and/or a liner 322*f*. For a second option, a user may search using an order number using the "Select Job Type from Order" search 324. Under that option, a user may enter (e.g., add text or select from a drop-down menu) an order number. As shown in the depicted embodiment, as the user enters text, the drop-down menu 325 is filtered to match the entered text. For a third option, a user may search using a customer name using the "Select Job Type By Customer" search 326. Under that option, a user may enter (e.g., add text or select from a drop-down menu) a customer, such as from the drop-down menu 327.

In some embodiments, the system may utilize one or more criteria (including any of the above described criteria as well as other criteria such as deadlines, cost, color profiles, maintenance schedule/issues, location of assets, etc.) to form recommendations for available orders for the user to add in generation of the control plan.

In some embodiments, the system is configured to provide one or more available orders for paper-based products for selection by the user to form the control plan. In some embodiments, each of the available orders for selection may satisfy one or more criteria entered by the user (such as described above). As detailed herein, the criteria may be checked against order information associated with each order. For example, the criteria may be used to filter among a plurality of orders that have been aggregated in one or more databases. In this regard, the order information for each order may comprise information related to completing manufacturing of a desired product associated with the order. As detailed further herein, the order information may be gathered from a plurality of discrete systems.

Figure 8:
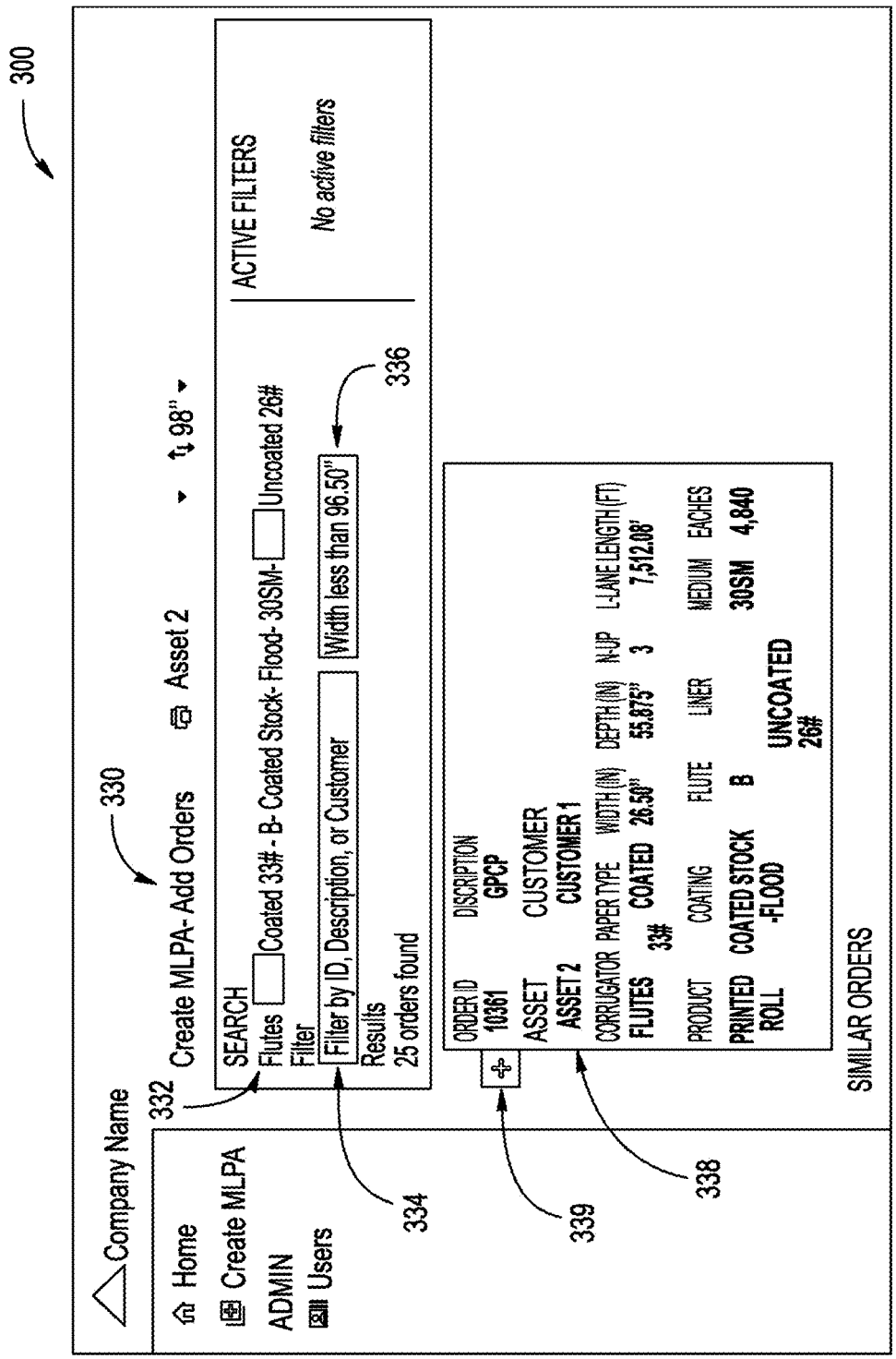
FIG. 8 shows available orders for a user to select in generation of a control plan, in accordance with example embodiments described herein.

FIG. 8 illustrates an example add order screen 330 for generating a control plan using the interface 300. The add order screen 330 provides one or more available orders 338 to add to the control plan, such as using the green plus icon 339. In the depicted embodiment, additional available orders to add may be "hidden" below the first available order and accessible, such as by scrolling down the interface page.

In some embodiments, the system may be configured to show some order information associated with the available order, such as may enable a user to make an informed selection. For example, the available order 338 includes an order ID, a description, an asset planned for use, a customer, a specific corrugator planned for use, a paper type, a paper width requirement, a processing set requirement (e.g., an "N-UP" number), a paper length, a product type, a coating, a flute type, a liner type, a medium type, and a total number of product (e.g., "EACHES") requested. As noted herein, such order information may be gathered from any number of systems.

In some embodiments, the system may be configured to determine if an order is "ready" for proceeding to the manufacturing process. For example, the system may determine if all necessary order information is available. Additionally or alternatively, the determination of whether an order is ready for manufacturing may be based on available materials, systems, documentation, etc. In the depicted embodiment, the green plus icon 339 may provide an indication of the order being ready. In contrast, the icon may present a different color or graphic when the order is not ready for proceeding, such as the yellow icon 339' with a line through a document shown in FIG. 10. Such an icon may indicate that additional information or actions are required prior to that order being considered ready for processing. In such a regard, a user can be aware of whether an order is ready to begin manufacturing before adding it to a control plan.

The depicted add order screen 330 may also include a further search/filter function 332. In this regard, the function 332 may be presented as a separate box with prior entered search terms "Flutes", "Coated 33#", and "Uncoated 26#" indicating that the currently presented orders have matching order information. The user may enter additional order information to filter/search by in line 334. Further, an icon with the text "Width less than 96.50"" 336 may be presented, providing the user knowledge of the remaining amount of paper width available for the control plan. The presented available orders may be able to fit within such a paper width.

Figure 9A:
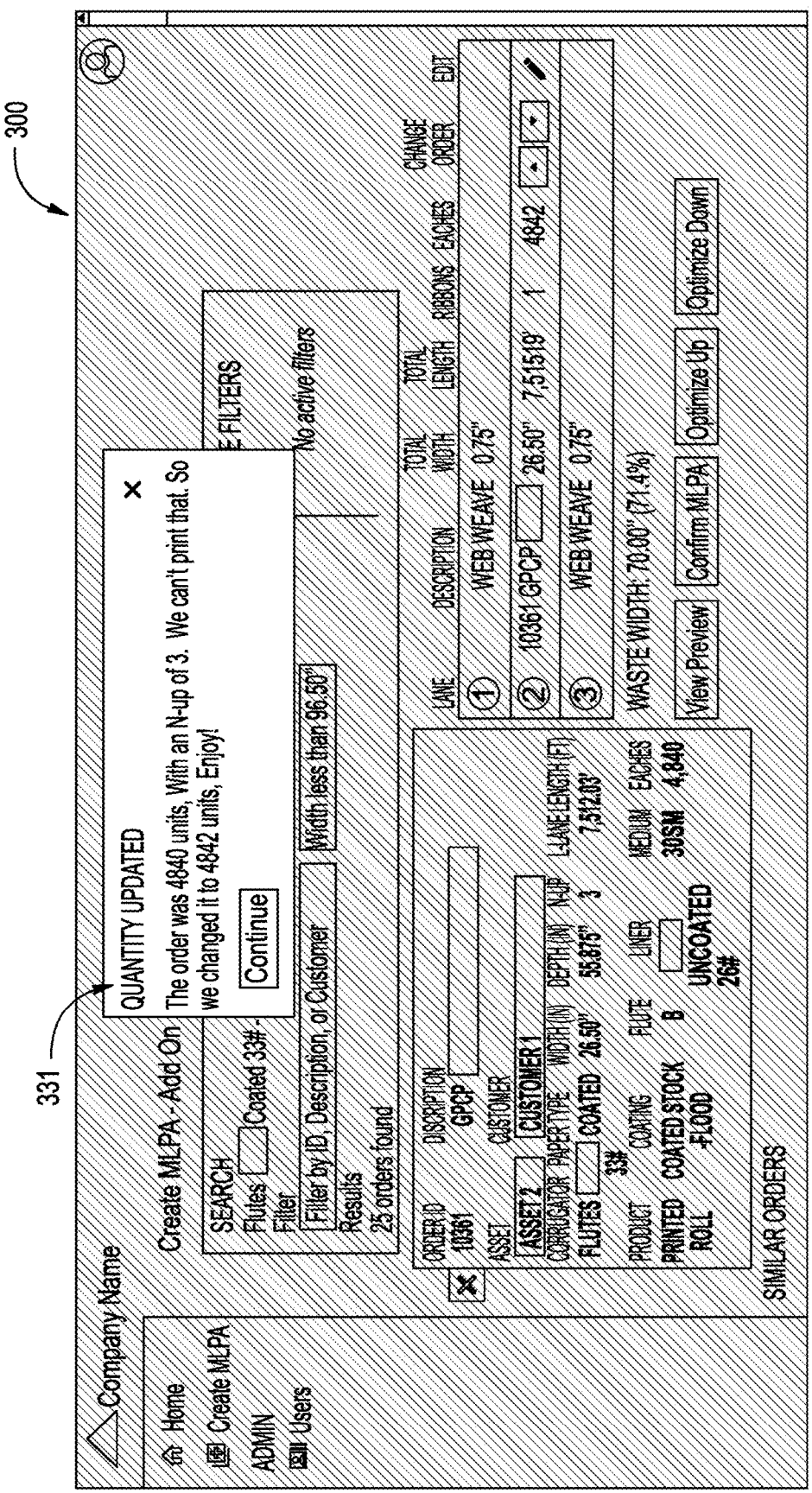
FIG. 9A shows an example pop-up window that indicates that a change has been made to the selected order for the control plan, in accordance with example embodiments described herein.
Figure 9B:
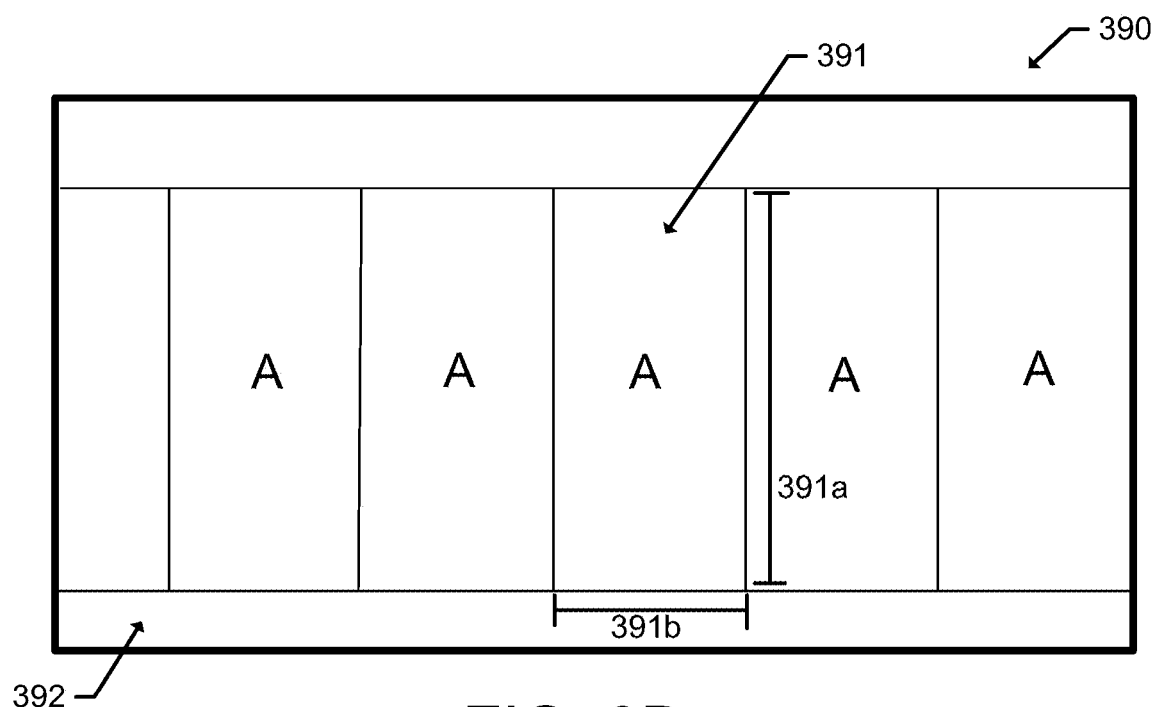
FIG. 9B shows an example portion of a roll of web product with a box structure outline in a first orientation, in accordance with some example embodiments discussed herein.
Figure 9C:
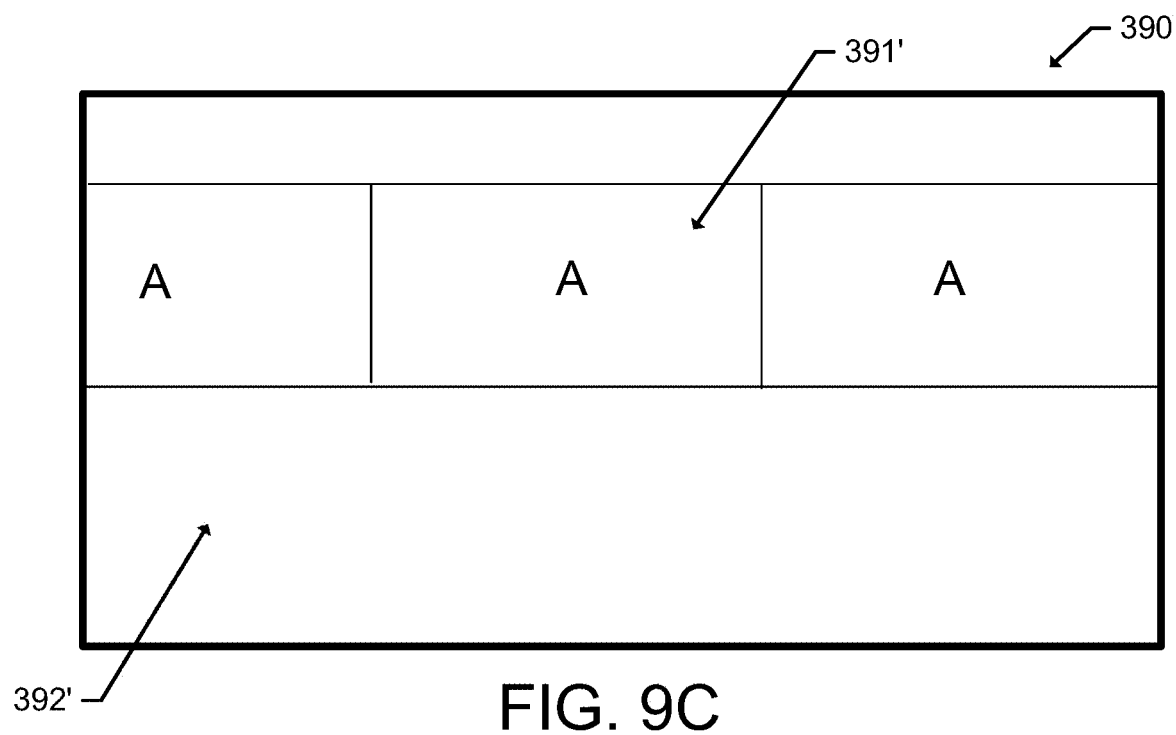
FIG. 9C shows an example portion of a roll of web product with a box structure outline in a second orientation, in accordance with some example embodiments discussed herein.

FIG. 9A illustrates an example pop-up window 331 for the interface 300. In the depicted embodiment, the pop-up window 331 was generated upon selection of the available order 338. The pop-up window 331 indicates that the quantity of product planned for production (e.g., the "EACHES") was updated to add 2 more units. To explain, some orders require a certain processing arrangement for the products as they are manufactured through the various systems. For example, the order may produce a sheet or box structure (e.g., structure "C" 293 in FIG. 3A). However, the order may require three structures of "C" to be processed together to form a processing set of sheet or box structures. With three structures together, the processing set would be "N-UP 3". However, if the total number of desired products (e.g., sheet or box structures) is not divisible in whole by the N-UP number, then the system may be configured to update the overall quantity to ensure that the total desired number of products are manufactured. For example, the order 338 calls for 4840 units, but the N-UP 3 can produce either 4839 (divisible by 3) or 4842 (divisible by 3). In order to reach 4840 units, the system determines the need to produce 4842 units (e.g., 2 extra units).

In some embodiments, a user of the system may change the orientation of a box structure outline for the order. In this regard, in some embodiments, the box structure outline may have a rectangular or other shape with different general length vs. width. For example, with reference to FIG. 9B, the planned box structure outline "A" 391 may have a different length 391*a* vs. width 391*b*. In such a regard, it may be desirable to select which orientation the box structure outline 391 is on the web 390 in order to optimize the layout of the control plan. For example, the extra space 392 below the box structure outlines "A" 391 in FIG. 9B may not allow for another order to be added to the planned web 390. As such, the user may determine that the orientation of the box structure outline should change such that the length 391*a* of the box structure outline 391 is parallel with the length direction of the web 390, such as shown as box structure outline 391' in FIG. 9C. Thus, there may now be more extra space 392' below the box structure outline "A" 391', thereby enabling more orders to be positioned on the web 390.

Figure 10:
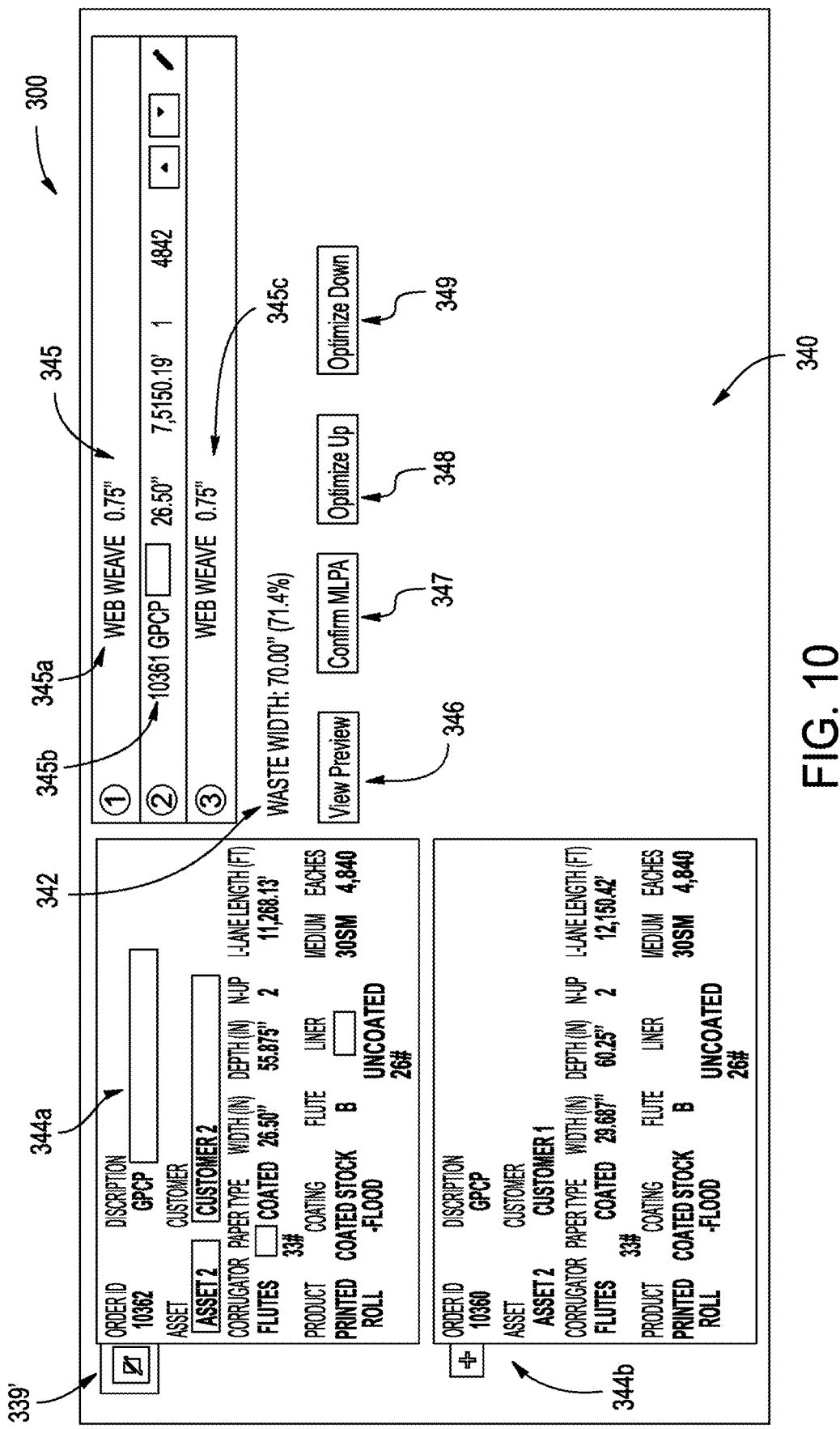
FIG. 10 shows a visual representation of a control plan and available additional orders that may be added to the control plan, in accordance with example embodiments described herein.

Once a selection of an order is received, the system may be configured to update the proposed control plan. In some embodiments, the system may provide a visual representation of the control plan, such as to aid the user in generation of the control plan. For example, FIG. 10 illustrates an example screen 340 for the interface 300 that includes a visual representation 345 of the control plan. The control plan 345 currently includes one order 345b and two web weaves 345a, 345c. The web weaves 345a, 345c may be positioned on the width ends of the roll of printed web product such as to enable processing through the various manufacturing systems. In some embodiments, the system may be configured to determine and include one or more web weaves in the control plan. In the depicted embodiment, the web weaves 345a, 345c are 0.75", although any size web weave is contemplated.

As noted above, the visual representation of the control plan 345 may also show a representation 345b of the recently selected order 338 (from FIG. 8). For example, the order 345b may be presented in a processing lane (e.g., "2") and include order information, such as a description, order number, paper width requirement (e.g., "26.5'''"), a length requirement (e.g., "7,515.19''''"), a number of ribbons, and a number of total produced product. In addition, the depicted embodiment provides a waste width 342 and one or more functions (e.g., "View Preview" 346, "Confirm MLPA" 347, "Optimize Up" 348, and "Optimize Down" 349), such as is described in further detail herein.

In some embodiments, the system may be configured to determine an amount of waste on the roll of web product for the control plan based on the currently selected orders. For example, the waste may be based on the amount of extra space remaining in the width direction on the selected paper width. For example, FIG. 10 shows a waste width of 70.00", which equals the 98" of the selected paper width minus the total width 1.5" of web weaves 345a, 345c and the width 26.50" of the order 345b. In the example embodiment, the system has also calculated the percentage of waste as 71.4% and provided the indication of the amount to the user at 342.

In some embodiments, the system may be configured to determine if the amount of waste satisfies an acceptable waste threshold and provide an indication as to whether the amount of waste satisfies the acceptable waste threshold. For example, the system may determine an acceptable waste threshold of 4% and once reached, provide such an indication to the user. Similarly, in some embodiments, the system may be configured to determine if the amount of waste satisfies an acceptable waste threshold and prevent generation of the control plan in an instance in which the amount of waste does not satisfy the acceptable waste threshold. For example, if the acceptable waste threshold is 4%, then the system at FIG. 10 may prevent finalizing the control plan until the waste is sufficiently reduced (e.g., by adding more orders, splitting the one or more selected orders to multiple ribbons, changing the overall paper width, etc.).

In some embodiments, the system may provide one or more additional available orders for selection. In some embodiments, like the first available orders, the second available orders may satisfy certain criteria. In some embodiments, the system may indicate one or more available orders as recommended orders. In addition to or in alternative to using the previously indicated criteria, the system may take into account order information from the one or more currently selected orders in the control plan. For example, available orders with similar job type characteristics may be recommended (e.g., highlighted, put at the top of the list, etc.). FIG. 10 illustrates two example available orders 344a and 344b. As detailed herein, order 344a is not yet ready for processing and, thus, has a yellow icon 339', whereas order 344b has a green icon since it is ready for processing. For the described example herein, the user selects the order 344b for adding to the control plan.

In some embodiments, the system may be configured to determine that an available printer, sheet formation/processing system (e.g., corrugator), and/or finishing system planned for use with the roll of web product can accommodate a plurality of lanes, such as prior to providing the second plurality of available orders for selection. For example, the selected asset (e.g., Asset 2 and/or a planned sheet formation/processing system) may be configured to allow multiple lanes of production. In such a regard, the system may be configured to determine such an ability and provide additional available orders to add/apply to the available one or more lanes.

Figure 11:
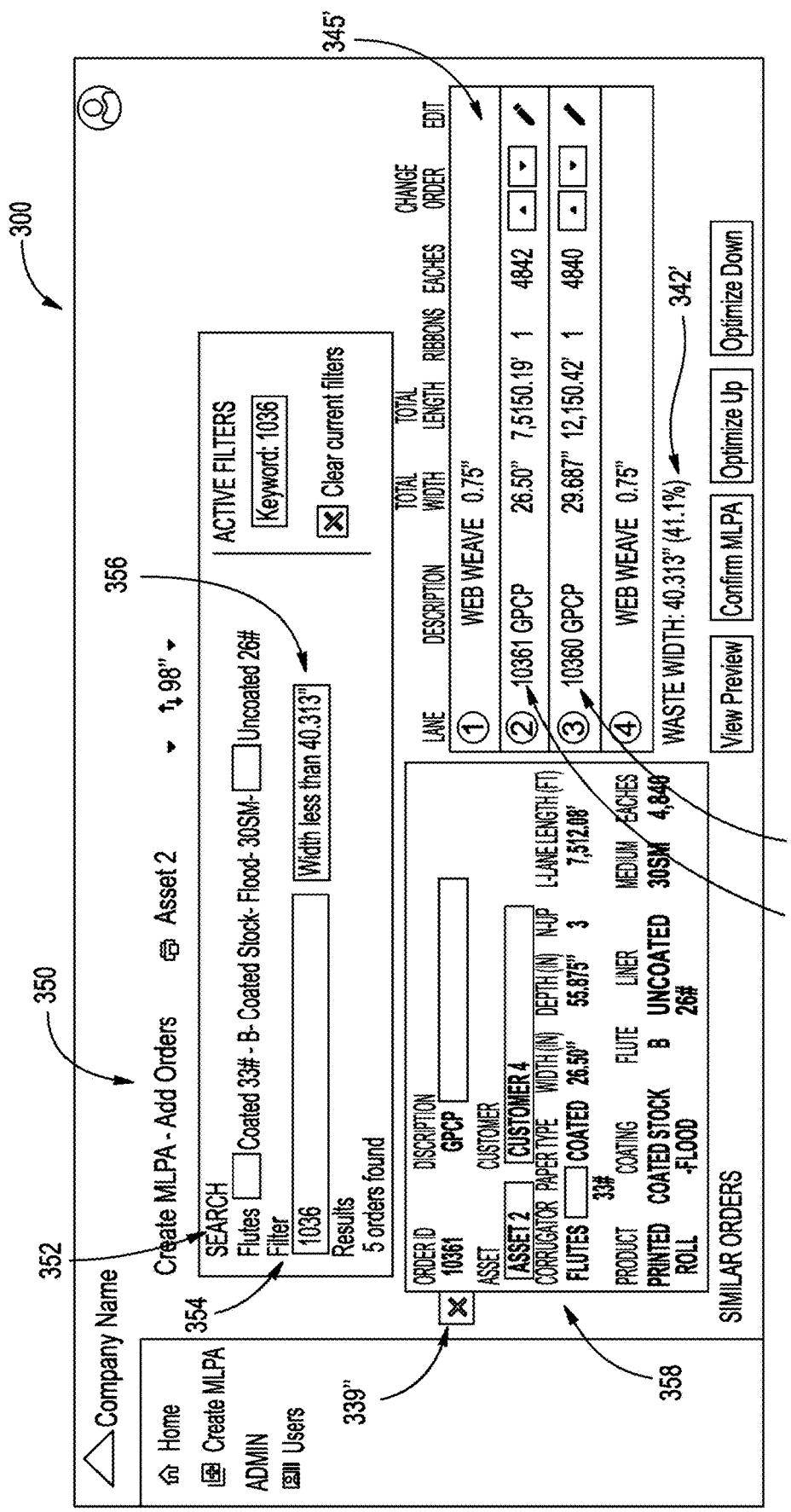
FIG. 11 shows the control plan of FIG. 9A with a second order added and a search feature for locating available additional orders that may be added to the control plan, in accordance with example embodiments described herein.
Figure 13:
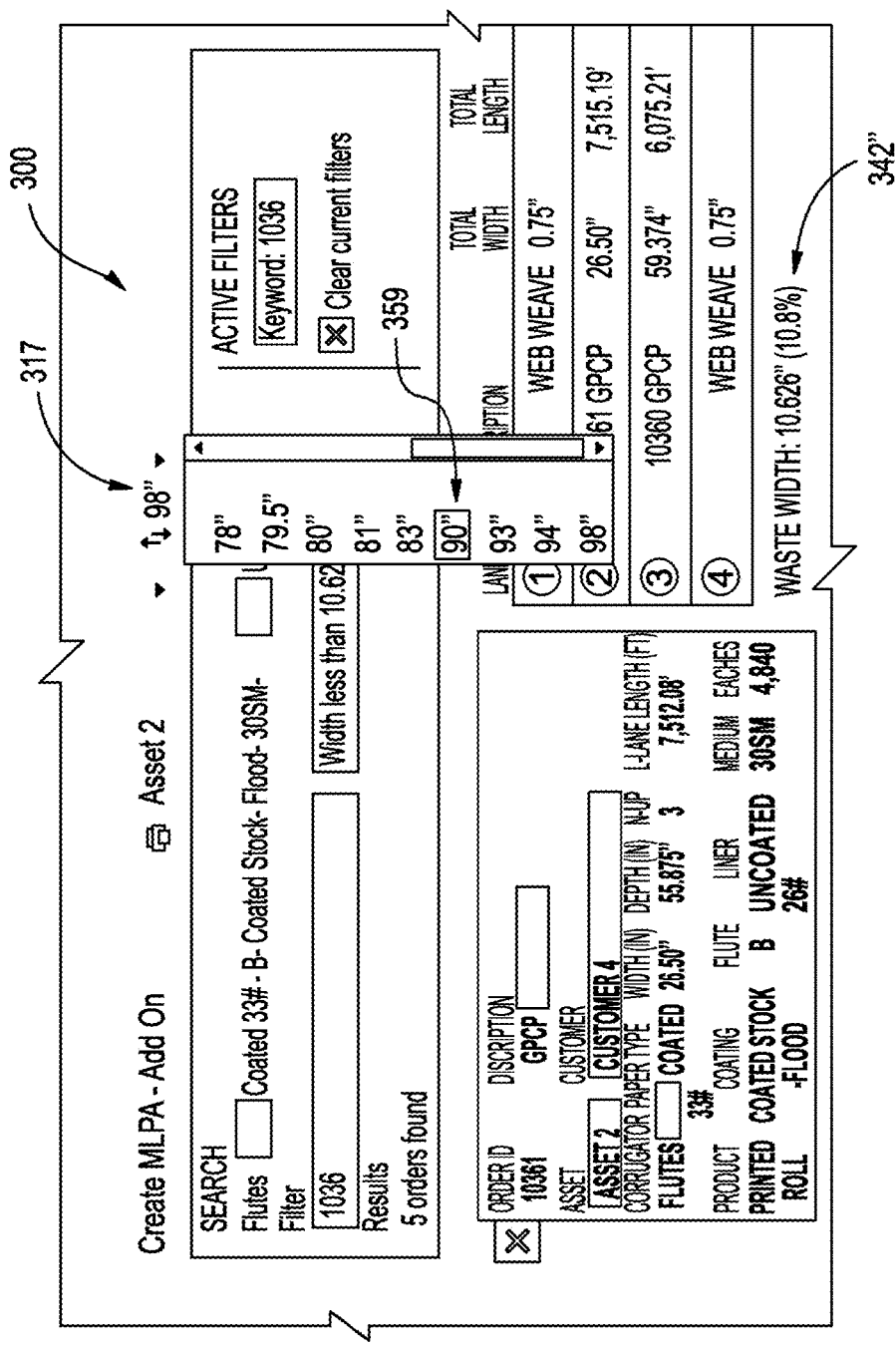
FIG. 13 illustrates selection of a different width of paper for the control plan, in accordance with example embodiments described herein.

FIG. 11 illustrates another example add order screen 350 for the interface 300. Notably, the add order screen 350 includes a visual representation 345' of the control plan that now includes the first selected order 345a' (in lane 2) and the second selected order 345b' (in lane 3). Since the second selected order 345b' added an order with a width of 29.687", the waste width 342' has been updated to 40.313" (41.1%).

With additional waste width remaining, the system has presented an additional search/filter function 352 where the user entered "1036" for an order number. Accordingly, 5 orders were found, one of which is order 358. Notably, order 358 is presented with a red icon 339" indicating that a user is unable to add it to the order 358. In this regard, one or more rules may not be satisfied by order 358. For example, the corrugator that is planned for use may only have two knives, allowing only two lanes of orders to be processed. Instead of or in addition to entering the order number, the user may select the icon 356 that will filter the remaining orders by those that have widths of less than 40.313" (e.g., the waste width).

With reference to FIG. 11, the second order 345b' has a length of 12,150.42", but the first order 345a' only has a length of 7,515.19". This situation would result in waste being run on lane 2 while the remainder of lane 3 was being processed. To explain, the first order 345a' (in lane 2) would complete prior to the second order 345b' (in lane 3), but the roll of web product would still run with nothing in the lane 2 area after the first order 345a' completed. The system may be configured to determine such waste and provide an indication and/or a corresponding recommendation to the user.

Figure 12:
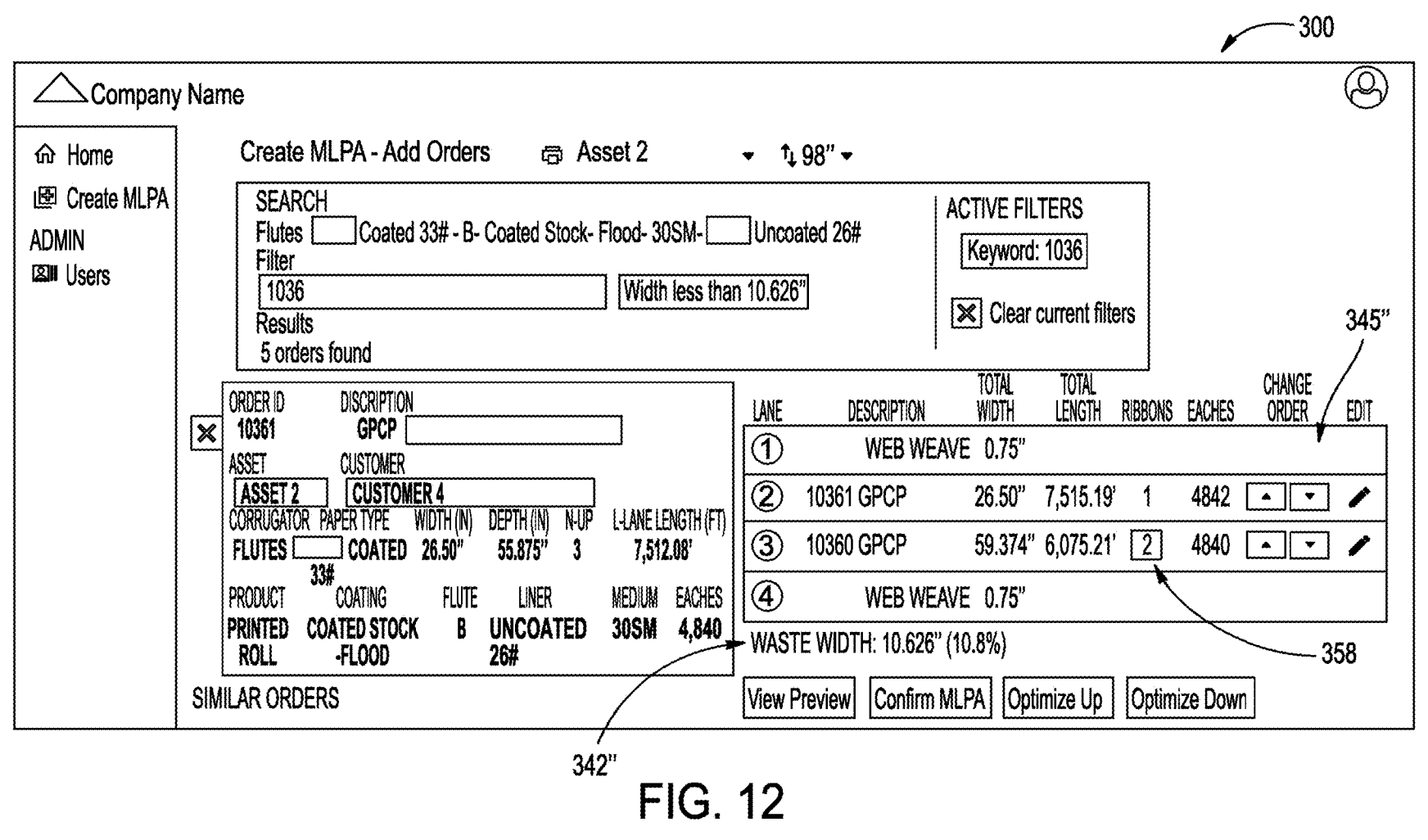

In some embodiments, the system may be configured to enable splitting of an order into one or more ribbons so that the images print side-by-side. Depending on the desired length for the control plan, this feature may be used to minimize waste. For example, FIG. 12 illustrates an updated control plan 345", where the user has changed the second order to 2 ribbons, decreasing the overall length down to 6,075.21". Additionally, however, the width used by the second order was increased to 59.374", which also reduced the waste width 342" to 10.626" (10.8%).

Though the above example describes adding a ribbon, other changes can be made during generation of the control plan to affect the waste width and/or length, such as adding another order, changing the number of desired products (EACHES), changing the length of the order, etc.

Figure 14:
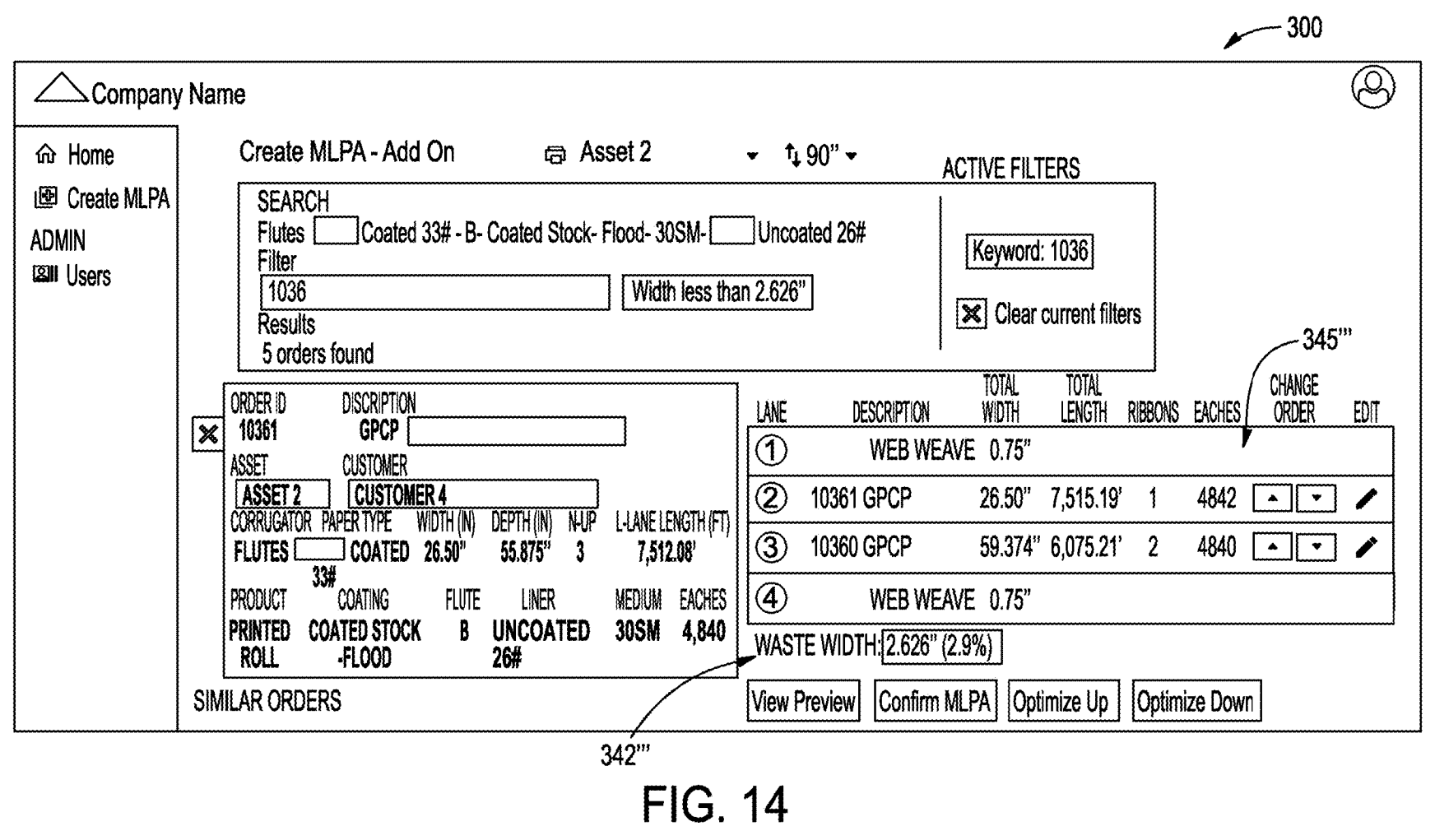

In some embodiments, the system may be configured to adjust the overall paper width for the control plan, such as to account for and/or reduce the waste width. In some embodiments, the system may be configured to, in response to receiving a selection of an order, provide a suggested width for the roll of web product to minimize a remaining unused width of the roll of web product that is available after including one or more selected orders. In some embodiments, the system may have an auto-optimize paper width feature that automatically selects the recommended paper width to reduce waste width. As an example, with reference to FIG. 13, a user has selected a drop-down menu for the overall paper width 317 and selects 90". In the depicted embodiment, the system has highlighted 90" for selection, such as providing a recommendation (e.g., to reduce waste width). Accordingly, FIG. 14 illustrates that the waste width 342''' has been updated to 2.626" (2.9%).

In some embodiments, the system may be configured to enable usage of an optimization up/down feature. In some embodiments, the optimization up or down function may enable the overall number of products for at least one of the selected orders to be reduced or increased in order to cause an overall length of the roll of web product being used for the selected first order to better align with an overall length of the roll of web product being used for the selected second order (and other selected orders if applicable). In some embodiments, the system may be configured to automatically determine which order to optimize and which direction (e.g., up or down) to optimize based on one or more factors, such as a customer's willingness to receive extra product, the printer capabilities, among other things. In some embodiments, as described herein, some customer orders may enable a certain of percentage of product over the requested amount to be provided under the contract. Using such information, the optimization up or down function may be used to further reduce waste (e.g., in the length direction of the roll of web product).

Figure 15:
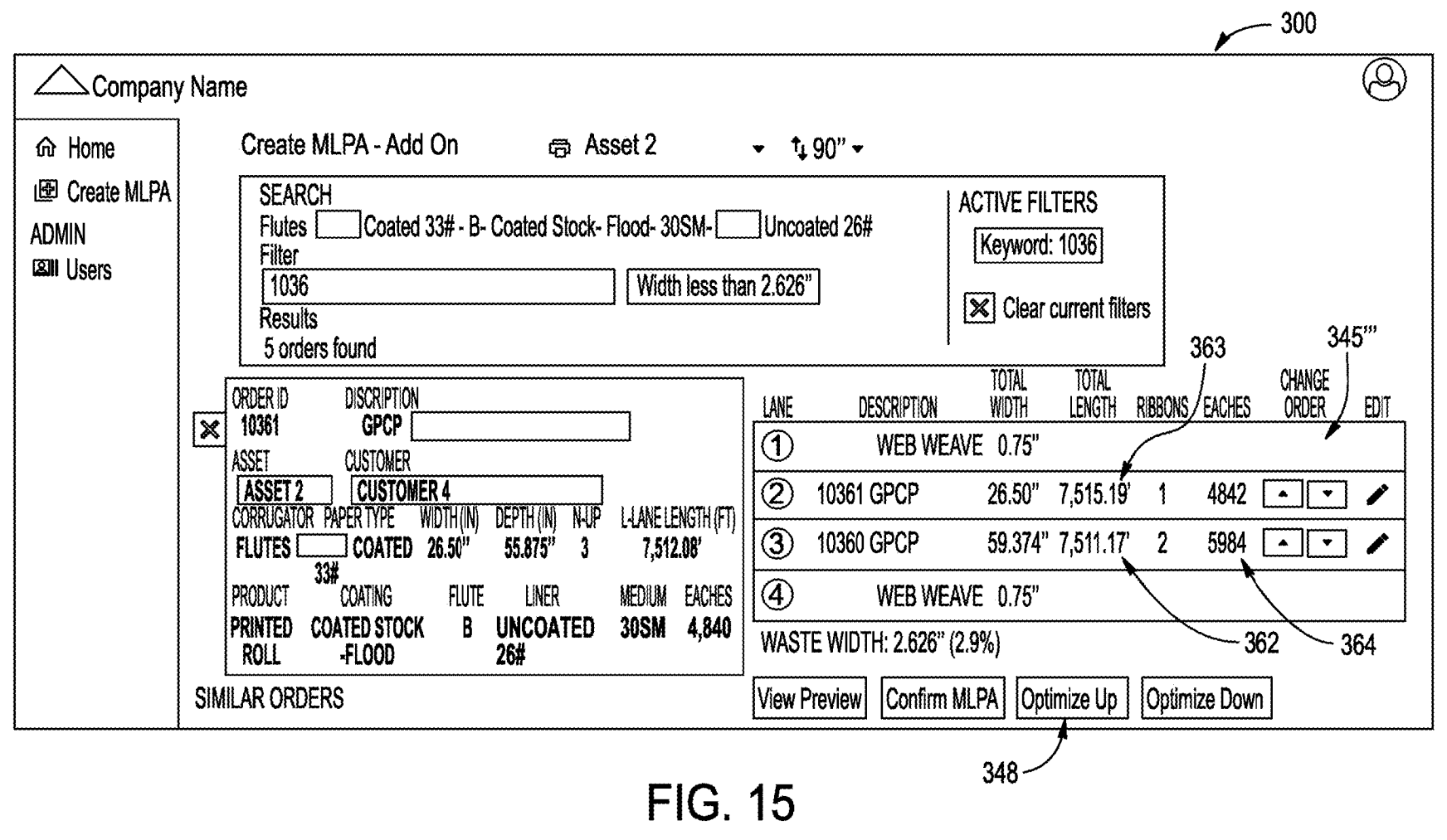

FIG. 15 illustrates an optimization up/down feature for the interface 300. With reference to FIG. 14, the first order (lane 2) has a length of 7,515.19", whereas the second order (lane 3) has a length of 6,075.21". A user may use the optimize up/down function, such as by selecting the "Optimize Up" icon 348 in FIG. 15, to further reduce waste in the length direction. By selecting the "Optimize Up" icon 348, the total number of product for the second order (lane 3) increased to 5984 units (from 4840 units) and the overall length increased to 7,511.17". Thus, the new overall length for the second order (lane 3) is very close to the overall length 7,515,29" of the first order (lane 2), thereby minimizing waste in the length direction.

In some embodiments, the system may be configured to enable a preview of the roll of web product after printing for the proposed control plan. For example, a user may select the "View Preview" icon 346 shown in FIG. 10. In response, and based on the proposed control plan 345''' of FIG. 15, the corresponding preview 370 shown in FIG. 16A may be presented. The preview 370 may include visual representations after printing of the web weaves 371, 375, the first order 372 (lane 2), and the second order split into two ribbons 373, 374 (lane 3).

In some embodiments, the system may be configured to confirm accuracy of the generated control plan. For example, the system may check the proposed control plan against one or more rules or thresholds to determine acceptability of the proposed control plan. Such a function may be initiated in response to selecting, for example, the "Confirm MLPA" icon 347 shown in FIG. 10.

In some embodiments, the system may be configured to finalize, generate, and/or save the proposed control plan. In some embodiments, the proposed control plan may be presented in a review mode or screen for the user to easily determine/approve the proposed control plan. Once finalized, the control plan may be saved with a custom name, such as to a database. Additionally, in some embodiments, such as described herein in greater detail, all necessary information may be gathered and all necessary formats may be generated for controlling operation of the various manufacturing systems. Thereafter, the control plan may be implemented to control manufacturing accordingly.

In some embodiments, the system may be configured to generate a label based on the control plan. In some such example embodiments, the label may be printed and applied to the physical roll of web product (e.g., to an end of the roll of web product, a casing for the roll of web product, etc.). In some embodiments, the label may include at least one computer readable marking that, upon being read, either identifies the control plan or supplies the control plan to the detector system/manufacturing system intended for use. In some embodiments, the label may include information about the control plan or various orders within the control plan. In some embodiments, the label may include a preview of the printed roll of web product, such as may be useful for visual confirmation by one or more operators.

As detailed herein, some example embodiments of the system enable filtering, searching, and/or recommendations of available orders based on criteria. In this regard, some example embodiments of the present invention are configured to determine order information about each available order to use for generation of the control plan. Such order information may also be formed as part of the control plan and used by various manufacturing systems, as well as other functions described herein. By pulling all the information together, the system can perform multiple functions that provide for an efficient manufacturing process.

In this regard, in some embodiments, the system is configured to gather order information from a plurality of discrete systems. For example, the system may pull order information about an order from a graphics planning system, a management information system, a sheet formation/processing planning system, and/or any other modules/systems described herein (such as in the platform 100). In this regard, one benefit of the system is that it can gather all necessary order information for performing the various functions described herein, including forming detailed/acceptable instructions for the various systems used during the manufacturing process—such as for generation of the control plan. For example, the system may be configured to form a set of printing instructions to enable operation of the printer according to the control plan, where the set of printing instructions are formed into a format that is acceptable to the printer. In this regard, the printer may only accept a certain file format and may need information that comes from different discrete systems. As such, the system may be configured to prepare the needed format (e.g., JMF/JDF) and provide it to the printer to operate according to the control plan. Likewise, the system may be configured to form a set of sheet formation/processing instructions to enable operation of the sheet formation/processing system according to the control plan, where the set of sheet formation/processing instructions are formed into a format that is acceptable to the sheet formation/processing system. Similarly, in some embodiments, the system may be configured to form a set of vision system instructions to enable operation of the vision system, such as to confirm a desired accuracy of one or more images from the printer (e.g., using one or more golden images).

In some embodiments, the system may be configured to instruct the various manufacturing systems according to the control plan. In some embodiments, the system may, for example, be configured to instruct the printer to perform various operations that may otherwise be manually run. For example, in addition to causing the printer to use certain color profiles, inks, etc., the printing instructions may cause the printer to perform one or more test jobs, stress jobs (e.g., to test the print heads), calibration jobs, and/or prepare one or more golden images that may be later used for quality checks. In some embodiments, the golden image may be formed prior to the production run, such as at the beginning of the roll. In some embodiments, the golden image may be formed after the product run, such as at the end of the roll.

In some embodiments, the system may be configured to run a stress job for one or more presses of the system. In some embodiments, the stress job may be automated, such as based on a determination that one or more print heads of the press have not been operating (e.g., been unutilized). For example, with reference to FIG. 16B, a press 398 may be printing on a web 390' (e.g., the web 390' may be running in the "PD" direction). The press 398 may be printing with respect to planned box structure outlines "A" 391 and "B" 393 utilizing a certain number of print heads (e.g., print heads $PH_2$-$PH_6$). Notably, however, the press 398 may not be utilizing some of the print heads (e.g., print heads $PH_1$ and $PH_7$), such as due to extra space being above 396a and/or below 396b the planned box structure outlines. In such a scenario, it may be desirable to perform a stress test for the unused print heads for one or more upcoming orders where they may be utilized (e.g., for planned box structure outlines "C" 394 and "D" 395). In some embodiments, the system may determine that such previously unused print heads will be needed for an upcoming order and cause a stress job to be run by the press to get the previously unused print heads ready for printing. In this manner, unnecessary poor image quality may be avoided. Such an automated stress job may be determined based on various factors/circumstances, such as if the print heads have not been operating for a certain amount of time, after every order, or other factors. In some embodiments, the system may cause the stress job to be performed in between orders, such as in space 399 on the web 390'. This may maintain efficient flow of the web 390' and utilize already planned waste.

Some visions systems may utilize one or more golden images to confirm that the printed image/images on the printed roll of web product are acceptable. In this regard, in some cases, a vision system may compare each printed image to a reference golden image and determine whether the printed image satisfies a golden image tolerance threshold. Such a golden image tolerance threshold may be based on any number of factors, such as color degree, an amount of blanks or white space, other defects, etc. In some embodiments, the tolerance threshold for verifying some printed images may be greater than others. For example, a customer may prefer that the printed images match the desired image very closely, and may perhaps be willing to pay a premium. Likewise, some customers may be willing to accept a higher degree of variation, such as in favor of other considerations (e.g., price, speed, delivery date, etc.). Moreover, some portions of the order may have different tolerance levels (e.g., different printed images within the same order may have different tolerance level). For example, maintaining the proper degree of "red" in a cola product may be important, but the color level of "white" for the writing on the same box may be less important.

In some embodiments, the tolerance level of each order may be saved with the order information and utilized (such as in conjunction with the generation of the control plan and/or scheduling production runs). For example, the system may determine that the print head quality of the printer is better during a certain time period (e.g., right after cleaning), and may recommend performing a production run or generation of a control plan so that an order with a lower tolerance level is run at the most opportune time. Similarly, the system may recommend aggregating orders together when generating a control plan to match similar tolerance levels. In such an example, editing needs may be similar across the width of the printed roll, which may limit the need for splicing and editing of one side of the printed roll when the other side doesn't need it (e.g., the other side has a higher tolerance level).

Some visions systems and printers may be configured to work together to form or generate a golden image. In this regard, in some embodiments, the printer may be instructed to dynamically create a golden image. As alluded to above, it is important to generate a proper golden image that can be used as an accurate reference point. As such, some printers may be configured to generate a golden image at the beginning of a production run, under the assumption that the printer was just cleaned/serviced, etc. However, in some embodiments, in order to maintain efficient printing/manufacturing, it may be desirable to not stop and clean/service the printer between production runs. In such a case, preparing a "dynamically" created golden image may cause a less than ideal golden reference image to be formed—meaning that the "golden image" has its own defects or may not be in a best-state. This may lead to undesirable results when attempting to verify printed images using the less desirable golden image.

In some embodiments, the system may be configured to store and save one or more golden images for an order. In such an example embodiment, the one or more stored golden images can be provided to the printer/vision system for utilization. Further, such a golden image may be confirmed to be a "best-state" golden image such that the printer was in the best-state when created. In some embodiments, the customer may provide or select the golden image for an order. Further, such a saved golden image may be useful for future similar or repeat orders. This maintains accurate image production by using a best-state golden image and maintains efficiency by removing the need to clean/service the printer between orders. Further efficiency may include being able to rely on prior golden images—thereby removing the need to create new golden images.

In some embodiments, the system may be configured to instruct the printer when to create the golden images. For example, the system may instruct the printer to perform a golden image creation run where one or more golden images are created and saved. In this regard, the golden image creation run may be performed at an ideal time, such as after the printer has been cleaned/serviced. In some embodiments, such a golden image creation run may create multiple different golden images (e.g., from different orders) to further maximize efficiency.

Though the above description details a golden image creation run, in some embodiments, the system may be configured to instruct the printer to dynamically create a golden image, such as in conjunction with a production run for an order. In such an example, the golden image may be formed at some point in the order (e.g., beginning, middle, end, etc.). In some cases, the system may determine and instruct the printer as to when to form the golden image such as in an effort to prepare a best-state golden image.

In some embodiments, the system may be configured to send the one or more golden images for an order to the printer and/or vision system. For example, the golden image(s) may be sent to the printer along with the order (e.g., generated control plan). In some embodiments, the golden image(s) may be sent to the vision system separately from the printer (such as in an XML, file). In some embodiments, a hot folder may be formed in a database of the system and access thereto may be provided to the printer and/or vision system to access/retrieve the golden image therefrom.

In some embodiments, as noted herein, the system may be configured to prepare a set of quality check instructions for operation of the vision system. In some embodiments, the set of quality check instructions may include access to one or more golden images. Additionally, however, the set of quality check instructions may provide instructions on which golden images to utilize for which lane of a multi-lane printed web. For example, as described herein, multiple orders may be printed in the width direction of a roll (e.g., according to a control plan). In such embodiments, the vision system may need to be instructed as to which golden images to utilize for which order (and where on the web the printed images may be). Further, multiple ribbons may be printed side-by-side. In such a regard, in some cases, the same golden image can be utilized across and down the printed roll (often called "step and repeat"), or separate or different golden images may be needed. In some embodiments, golden images may be grouped together to help compare multiple grouped printed images at the same time.

Figure 16A:
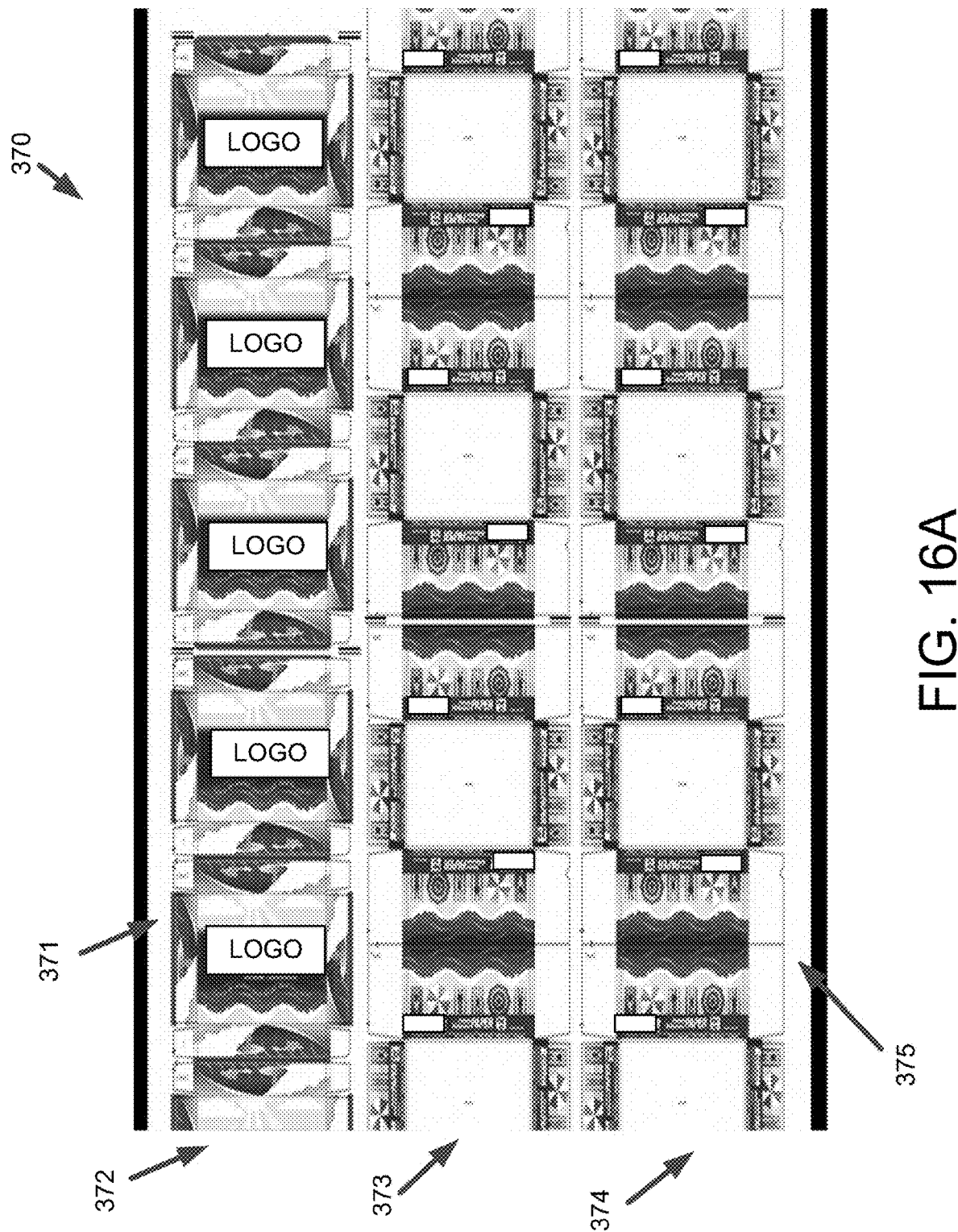
FIG. 16A shows a preview of the printed roll of web product for the generated control plan, in accordance with example embodiments described herein.
Figure 16B:
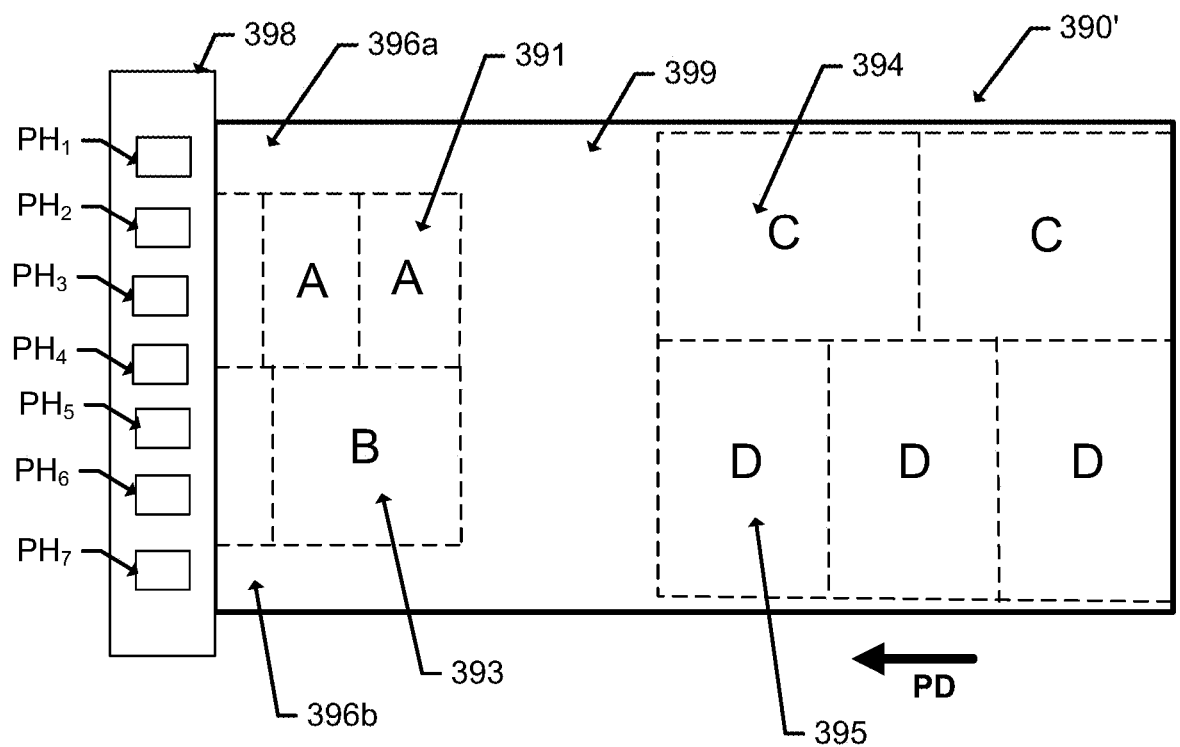
FIG. 16B shows an example portion of a roll of web product passing through a press with planned box structure outlines, in accordance with some example embodiments discussed herein.
Figure 16C:
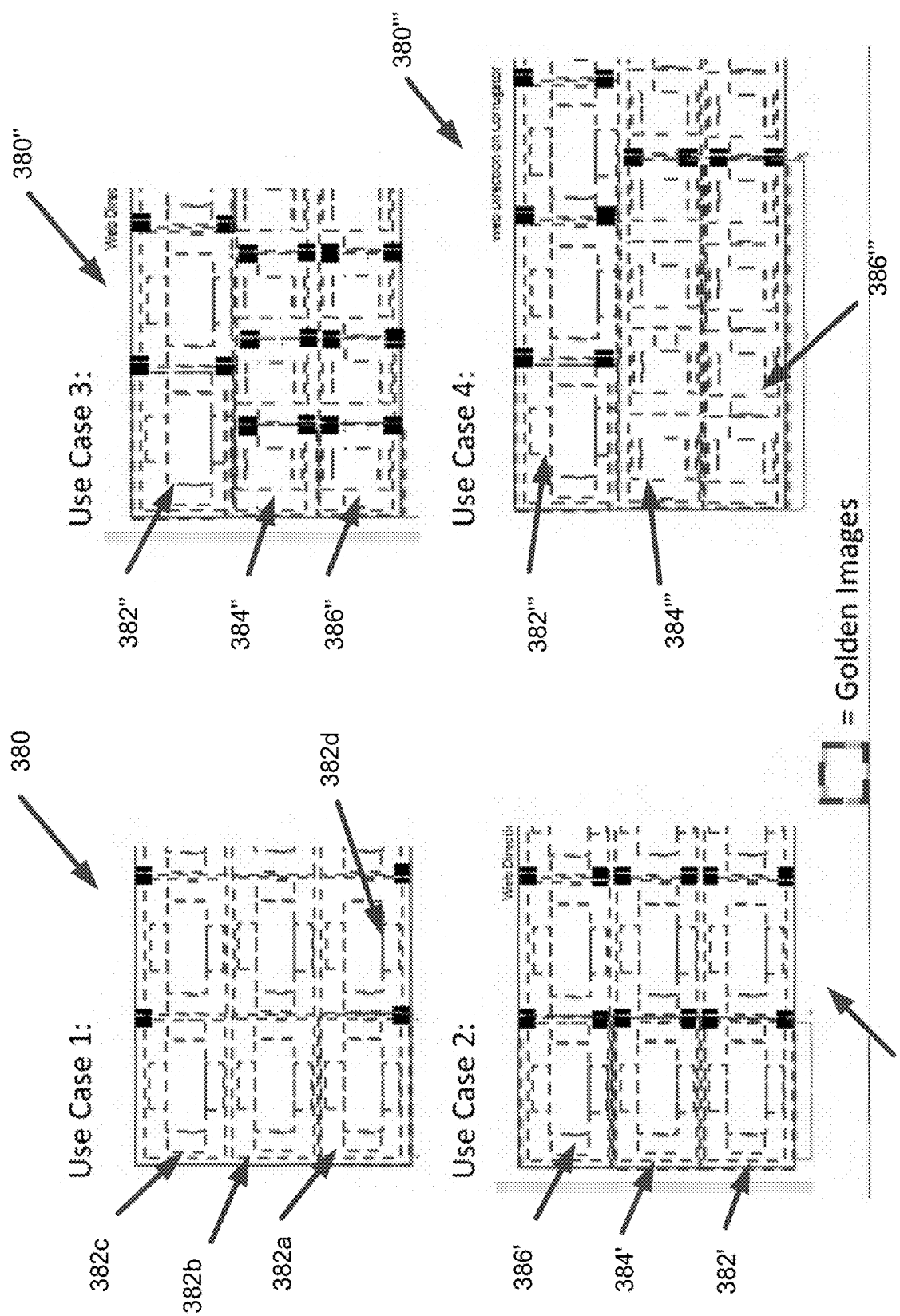
FIG. 16C shows four example different use cases for utilizing one or more golden images during a quality check for a printed roll of web product for the generated control plan, wherein the generated control plan has multiple lanes of printed orders, in accordance with example embodiments described herein.

FIG. 16C shows four example different use cases for utilizing one or more golden images during a quality check for a printed roll of web product in accordance with various example systems described herein.

Use Case 1 represents a printed roll of web product 380 with 3 of the same printed images across (the width of) the web. In such an example use case, the system may be configured to instruct the vision system to apply the same golden image (382a) for each printed image across (e.g., 382a, 382b, 382c) and down (e.g., 382d) the printed roll of web product.

Use Case 2 represents a printed roll of web product 380' with 3 of the same printed images across (the width of) the web. In such an example use case, the system may be configured to instruct the vision system to apply separate golden images (382a', 382b', 382c') for each lane across (e.g., 382a, 382b, 382c) the printed roll of web product.

Use Case 3 represents a printed roll of web product 380" with three printed images across (the width of) the web, where one (382") is different than the other two (384", 386"). In such an example use case, the system may be configured to instruct the vision system to apply a first golden image (382") for each printed image down the web in the first lane (e.g., the printed images following 382" down the web), a second golden image (384") for each printed image down the web in the second lane (e.g., the printed images following 384" down the web), and a third golden image (386") for each printed image down the web in the third lane (e.g., the printed images following 386" down the web).

Use Case 4 represents a printed roll of web product 380''' with three printed images across (the width of) the web, where one (382''') is different than the other two (384''', 386'''). In such an example use case, the system may be configured to instruct the vision system to apply a first golden image (382''') for each printed image down the web in the first lane (e.g., the printed images following 382''' down the web). Additionally, the system may be configured to apply a group of golden images (e.g., 384''') for a corresponding group of printed images down the web in the second lane (e.g., groupings of printed images following 384''' down the web). Likewise, the system may be configured to apply another group of golden images (e.g., 386''') for a corresponding group of printed images down the web in the third lane (e.g., groupings of printed images following 386''' down the web).

In some embodiments, each order in the vision system may be determined by the system to link with a lane of a downstream sheet processing/formation system (such as a corrugator). In such example embodiments, the system may be configured to gather information from the vision system to determine how best to remove defective images on the printed roll of web product. For example, in some embodiments, a reel editor may be utilized to remove one or more portions of the printed roll of web product. This may include splicing the roll of web product or separating the roll of web product and splicing out or removing the defective image.

In some cases, however, the control plan may include instructions to process the printed roll of web product through the sheet formation/processing system where there are multiple lanes of printed images. In some such cases, one of the lanes may have a defective image, while the other lane(s) may not. It may be advantageous to not remove the defective image until the lanes are separated during sheet formation/processing (e.g., during use of the corrugator) such as to preserve the good images in the other lanes. In some embodiments, the system may be configured to determine the desirable approach and instruct the operator/systems accordingly.

In some embodiments, the system may be configured to receive feedback from the various manufacturing systems and learn/adapt for future operational efficiency. For example, the system may gather historical information that may be linked to certain characteristics (e.g., order information) for an order. Then, when forming a control plan with an order that has a similar characteristic, the system may apply that historical information to adapt operation of the various manufacturing systems (e.g., run a different type of stress job, run less than expected test jobs, etc.).

In this regard, in some embodiments, one or more characteristics of the press or lanes on a press for specific orders may be saved/stored for future similar orders. For example, some customers may have color profiles that they wish to have on their orders (e.g., a specific color red or a specific color green—such as may be associated with their brand). Depending on the substrate used for the order (e.g., paper type) the printing characteristics (e.g., color mixture, print head type, etc.) may need to be different in order to obtain the universally desired specific color profile. Such information can be saved and utilized by the system when preparing a control plan for passing to a specific press or manufacturing process/system. This would avoid unnecessary poor or undesirable image quality.

Along similar lines, in some embodiments, the system may be configured to monitor and collect error messages received by various manufacturing systems and their corresponding meaning and/or fix. For example, one or more presses may present a press specific error message. After fixing the error message, the system may save/store the error message for future understanding. Additionally, the system may save/store any fixes and apply them to future orders either on an as-needed basis or pre-emptively (such as by adapting a control plan to avoid the error ever occurring). Depending on the size of the system and the number or variety of manufacturing systems, such a feature may be beneficial and help maintain efficient and effective operation.

In some embodiments, the system may enable an operator (e.g., scheduler, manufacturing system operator, etc.) to control and/or modify a que of upcoming orders. In such an example embodiment, one or more operators may control the order flow through the various manufacturing systems. This could be accomplished by an operator of the control plan generator or by an operator specific to one or more manufacturing systems (e.g., an operator of a corrugator and/or press). By allowing modification of the order que, the operator may take advantage of various circumstances to help maintain efficiency. For example, a certain type of paper for a later order may already be installed and, thus, the operator may want to "jump" to that order.

In a similar manner, the system may take into account each planned manufacturing system that will be utilized for a control plan and modify the control plan accordingly. In some embodiments, the modification could be performed after the control plan is sent to the manufacturing system, such as by an operator of the manufacturing system directly. In some embodiments, a manufacturing system may have desired specifications for each control plan. For example, an example corrugator may have a desired distance between orders (e.g., 25 feet), such as to enable changing of various features of the corrugator between orders. Such a desired distance may be different for other corrugators and, thus, the control plan may be updated to account for the desired distance (among other specifications). Such modifications could be accomplished on the fly as the control plan is being processed. Another example specification is the justification of the orders on the web. For example, it may be desirable to have the orders center justified (e.g., versus left or right justified). Such a consideration could be important for matching the order with a coding mat that is pre-set to a certain justification (e.g., center justified), however, other features may lead to a desired justification (e.g., location of mark detectors laterally across the web).

In some embodiments, the system may be configured to take into account current or planned inventory when generating a control plan or passing a generated control plan to a manufacturing system for processing. For example, the system may gather inventory information (such as from the resource database 454 shown in FIG. 4A) and determine whether certain inventory (e.g., paper type, ink, etc.) is available to process the control plan. In some embodiments, the location of the inventory may be utilized in determining where to send the control plan for processing (such as if there are multiple options). For example, one corrugator location may have a certain paper type whereas another corrugator location may not.

In some embodiments, the system is configured to track the status of the manufacturing process for the generated control plan. For example, feedback from various manufacturing systems, one or more read markings, and/or manual operator entries can be used for tracking the progress of the manufacturing process. In such a regard, in some embodiments, the system may be configured to provide order status to a customer. For example, the system may track the control plan through the manufacturing process and provide status updates in real-time, such as through a customer dashboard. In some embodiments, knowledge of the available or planned inventory and schedule of the control plan can be used to provide estimated order completion dates, locations, or other information.

Example Corrugated Box Manufacturing Process

Corrugated sheet and box manufacturing is an example paper, sheet, and/or box manufacturing system. In some such manufacturing, a corrugator (e.g., high speed laminator) is used to glue together layers of board web with a flute medium positioned in between. Depending on the desired characteristics of the corrugate board web, different layers/arrangements can be combined. Once formed, the corrugate board web (e.g., top layer, flute medium, and bottom layer) may then be cut into appropriate sheet or box structures, and later scored, cut, glued etc. to form the broken down box (that is then folded and manipulated to form the box, such as by the customer). Although the following description provides detailed examples of "corrugators", some example embodiments of the present invention contemplate the term "corrugator" to mean a board-making device, such as a high speed laminator.

Figure 17A:
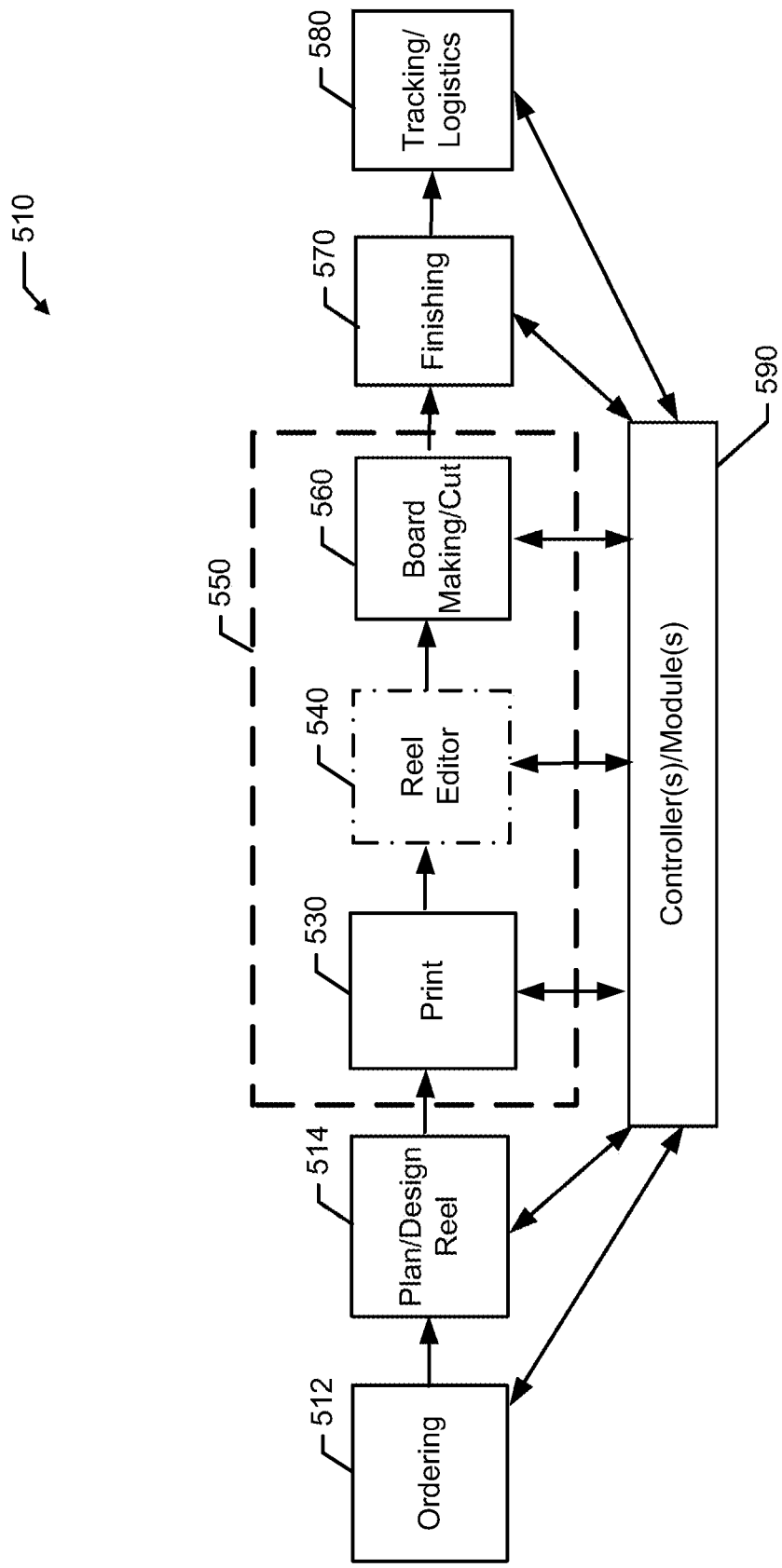
FIG. 17A shows a block diagram of an example corrugated sheet or box manufacturing process with print in-line with the corrugator, in accordance with some embodiments discussed herein.

FIG. 17A illustrates an example corrugated box manufacturing process 510 according to various embodiments of the present invention. The manufacturing process 510 includes a number of phases that result in a finished corrugated sheet or box that is shaped and printed per the customer's order. The process 510 may include an ordering phase 512, a planning phase 514, a print phase 530, a reel editor phase 540, a board making/cutting phase 560 (e.g., a sheet formation/processing phase), a finishing phase 570, and a tracking/logistics phase 580. In some embodiments, less or more phases or different orders of phases are contemplated. Additionally, while the described example is detailed for corrugated box making, some embodiments of the present invention are contemplated for extension into other product manufacturing, including printed paper-based product manufacturing, such as folded carton, beverage labels, flexible paper, industrial bags, plates, cups, décor, and many others.

In the ordering phase 512, a customer may supply an order that includes desired characteristics for the end product. For example, the customer may provide a number of desired sheet or box structures, sheet or box shape requirements, one or more images/designs for printing on the sheet or box, color specifications, among many others. In some embodiments, the customer 512 may input such an order through a web interface. The web interface may enable the customer 512 to easily input the desired characteristics of the order electronically. The web interface may also enable the customer to perform many related tasks, including, for example, updating orders, tracking orders, handling payment, requesting assistance, setting up automated ordering (e.g., recurring ordering), viewing and approving example images ("soft proofing"), viewing example end products, etc.

In addition to providing increased efficiency of process for the customer, the web interface may also directly interact with and provide information for automated processes useful in the remainder of the manufacturing process 510. For example, the information from the web interface may be fed directly into a corrugator plan controller (such as the controller 590) and utilized accordingly. For example, as described herein, the information from the web interface may be used to form a corrugator plan and/or associated reel map or print plan of the corrugated sheet or box structure making process. Additionally, however, the information from the web interface may be used to provide on-the-fly updates or adjustments to the manufacturing process. Further, feedback (e.g., from the controller 590) may be provided back to the web interface for the customer, such as tracking information, images of the completed sheet or box structures, among other things.

In some embodiments, a controller 590 may be configured to perform various functionality useful in the manufacturing process 510 (e.g., the various modules/phases described herein). For example, the controller 590 (such as during the planning phase 514) may be configured to form a corrugator plan (which may be included in an associated reel map), such as may be used in conjunction with the corrugator 550 (e.g., during the board making phase/cutting phase 560). As used herein, in some embodiments, an associated reel map may be an example of a corrugator plan. In this regard, other example corrugator plans (e.g., a print plan) can be used, formed, etc. Additionally or alternatively, the controller 590 may be configured to form a print plan that is used in the printing phase 530 (such as described herein). Likewise, the controller 590 may be used with the ordering phase 512, such as to receive order information, the finishing phase 570, and/or the tracking/logistics phase 580. An example controller 590 is described further herein as controller 690 (which is shown and described with respect to FIGS. 18A and 18B). In some embodiments, the controller 590 may be spread over any number of controllers at any of the various phases of the manufacturing process 510.

In some embodiments, sections of the process flow can be shifted from plant to plant or device to device due to various external circumstances. For example, repair of certain parts of the corrugator, replacing certain printer inks, etc., may cause only certain customer sheet or box structures to be able to be manufactured. In this regard, in some embodiments, certain portions of the process flow may be shifted, such as being jumped in line, moved to another facility, etc., in order to maintain efficient up time of operation of the printer(s) and corrugator(s).

Figure 17B:
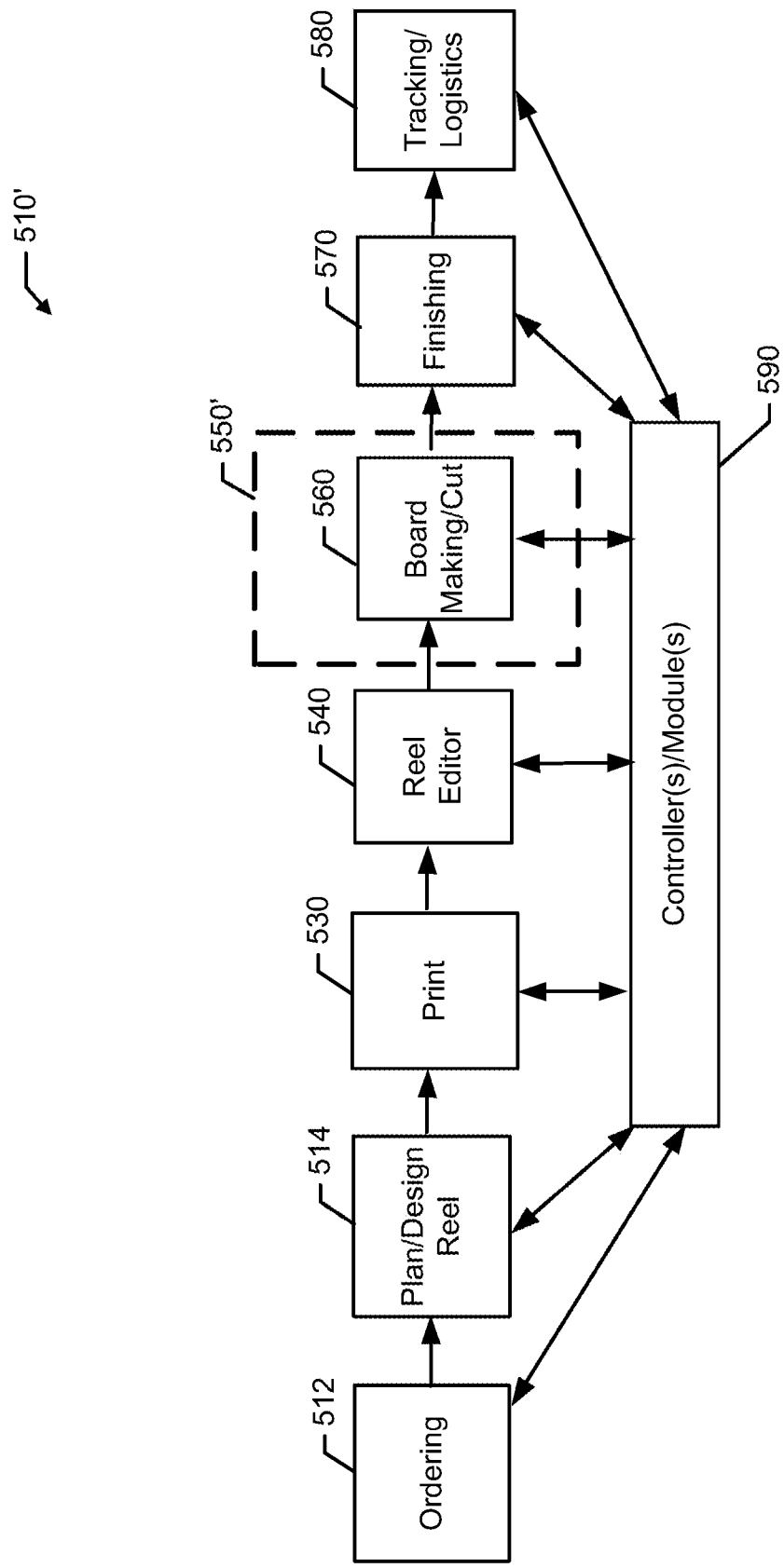
FIG. 17B shows a block diagram of an example corrugated sheet or box manufacturing process with print off-line or near-line, before the corrugator, in accordance with some embodiments discussed herein.
Figure 18A:
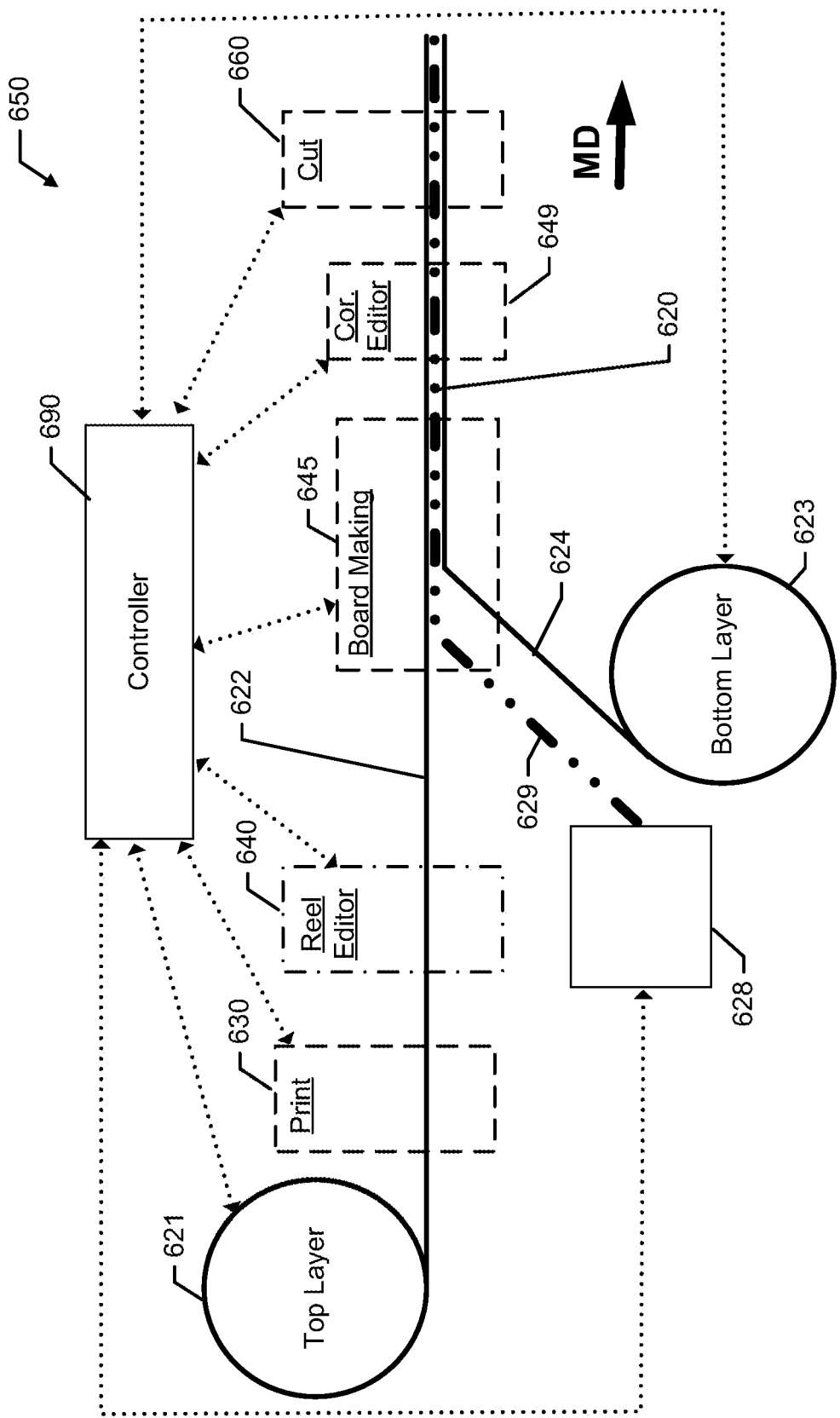
FIG. 18A illustrates a portion of the corrugated box manufacturing process with print in-line with the corrugator, in accordance with some embodiments discussed herein.
Figure 18B:
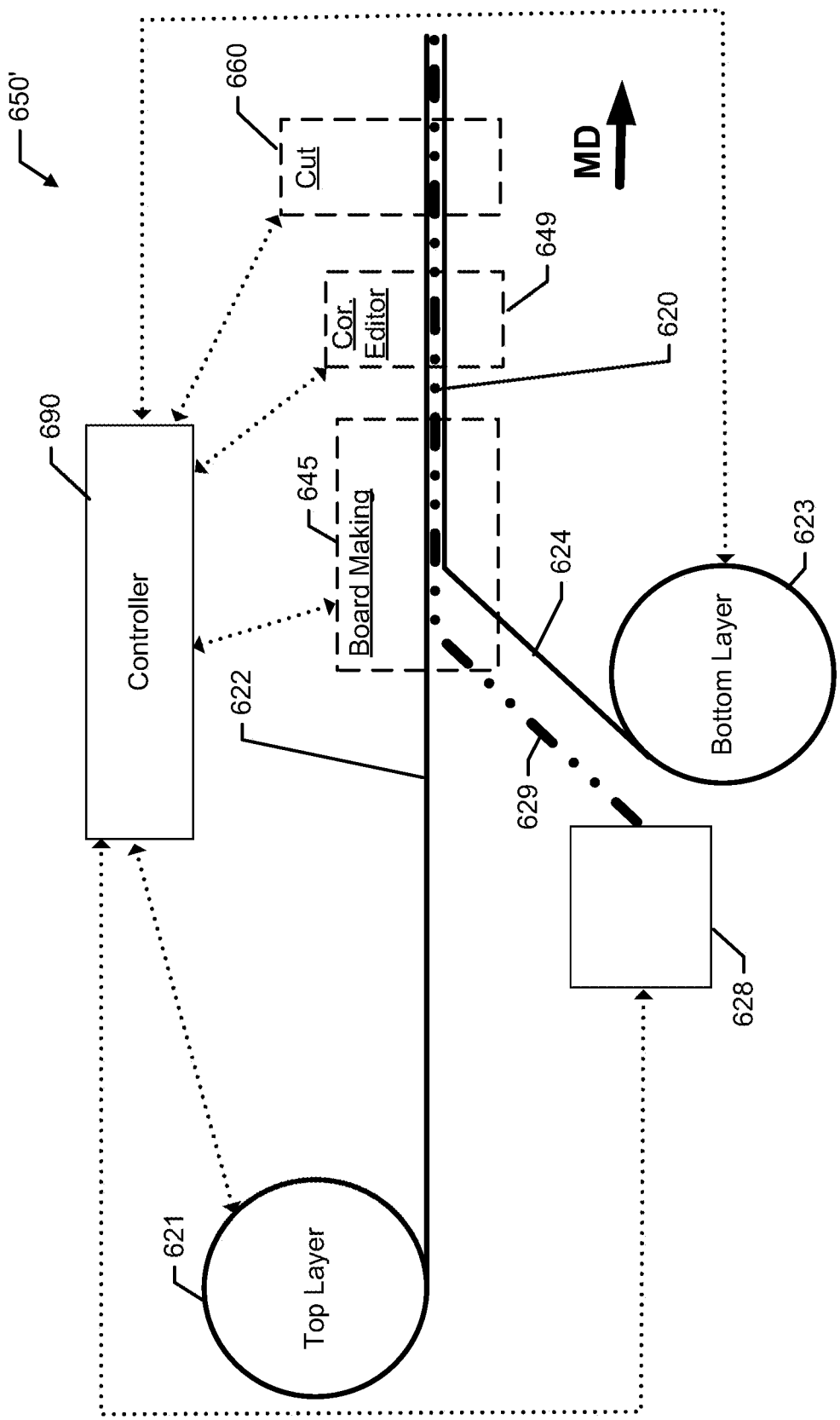
FIG. 18B illustrates a portion of the corrugated box manufacturing process with print off-line or near-line, before the corrugator, in accordance with some embodiments discussed herein.

The manufacturing process 510 may also include the printing phase 530, reel editor phase 540, and board making/cutting phase 560. In some embodiments, the printing phase 530, reel editor phase 540, and board making/cutting phase 560 may be performed using a corrugator 550 (such as shown in FIG. 17A) or other manufacturing system. Alternatively, in some embodiments the printing phase 530 and/or reel editor phase 540 may be performed separately, prior to the corrugator 550' (such as shown in the manufacturing process 510' shown in FIG. 17B). Similarly, FIG. 17A also illustrates that the real editor phase 540 may be optional within a corrugator 550 that also employs a printing phase 530. FIG. 18A illustrates an example corrugator 650 that incorporates the printing phase 530, the reel editor phase 540, and the board making/cutting phase 560 to form an in-line process. In some embodiments, the reel editor phase 540 may not be included in the example corrugator 650 of FIG. 18A. FIG. 18B illustrates an example corrugator 650' with the printing phase 530 and the reel editor phase 540 occurring separately, prior to the board making/cutting phase 560. This approach is sometimes referred to as a near-line process.

With reference to FIG. 18A, the corrugator 650 may, such as through controller 690, cause conveyance of one or more paper web, printed web, corrugated board web, and/or flute medium through the machine (and various phases), such as along the machine direction (MD) arrow. For example, one or more conveyor means (e.g., a conveyor belt) and/or motors may be used to cause a top layer 622 of paper web to pass through a printing phase 630 and, optionally, a reel editor phase 640. The top layer 622 of paper web may be held in a roll 621 (or other form), such as may be referred to herein as a roll of web product. The corrugator 650 may also control introduction of one or more flute mediums 629 and/or other layers to form the corrugated board web (such as the roll 623 of the bottom layer 624 of corrugated board web).

As described herein, in some embodiments, a reel map (e.g., a corrugator plan) may be used to help maintain efficient operation of the corrugator and avoid waste during making of the sheet or box structures. In this regard, a certain arrangement of sheet or box structures may need to be followed through the corrugator 650. Such operation and tracking may occur, such as through use of the controller 690.

As described in more detail herein, the controller 690 provides logic and control functionality used during operation of the corrugator 650 and, in some embodiments, the entire manufacturing process 510. In some embodiments, the functionality of the controller 690 may be distributed to several controllers that each provides more limited functionality to discrete portions of the operation of manufacturing process 510. In this regard, the controller 690 may have the same or similar suitable hardware or software to the controller 90 described herein.

The controller 690 may be operably coupled with one or more components of the manufacturing process 510, including for example, the roll 621 of the top layer 622 of corrugated board web, a medium holder (e.g., roll) 628 of medium 629, the roll 623 of the bottom layer 624 of corrugated board web, various components of the printing phase 630, various components of the reel editor phase 640, various components of the boarding making phase 645, various components of the cutting phase 660, conveyance means of the corrugator, various components of phases for the manufacturing process, and other components (such as described herein). For example, depending on the components, the controller 690 may be operably coupled such as through use of solid-core wiring, twisted pair wiring, coaxial cable, fiber optic cable, mechanical, wireless, radio, infrared, etc. In this regard, depending on the components, the operable coupling may be through one or more intermediate controllers or mechanical coupling, such as used for controlling some components (e.g., controlling operation and/or feeding of the roll 621 of the corrugated board web). In some embodiments, the controller 690 may be configured to provide one or more operating signals to these components and to receive data from these components.

As noted above, the controller 690 (e.g., the corrugator plan controller) may be split into more than one controller, such as multiple controllers that exchange information, data, instructions, etc. For example, the controller 690 may be split into a corrugator planning software controller, a corrugator machine user interface controller, a corrugator system controls, press 630 operations and graphics workflow software and/or specific functional controls (e.g., a separate vision system such as described herein).

In some embodiments, such as described in greater detail herein, the controller 690 may be operably coupled to one or more vision systems, such as for detecting markers and/or defects/errors during the manufacturing process. Depending on the feedback from the vision systems, the controller 690 may control the corrugator 650 and/or manufacturing process 510 accordingly.

Depending on the configuration of the corrugator, the printing phase 630 may occur prior to combining the layers of corrugated board web 621, 623 and flute medium 628 (e.g., "pre-print") or after combining two or more layers (e.g., "post-print"). In some embodiments, printing may occur to other layers (e.g., the bottom layer 623), such as in alternative to or in addition to the top layer 621.

During the printing phase 630, the controller 690 may direct the press digital front end (DFE) and raster image processor (RIP), etc., to print one or more images at specific locations on the top layer 622 of the paper web. Depending on the configuration of the corrugator 650 and/or manufacturing process 510, the controller 690 may utilize a process flow (e.g., reel map) to determine where on the paper web to print the images and/or markers. For example, an image selected by the customer (such as a bottle), may be printed in the center (or other section) of a sheet or box structure—such as may ultimately be visible for marketing or other purposes once the box is formed. Any image (including, words, markers, instructions, etc.) are contemplated by various embodiments of the present invention. Example markers that can be printed, include any marker that may be used by various components of the manufacturing process 510, such as for tracking, cutting, printing, etc. Further description regarding possible markers and their utilization is provided in greater detail herein. In this regard, the controller 690 may be connected to one or more vision systems that are used to read or detect color, defects, and various markers for controlling and/or updating operation of the corrugator 650.

During the reel editor phase 640, the controller 690 may be configured to perform functions described herein related to editing or determining whether to edit the printed top layer of board web. Although shown in-line, in some example embodiments, the reel editor 640 may be out of line or near-line such that the roll of web product may be transferred to the reel editor 640 for processing. In some embodiments, the corrugator may have one or more functions/features that enable editing of the roll of web product (such as removing waste). In some such example embodiments, the reel editor 640 may form part of the corrugator.

During the board making phase 645, the controller 690 may be configured to cause combining of one or more layers and/or flute medium to form the corrugated board web for the boxes. For example, the controller 690 may be configured to cause fluted medium 629 to be fed into contact with one or more layers of corrugated board web, such as between a top layer 622 (such as from the roll 621) and a bottom layer 624 (such as from the roll 623). In this regard, in some embodiments, the fluted medium 629 may be fed into contact with the top layer 622 prior to the combined fluted medium 629 and top layer 622 coming into contact with the bottom layer 624. The controller 690 may cause formation of the combined layers into a layered corrugated board web 620, such as through use of glue or other adhesive.

During a corrugator editing phase 649, the controller 690 may be configured to edit the corrugated board web, such as by chopping out waste or undesirable corrugated board web. Such waste can be removed from the corrugator 650.

During the cutting phase 660, the controller 690 may be configured to cut out the sheet or box structures. In this regard, the controller 690 may be operably coupled to the various knives to control operation during the cutting phase 660. In some embodiments, the controller 690 may be configured to utilize the process flow (e.g., reel map) to determine how to operate the various knives (e.g., move the knives, cause a cut to occur, etc.).

Figure 19:
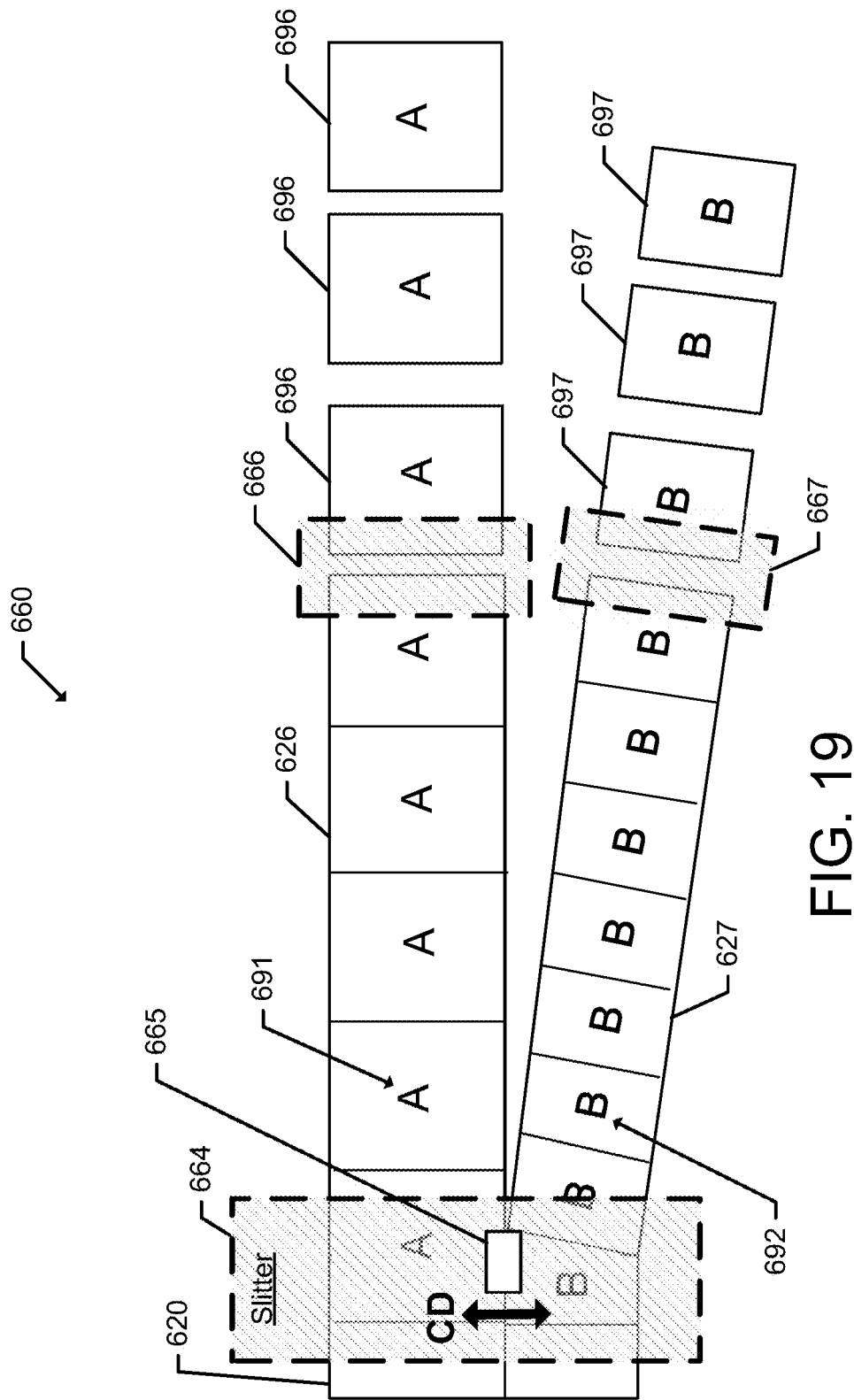
FIG. 19 illustrates a cutting arrangement portion of the corrugated box manufacturing process, in accordance with some embodiments discussed herein.

FIG. 19 shows an example cutting phase 660 that includes a knife (e.g., slitter 664) that is configured to cut the layered corrugated board web 620 in the longitudinal (or machine) direction. The cutting phase 660 also includes two knives 666, 667 that are each configured to cut the layered corrugated board web 620 in the lateral direction or cross direction CD. As described herein, the controller 690 may be operably coupled to the various knives to control operation thereof In some embodiments, the controller 690 may be configured to utilize the process flow (e.g., reel map) to determine how to operate the various knives (e.g., move the knives, cause a cut to occur, etc.).

As the layered corrugated board web 620 passes through the cutting phase, a slitter 664 may be configured to split the layered corrugated board web 620 to cause it to split into different sections that travel on different paths (such as the top section 626 that travels along the top path and the bottom section 627 that travels along the bottom path). In some embodiments, a first sheet or box structure may form the top section 626 and a second sheet or box structure may form the bottom section 627—thereby creating two different paths that separate the two types of sheet or box structures (e.g., sheet or box structure A, 691 is formed in the top section 626 and sheet or box structure B, 692 is formed in the bottom section 627). The location 665 in which the slitter 664 performs the cut is important because sheet or box structures may vary as the layered corrugated board web 620 travels through the corrugator. For example, FIG. 3A shows that a slitter would need to cut at a first position $P_1$ to cause separation of the sheet or box structures A, 691 from the sheet or box structures B, 692. However, the slitter would need move at the right time (e.g., the transition from the sheet or box structures A, B to the sheet or box structures C, D) or a second slitter may be used to cut instead at the second position $P_2$ to cause separation of the sheet or box structures C, 693 from the sheet or box structures D, 694. Referring back to FIG. 8, the slitter 664 may be movable (such as based on instruction from the controller 690) in the cross direction CD in order to cut the layered corrugated board web 620 at the proper position.

Once separated into different paths, the various sections of layered corrugated board web 626, 627 may pass through respective knives 666, 667. In some embodiments, the knives 666, 667 may be configured (such as based on instruction from the controller 690) to cut the sheet or box structures in the lateral (cross) direction in order to form the desired sheet or box structures. For example, knife 666 cut the top section 626 to form the sheet or box structures A, 696. Likewise, knife 667 cut the bottom section 627 to form the sheet or box structures B, 697.

In some embodiments, other knives may be utilized for cuts, such as side slitters for cutting scrap along the edges. Likewise, other components may be utilized, such as scorers for pre-creasing sheet or box structures. Such other knives and/or components may be formed as part of the above described systems.

Referring back to FIG. 17A, with the sheet or box structures cut, the manufacturing process 510 may continue to the finishing phase 570. The finishing phase 570 may include additional printing, additional cutting, additional gluing, and/or other necessary functions to achieve a finished sheet or box structure for sending to the customer. In some embodiments, a vision system or other visual inspection system may be used to confirm accuracy of the order.

The manufacturing process 510 may also include a tracking/logistics phase 580 that includes tracking the finished sheet or box structures and preparing/delivering them to the customer. In some embodiments, one or more tracking or counting systems can be implemented upstream in the manufacturing process 510, such as to enable tracking/logistic planning (including separating orders) throughout the manufacturing process 510.

Example Other Product Manufacturing Processes

As noted herein, some embodiments contemplate systems for controlling manufacturing of various products, such as various paper-based products, including corrugated boxes, folded carton, labels, flexible paper, industrial bags, plates, cups, décor, and many others. FIGS. 20-23 illustrate block diagrams of various example other paper-based product manufacturing contemplated by various embodiments described herein. In this regard, some embodiments of the present invention contemplate one or more controllers (e.g., controller 90) that can generate and provide a control plan to various devices/systems for performing efficient manufacturing of such various products.

Figure 20:
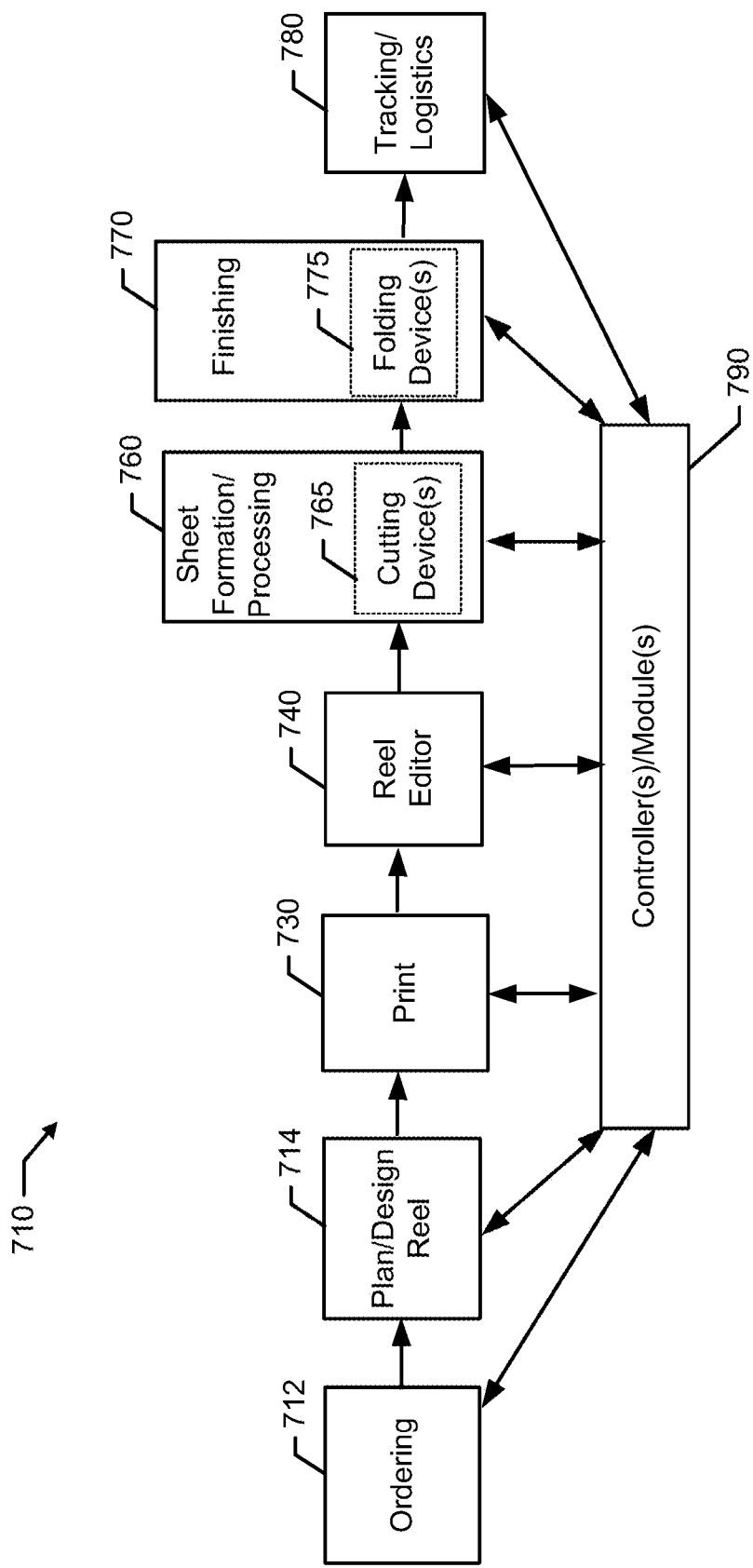
FIG. 20 shows a block diagram of an example folded carton manufacturing process, in accordance with some embodiments discussed herein.

FIG. 20 shows a block diagram of an example folded carton manufacturing process according to various embodiments of the present invention. The manufacturing process 710 includes a number of phases that result in a finished folded carton that is shaped, formed, and printed per the customer's order. The process 710 may include an ordering phase 712, a planning phase 714, a print phase 730, a reel editor phase 740, a sheet formation/processing phase 760, a finishing phase 770, and a tracking/logistics phase 780. Such phases may be similar to the phases described with respect to the manufacturing phase 10 of FIG. 1. In some embodiments, less or more phases or different orders of phases are contemplated. Depending on the desired configuration, one or more controller(s) 790 may be used to control one or more various phases (e.g., various systems/devices therein) of the manufacturing process 710. In some embodiments, one device/system may encompass multiple phases, such as two or more of the printing phase 730, the reel editor phase 740, the sheet formation/processing phase 760, and the finishing phase 770.

In some embodiments, like the manufacturing process 10 described with respect to FIG. 1, the example folded carton manufacturing process 710 may include one or more cutting devices 765 for cutting one or more sheets (or structures) from the roll of web product. Additionally, in some embodiments, a web forming device may form an updated web, such as prior to processing through the cutting device.

In some embodiments, the folded carton manufacturing process 710 may include one or more unique devices, such as a folding/gluing device 775 that may form part of the finishing phase 770 (or the sheet formation/processing phase 760). The folding/gluing device 775, such as using one or more folding arms or other hardware and/or various software, may be configured to perform one or more folds of various sheets to form the desired folded carton. In some embodiments, the folding device 775 may be configured to apply glue separately or in addition to performing the one or more folds.

Figure 21:
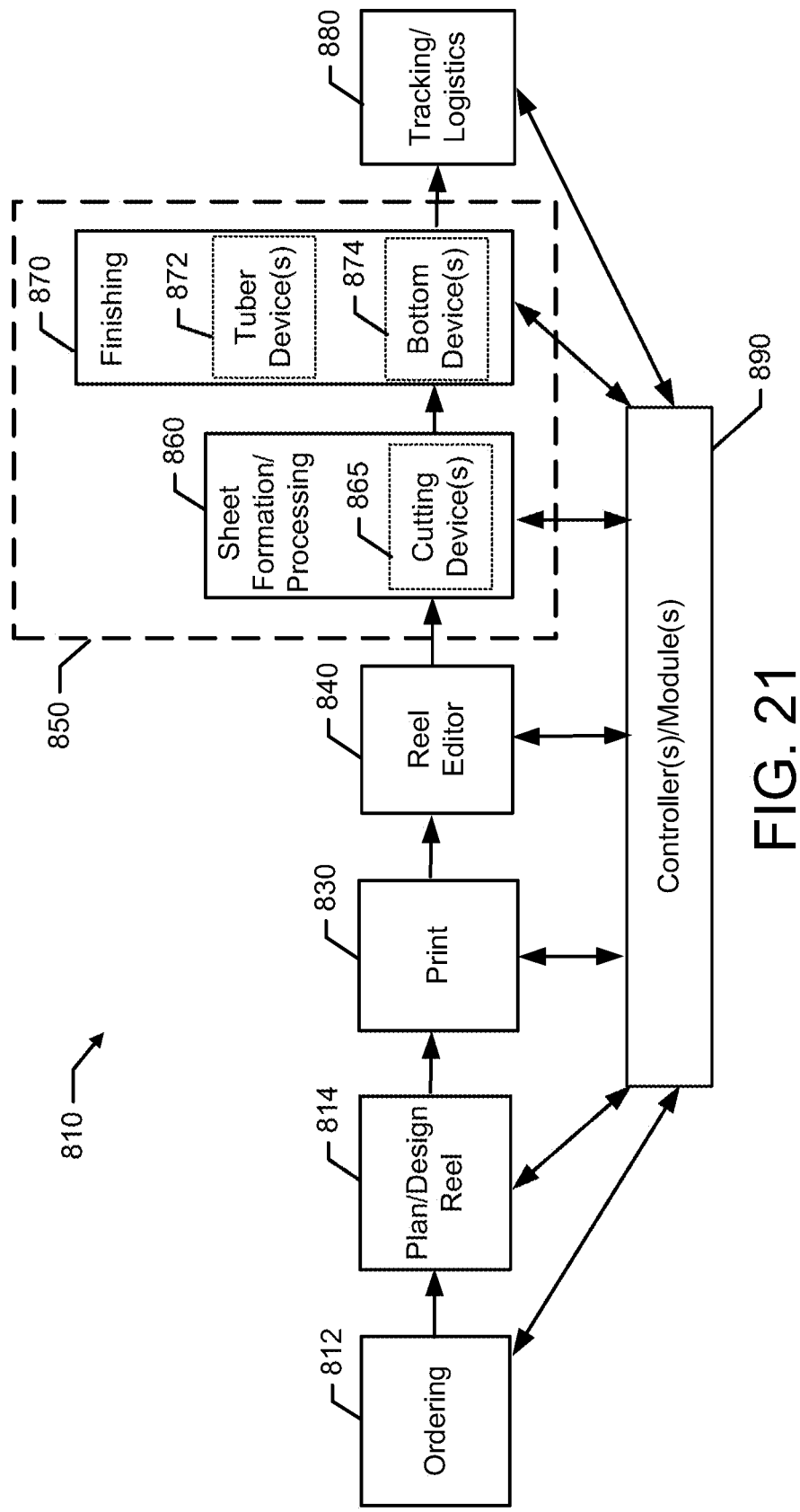
FIG. 21 shows a block diagram of an example industrial bag manufacturing process, in accordance with some embodiments discussed herein.

FIG. 21 shows a block diagram of an example industrial bag manufacturing process. The manufacturing process 810 includes a number of phases that result in a finished industrial bag that is shaped, formed, and printed per the customer's order. The process 810 may include an ordering phase 812, a planning phase 814, a print phase 830, a reel editor phase 840, a sheet formation/processing phase 860, a finishing phase 870, and a tracking/logistics phase 880. Such phases may be similar to the phases described with respect to the manufacturing phase 10 of FIG. 1. In some embodiments, less or more phases or different orders of phases are contemplated. Depending on the desired configuration, one or more controller(s) 890 may be used to control one or more various phases (e.g., various systems/devices therein) of the manufacturing process 810. In some embodiments, one device/system may encompass multiple phases, such as two or more of the printing phase 830, the reel editor phase 840, the sheet formation/processing phase 860, and the finishing phase 870. For example, an industrial bag manufacturing machine 850 may encompass both the sheet formation/processing phase 860 and the finishing phase 870.

In some embodiments, like the manufacturing process 10 described with respect to FIG. 1, the example industrial bag manufacturing process 810 may include one or more cutting devices 865 for cutting one or more sheets (or structures) from the roll of web product. Additionally, in some embodiments, a web forming device may form an updated web, such as prior to processing through the cutting device.

In some embodiments, the industrial bag manufacturing process 810 may include one or more unique devices, such as a tuber device 872 and/or bottom device 874 that may form part of the finishing phase 870 (or the sheet formation/processing phase 860). The tuber device 872, such as using various hardware and/or software, may be configured to form one or more sheets into one or more tubes. The bottom device 874, such as using various hardware and/or software, may be configured to form a bottom on each of the tubes to form the industrial bag.

Figure 22:
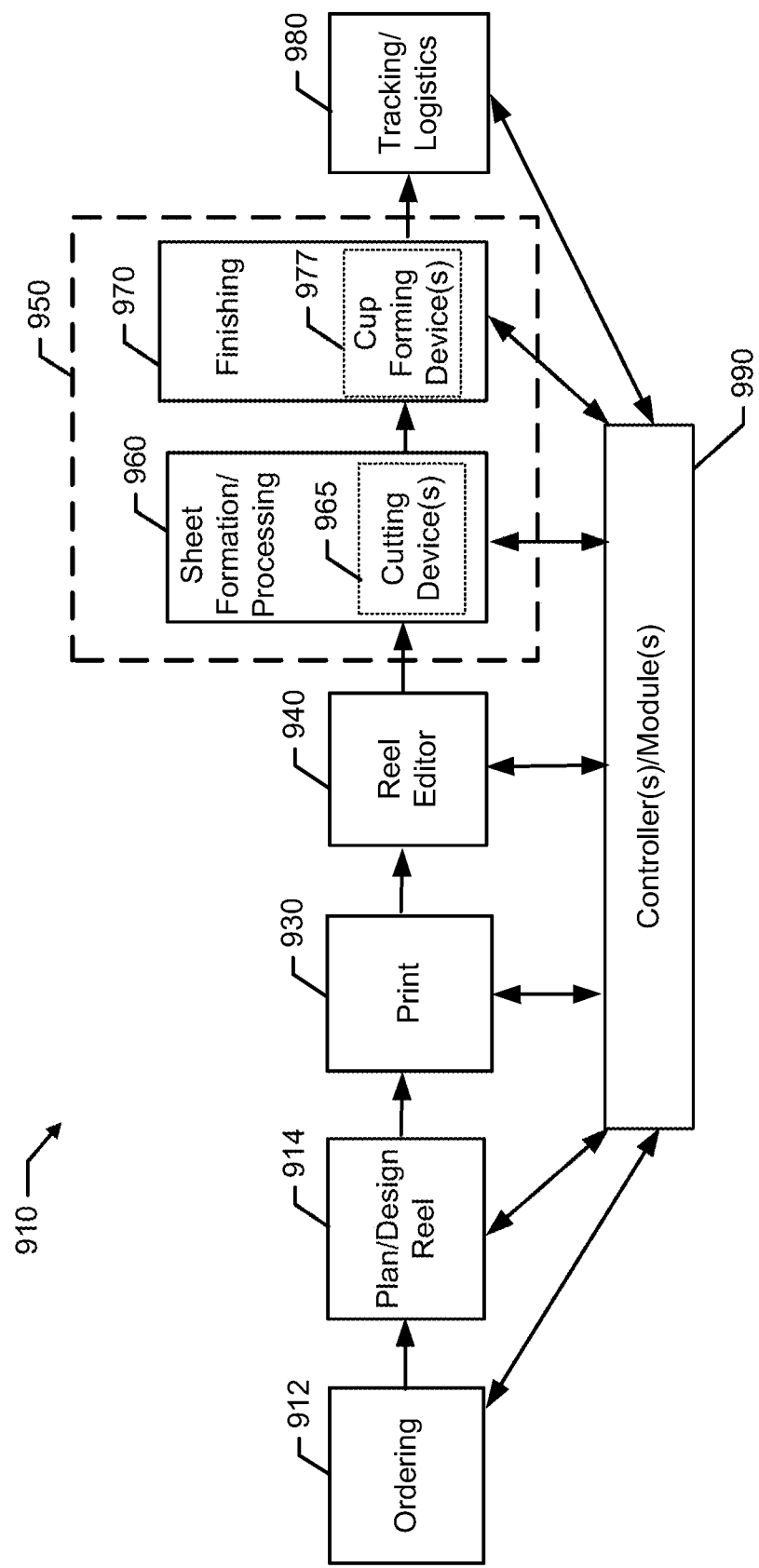
FIG. 22 shows a block diagram of an example cup manufacturing process, in accordance with some embodiments discussed herein.

FIG. 22 shows a block diagram of an example cup manufacturing process. The manufacturing process 910 includes a number of phases that result in a finished cup that is shaped, formed, and printed per the customer's order. The process 910 may include an ordering phase 912, a planning phase 914, a print phase 930, a reel editor phase 940, a sheet formation/processing phase 960, a finishing phase 970, and a tracking/logistics phase 980. Such phases may be similar to the phases described with respect to the manufacturing phase 10 of FIG. 1. In some embodiments, less or more phases or different orders of phases are contemplated. Depending on the desired configuration, one or more controller(s) 990 may be used to control one or more various phases (e.g., various systems/devices therein) of the manufacturing process 910. In some embodiments, one device/system may encompass multiple phases, such as two or more of the printing phase 930, the reel editor phase 940, the sheet formation/processing phase 960, and the finishing phase 970. For example, a cup manufacturing machine 950 may encompass both the sheet formation/processing phase 960 and the finishing phase 970.

In some embodiments, like the manufacturing process 10 described with respect to FIG. 1, the example cup manufacturing process 910 may include one or more cutting devices 965 for cutting one or more sheets (or structures) from the roll of web product. Additionally, in some embodiments, a web forming device may form an updated web, such as prior to processing through the cutting device.

In some embodiments, the cup manufacturing process 910 may include one or more unique devices, such as a cup former 977 that may form part of the finishing phase 970 (or the sheet formation/processing phase 960). The cup former 977, such as using various hardware and/or software, may be configured to form one or more sheets (or structures) into a cup with a desired shape (e.g., the cup former 977 may employ a die-cutter that cuts the sheet into a desired shape and a cup formation device that forms the cylindrical cup shape with a bottom and glues the cup together).

Figure 23:
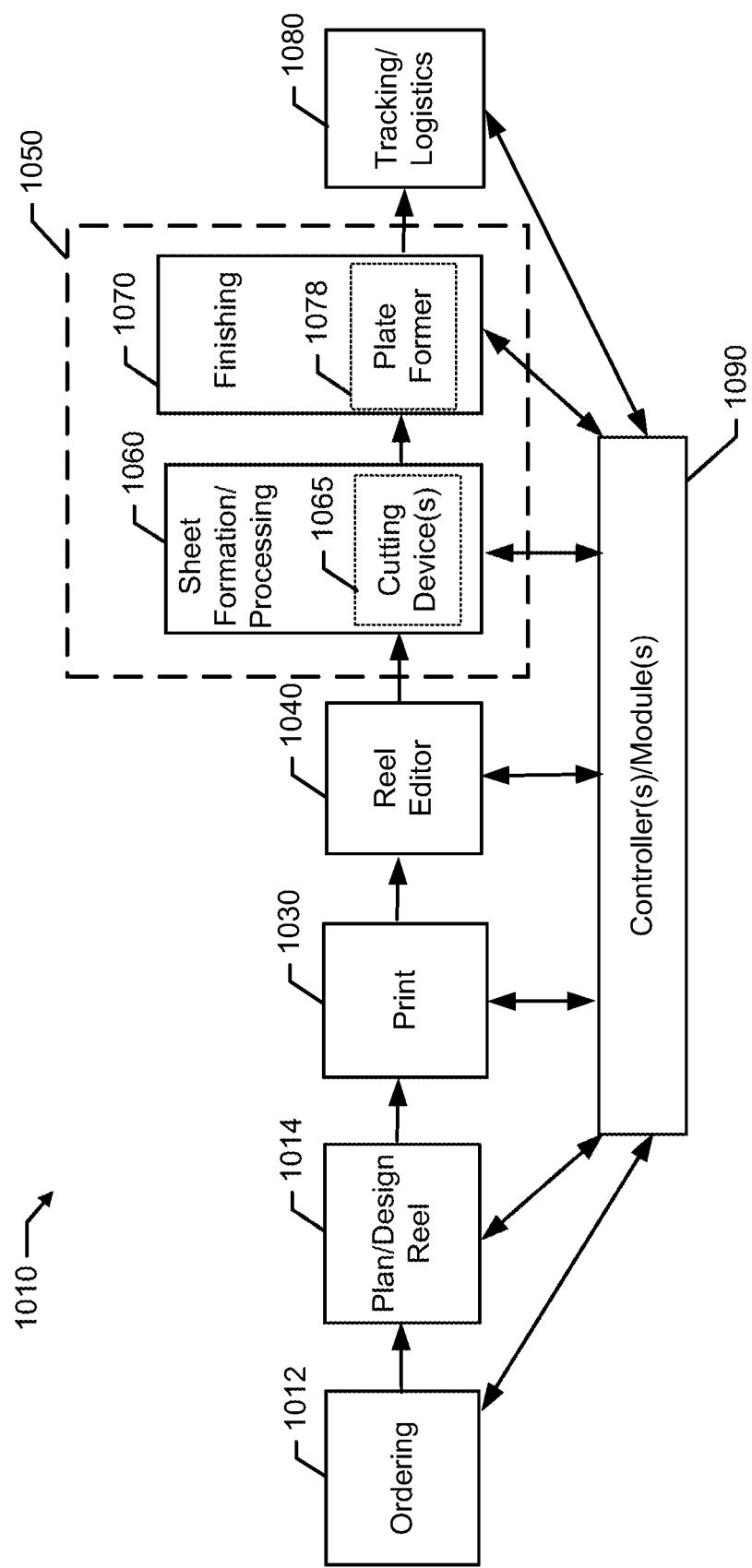
FIG. 23 shows a block diagram of an example paper plate manufacturing process, in accordance with some embodiments discussed herein.

FIG. 23 shows a block diagram of an example paper plate manufacturing process. The manufacturing process 1010 includes a number of phases that result in a finished paper plate that is shaped, formed, and printed per the customer's order. The process 1010 may include an ordering phase 1012, a planning phase 1014, a print phase 1030, a reel editor phase 1040, a sheet formation/processing phase 1060, a finishing phase 1070, and a tracking/logistics phase 1080. Such phases may be similar to the phases described with respect to the manufacturing phase 10 of FIG. 1. In some embodiments, less or more phases or different orders of phases are contemplated. Depending on the desired configuration, one or more controller(s) 1090 may be used to control one or more various phases (e.g., various systems/devices therein) of the manufacturing process 1010. In some embodiments, one device/system may encompass multiple phases, such as two or more of the printing phase 1030, the reel editor phase 1040, the sheet formation/processing phase 1060, and the finishing phase 1070. For example, a plate manufacturing machine 1050 may encompass both the sheet formation/processing phase 1060 and the finishing phase 1070.

In some embodiments, like the manufacturing process 10 described with respect to FIG. 1, the example paper plate manufacturing process 1010 may include one or more cutting devices 1065 for cutting one or more sheets (or structures) from the roll of web product. Additionally, in some embodiments, a web forming device may form an updated web, such as prior to processing through the cutting device.

In some embodiments, the paper plate manufacturing process 1010 may include one or more unique devices, such as a plate former 1078 that may form part of the finishing phase 1070 (or the sheet formation/processing phase 1060). The plate former 1078, such as using various hardware and/or software, may be configured to form one or more sheets (or structures) into a plate with a desired shape (e.g., the plate former 1078 may have a stamping device that stamps the sheet into a desired shape).

Although the above description notes one or more distinctions between the various manufacturing processes 710, 810, 910, 1010 and the manufacturing process 10, other distinctions are contemplated by some embodiments of the present invention. For example, the tracking/logistics phase for each manufacturing process may be different or employ different techniques that allow for efficient manufacturing of the end product. Whether the same or different, various tracking/marking/detecting techniques described herein may be employed with manufacturing of such example products to provide for an efficient manufacturing process.

Example Flowchart(s)

Embodiments of the present invention provide methods, apparatuses and computer program products for generating a control plan for a roll of web product for a manufacturing process according to various embodiments described herein. Various examples of the operations performed in accordance with embodiments of the present invention will now be provided with reference to FIG. 24.

Figure 24:
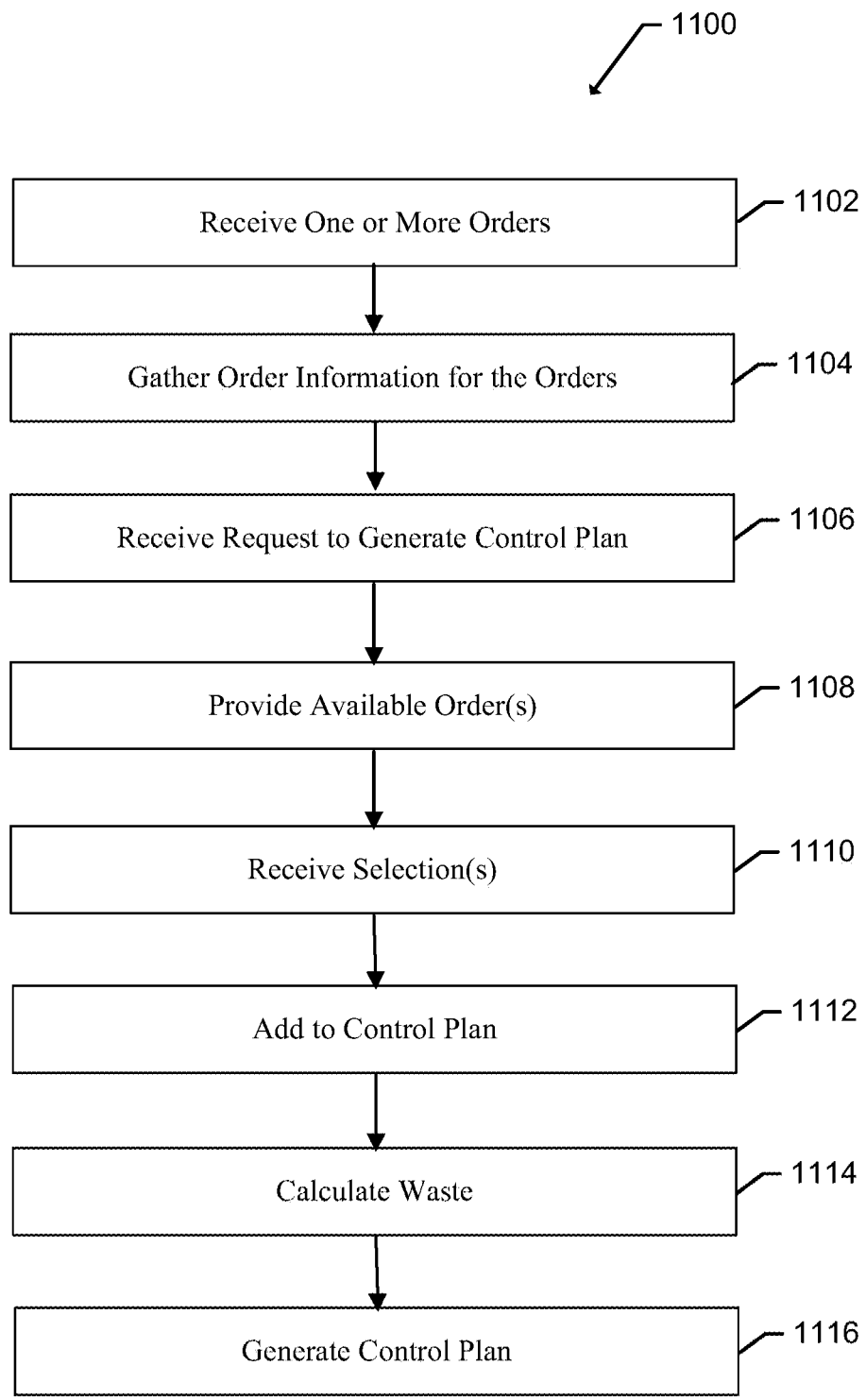
FIG. 24 illustrates a flowchart of an example method for generating a control plan for a roll of web product for a manufacturing process, in accordance with some embodiments discussed herein.

FIG. 24 illustrates a flowchart according to an example method for generating a control plan for a roll of web product for a manufacturing process according to an example embodiment. The operations illustrated in and described with respect to FIG. 24 may, for example, be performed by, with the assistance of, and/or under the control of one or more of the controller 90, 590, 790, 890, 990, 1090 components of the phases in the described manufacturing processes 10, 510, 710, 810, 910, 1010 and/or modules present in the described platform 100.

The method 1100 may include receiving one or more orders at operation 1102. At operation 1104, the method comprises gathering order information from one or more discrete systems, such as a management information system and a graphics planning system. Then, at operation 1106, the method comprises receiving a request to generate a control plan for a roll of web product. At operation 1108, the method includes providing one or more available orders for selection and inclusion in the control plan. At operation 1110, the method includes receiving at least one selection of an available order to include in the control plan. At operation 1112, the method includes adding the selected order to the control plan. At operation 1114, the method includes calculating an amount of waste for the currently proposed control plan. At operation 1116, the method comprises generating the control plan for use during the manufacturing process.

FIG. 24 illustrates a flowchart of a system, method, and computer program product according to various example embodiments described herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory and executed by, for example, the controller 90. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system for generating a control plan for controlling manufacturing of one or more paper-based products, the system comprising:

at least one controller configured to:
receive a request for generation of a control plan associated with a roll of web product for manufacturing one or more paper-based products;
provide a plurality of available orders for paper-based products for selection, wherein each of the plurality of available orders is associated with order information, wherein the order information for each order comprises information related to completing manufacturing of a desired product associated with the order;
receive a selection of an order from the plurality of available orders;
determine at least one of a width or a length of the roll of web product planned for use for the selected order;
determine an amount of waste on the roll of web product based on at least one of the width of the roll of web product and an order width of the selected order or the length of the roll of web product and an order length of the selected order, wherein the amount of waste corresponds to an amount of unused space on the roll of web product;
provide an indication of the amount of waste; and
generate the control plan associated with the roll of web product, wherein the control plan includes at least the selected order.

2. The system of claim 1, wherein the at least one controller is configured to determine if the amount of waste satisfies an acceptable waste threshold and provide an indication as to whether the amount of waste satisfies the acceptable waste threshold.

3. The system of claim 1, wherein the at least one controller is configured to determine if the amount of waste satisfies an acceptable waste threshold and prevent generation of the control plan in an instance in which the amount of waste does not satisfy the acceptable waste threshold.

4. The system of claim 1, wherein the selected order is a first order, and wherein the at least one controller is configured to, in response to receiving the selection of the first order:
determine a remaining width of the roll of web product that is available for one or more orders; and
provide a second plurality of available orders for selection, wherein each of the second plurality of available orders for selection are able to fit within the remaining width on the roll of web product.

5. The system of claim 4, wherein the at least one controller is configured to provide an indication of one or more recommended orders from the second plurality of available orders for selection, wherein the one or more recommended orders are determined based on one or more factors associated with the first order, wherein the one or more factors associated with the first order include at least one of deadlines, customers, color profiles, and manufacturing locations.

6. The system of claim 1, wherein the at least one controller is configured to, in response to receiving the selection of the order:
determine a suggested width for the roll of web product to reduce the amount of waste on the roll of web product after including the selected order; and
provide an indication of the suggested width.

7. The system of claim 6, wherein the at least one controller is configured to determine the suggested width based on the suggested width of the roll of web product being capable of being run on an available sheet formation/processing system.

8. The system of claim 1, wherein the at least one controller is configured to determine the amount of waste by subtracting the order width from the width of the roll of web product or the order length from the length of the roll of web product.

9. The system of claim 1, wherein the at least one controller is configured to determine the amount of waste by subtracting the order width from a portion of the width of the roll of web product available for use prior to receiving the selection of the order.

10. The system of claim 1, wherein the at least one controller is configured to receive an indication of a change in the width of the roll of web product and, in response, redetermine the amount of waste on the roll of web product based on the change in the width of the roll of web product and the order width.

11. The system of claim 1, wherein the at least one controller is configured to:
form a set of printing instructions to enable operation of a printer according to the control plan, wherein the set of printing instructions are formed into a format that is acceptable to the printer; and
form a set of sheet formation/processing instructions to enable operation of a sheet formation/processing system according to the control plan, wherein the set of sheet formation/processing instructions are formed into a format that is acceptable to the sheet formation/processing system.

12. The system of claim 1, wherein the request for generation of the control plan includes at least one criteria regarding orders for the one or more paper-based products, wherein each of the plurality of available orders for selection satisfy the at least one criteria from the request.

13. The system of claim 1, wherein the order information is gathered from a plurality of discrete systems.

14. A graphical user interface for generating a control plan for controlling manufacturing of one or more paper-based products, the graphical user interface being configured to:
receive a request for generation of a control plan associated with a roll of web product for manufacturing one or more paper-based products;
provide a plurality of available orders for paper-based products for selection, wherein each of the plurality of available orders for selection is associated with order information, wherein the order information for each order comprises information related to completing manufacturing of a desired product associated with the order;
receive a selection of an order from the plurality of available orders;
determine at least one of a width or a length of the roll of web product planned for use for the selected order;
determine an amount of waste on the roll of web product based on at least one of the width of the roll of web product and an order width of the selected order or the length of the roll of web product and an order length of the selected order, wherein the amount of waste corresponds to an amount of unused space on the roll of web product;
provide an indication of the amount of waste;
generate the control plan associated with the roll of web product, wherein the control plan includes at least the selected order; and
cause presentation of a representation of the control plan.

15. The graphical user interface of claim 14, wherein the graphical user interface is configured to determine if the amount of waste satisfies an acceptable waste threshold and provide an indication as to whether the amount of waste satisfies the acceptable waste threshold.

16. The graphical user interface of claim 14, wherein the graphical user interface is configured to determine if the amount of waste satisfies an acceptable waste threshold and prevent generation of the control plan in an instance in which the amount of waste does not satisfy the acceptable waste threshold.

17. A method for generating a control plan for controlling manufacturing of one or more paper-based products, the method comprising:

receiving a request for generation of a control plan associated with a roll of web product for manufacturing one or more paper-based products;

providing a plurality of available orders for paper-based products for selection, wherein each of the plurality of available orders for selection is associated with order information, wherein the order information for each order comprises information related to completing manufacturing of a desired product associated with the order;

receiving a selection of an order from the plurality of available orders;

determine at least one of a width or a length of the roll of web product planned for use for the selected order;

determine an amount of waste on the roll of web product based on at least one of the width of the roll of web product and an order width of the selected order or the length of the roll of web product and an order length of the selected order, wherein the amount of waste corresponds to an amount of unused space on the roll of web product;

provide an indication of the amount of waste; and generating the control plan associated with the roll of web product, wherein the control plan includes at least the selected order.

18. The method of claim 17 further comprising determining if the amount of waste satisfies an acceptable waste threshold and providing an indication as to whether the amount of waste satisfies the acceptable waste threshold.

19. The method of claim 17 further comprising determining if the amount of waste satisfies an acceptable waste threshold and preventing generation of the control plan in an instance in which the amount of waste does not satisfy the acceptable waste threshold.

20. The method of claim 17, wherein the selected order is a first order, and wherein the method further comprises, in response to receiving the selection of the first order:

determining a remaining width of the roll of web product that is available for one or more orders; and providing a second plurality of available orders for selection, wherein each of the second plurality of available orders for selection are able to fit within the remaining width on the roll of web product.

* * * * *